US006751544B2

(12) United States Patent
Hashimoto et al.

(10) Patent No.: US 6,751,544 B2
(45) Date of Patent: Jun. 15, 2004

(54) VEHICLE ENGINE CONTROL DEVICE

(75) Inventors: Kohji Hashimoto, Tokyo (JP); Katsuya Nakamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 20 days.

(21) Appl. No.: 10/299,789

(22) Filed: Nov. 20, 2002

(65) Prior Publication Data

US 2004/0002808 A1 Jan. 1, 2004

(30) Foreign Application Priority Data

Jun. 26, 2002 (JP) ..................................... P2002-186729

(51) Int. Cl.[7] .......................... F02D 41/00; G06F 19/00

(52) U.S. Cl. ....................... 701/107; 701/110; 701/114; 123/399

(58) Field of Search ................................ 701/107, 110, 701/114, 115, 102, 101; 123/361, 399

(56) References Cited

FOREIGN PATENT DOCUMENTS

| | | |
|---|---|---|
| JP | 2176141 | 7/1990 |
| JP | 6229301 | 8/1994 |
| JP | 6249015 | 9/1994 |
| JP | 6280656 | 10/1994 |
| JP | 11141389 | 5/1999 |
| JP | 2000097087 | 4/2000 |
| JP | 2000320380 | 11/2000 |
| JP | 2001107786 | 4/2001 |

*Primary Examiner*—Hieu T. Vo
(74) *Attorney, Agent, or Firm*—Sughrue Mion, PLLC

(57) ABSTRACT

Escape running performance at the time of the occurrence of an abnormality in an electronic throttle control system is improved. At the time of the occurrence of a severe abnormality, an abnormality storage element is operated, and an electric supply load relay of a throttle valve driving motor is de-energized to return a throttle valve to the default, and further, an alarm display is actuated, and an upper limit engine rotational speed is suppressed by control of a fuel injection valve, and escape running is carried out. As a suppression rotational speed, a lower limit threshold at a stop, a rotational speed substantially in proportion to the output of an accelerator position sensor, a rotational speed substantially in inverse proportion to the output of a throttle position sensor, or a default threshold rotational speed is selected, and multiple escape running can be carried out.

24 Claims, 16 Drawing Sheets

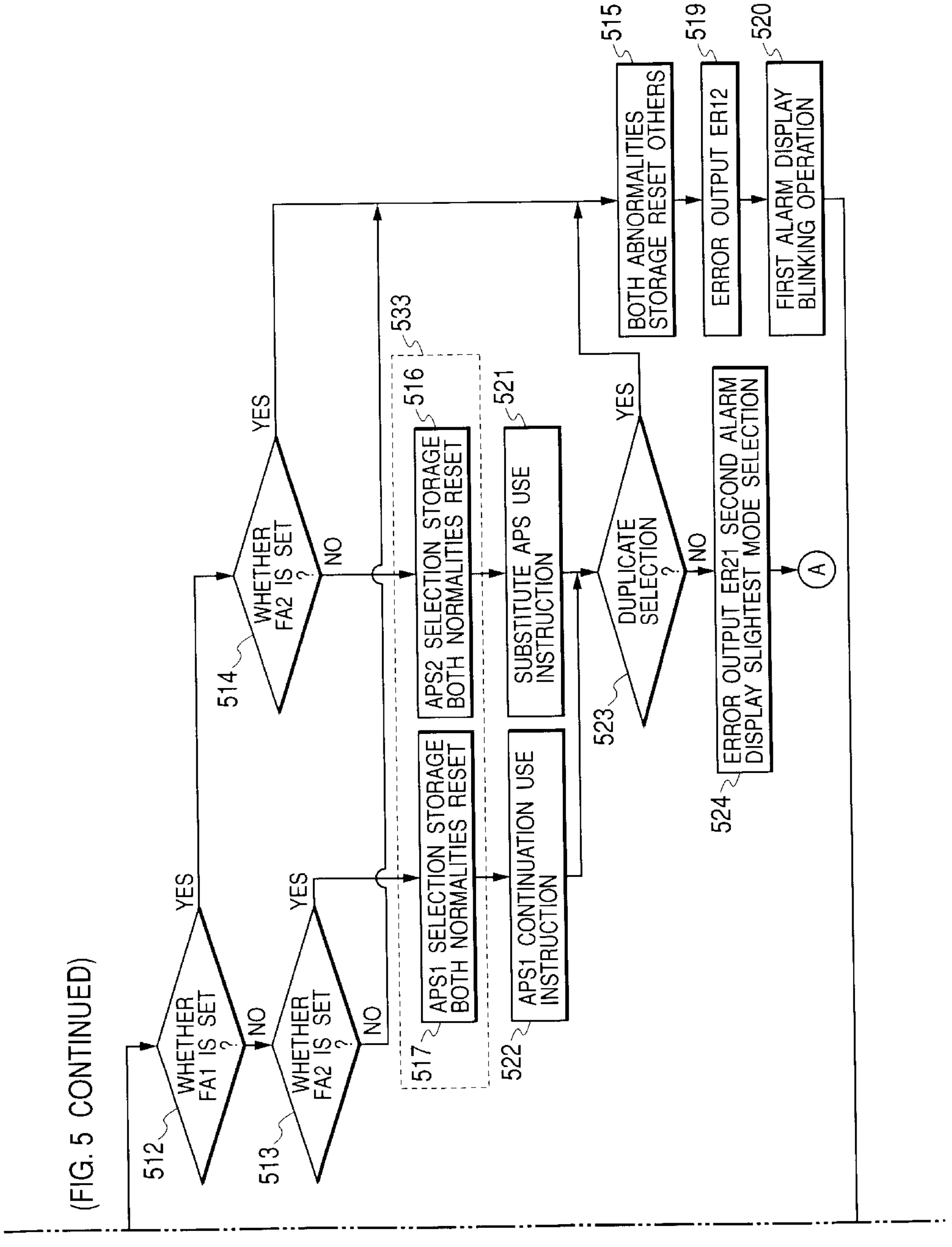
(FIG. 5 CONTINUED)
512
WHETHER FA1 IS SET ?
YES
NO
513
WHETHER FA2 IS SET ?
YES
NO
514
WHETHER FA2 IS SET ?
YES
NO
533
517
APS1 SELECTION STORAGE BOTH NORMALITIES RESET
516
APS2 SELECTION STORAGE BOTH NORMALITIES RESET
522
APS1 CONTINUATION USE INSTRUCTION
521
SUBSTITUTE APS USE INSTRUCTION
523
DUPLICATE SELECTION ?
YES
NO
524
ERROR OUTPUT ER21 SECOND ALARM DISPLAY SLIGHTEST MODE SELECTION
A
515
BOTH ABNORMALITIES STORAGE RESET OTHERS
519
ERROR OUTPUT ER12
520
FIRST ALARM DISPLAY BLINKING OPERATION (FIG. 6 CONTINUED)
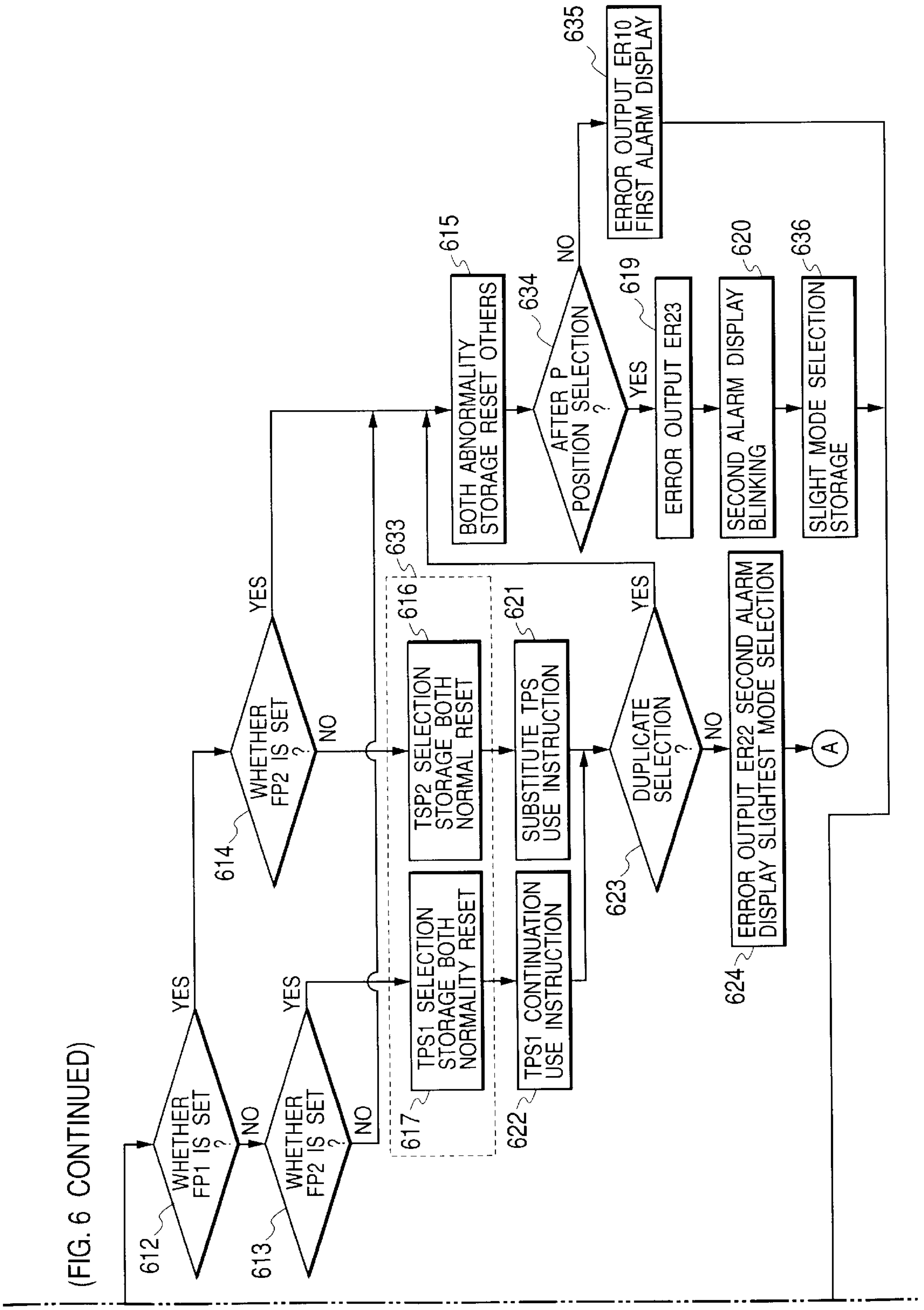

(FIG. 7 CONTINUED)
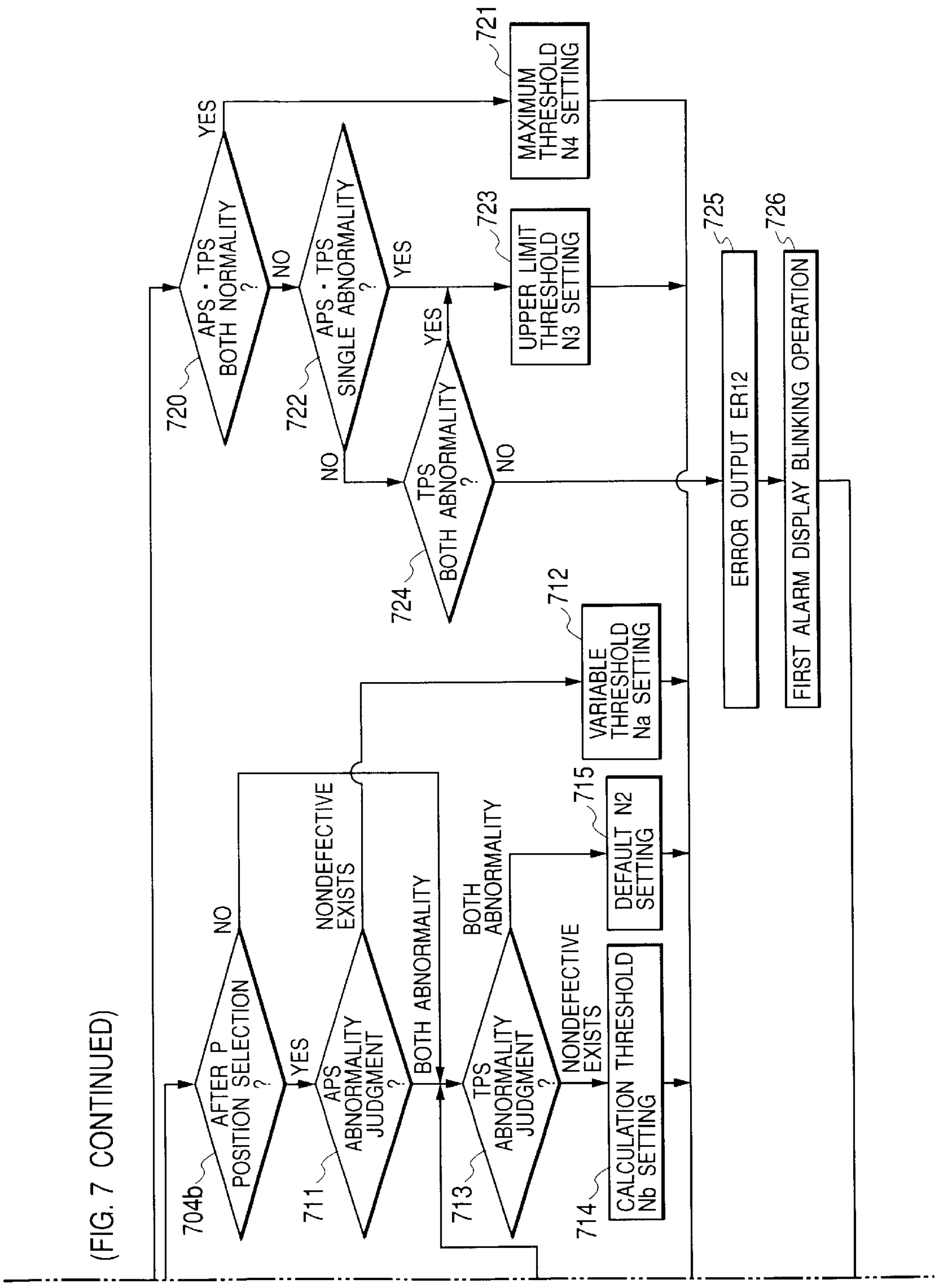

FIG. 13(a)
TPS OUTPUT VOLTAGE V (0 to 5, bottom to top) / APS OUTPUT VOLTAGE V (0 to 5, left to right)
| | | | | | | | |
|---|---|---|---|---|---|---|---|
| 5 | 5 | 5 | 4 | 4 | 3 | 3 | 3 |
| 5 | 5 | 5 | 4 | 4 | 3 | 3 | 3 |
| 5 | 5 | 5 | 4 | 4 | 3 | 3 | 3 |
| 5 | 5 | 5 | 4 | 4 | 3 | 3 | 3 |
| 5 | 5 | 4 | 3 | 3 | 3 | 2 | 2 |
| 5 | 4 | 3 | 2 | 2 | 2 | 1 | 1 |
| 2 | 2 | 2 | 1 | 1 | 1 | 0 | 0 |
| 1 | 1 | 1 | 1 | 1 | 1 | 0 | 0 |
FIG. 13(b)
| | REST CYLINDER |
|---|---|
| LEVEL 1 | 1 |
| LEVEL 2 | 1 · 4 |
| LEVEL 3 | 1 · 3 · 5 |
| LEVEL 4 | 1 · 2 · 4 · 5 |
| LEVEL 5 | 1 · 2 · 4 · 5 · 6 |
| ALL CYLINDERS | 1~6 |
FIG. 13(c)
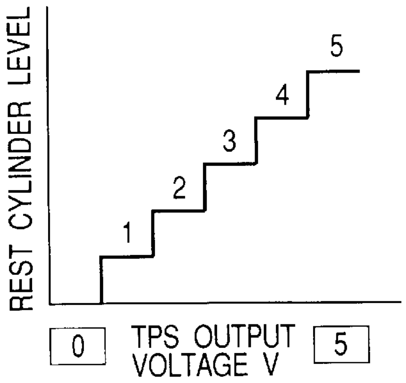
FIG. 13(d)
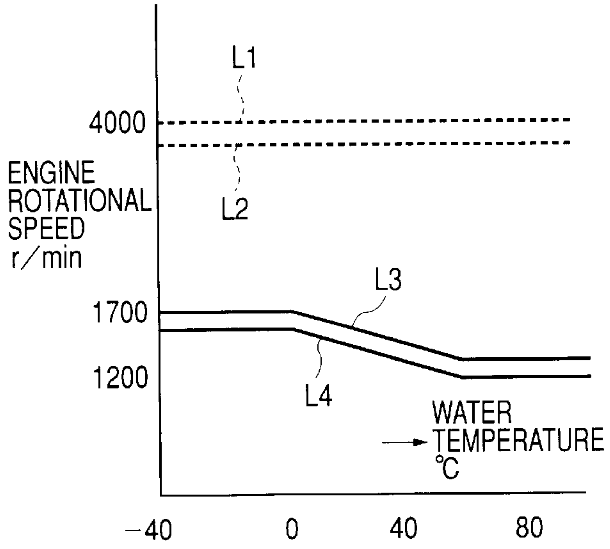

VEHICLE ENGINE CONTROL DEVICE

BACKGROUND OF THE INVENTION

1. Field of the Invention

The present invention relates to a vehicle engine control device, and particularly to a vehicle engine control device in which the safety of additional functions and the performance of escape driving at an emergency are improved in an engine control unit (ECU) for carrying out ignition control of an engine, fuel injection control and the like, especially in a compound type ECU added with, as additional functions, an electronic throttle control function for controlling an opening degree of an intake throttle valve by a driving motor.

2. Description of the Related Art

An engine control unit (hereinafter referred to as an ECU) using a microcomputer is widely used to carry out ignition control and fuel injection control of a vehicle engine. Recently, a compound type ECU added with, as additional functions, an electronic throttle control function for controlling the opening degree of a throttle valve by an electric motor is proposed and is coming into wide use.

This electronic throttle control function is such that the opening degree of an intake throttle valve of an engine is controlled by an electric motor in accordance with the depression degree of an accelerator pedal, and a wireless type one having no accelerator wire is coming into wide use recently.

This type of electronic throttle control device is constructed such that when a power source of the electric motor is switched off at the time of the occurrence of an abnormality, the throttle valve is automatically returned to a position of a predetermined safety throttle valve opening degree by a default mechanism using a return spring.

The safety throttle valve opening degree is set to a valve opening position slightly larger than an idling valve opening position, and in escape driving at the time of the occurrence of an abnormality, an operation of an accelerator pedal becomes ineffective, and one pedal operation is carried out in which vehicle speed is adjusted while the depression degree of a brake pedal is adjusted.

However, if the safety throttle valve opening degree is small, there is a problem that even if the brake is released, a sufficient driving force can not be obtained, and climbing escape driving can not be carried out. On the contrary, if the safety throttle valve opening degree is excessively large, a dangerous state occurs in which even if the brake pedal is sufficiently depressed, it is difficult to stop the vehicle.

Further, it is also necessary to consider such a problem that a default return has not been correctly carried out because of a mechanical abnormality in the throttle valve opening degree control.

As improvement measures to such problems, what is illustrated in FIG. 12(*a*) or 12(*b*) is conventionally proposed.

First, the conventional improvement measure illustrated in FIG. 12(*a*) is an escape driving control in the case where a motor or a throttle valve switching mechanism is abnormal.

An escape driving control circuit shown in FIG. 12(*a*) includes threshold setting means 1*a* of an upper limit vehicle speed, vehicle speed detection means 1*b*, threshold setting means 2*a* of an idle rotational speed of an engine, rotational speed detection means 2*b* of the engine, upper limit rotation threshold setting means 2*c* of the engine, return detection switches 3*a* and 3*a* of an accelerator pedal, and judgment switches 3*b* and 3*b* of a default return state. Incidentally, reference numeral 4 designates supply fuel control means for controlling a fuel injection amount; and 5, a fuel injection valve.

In FIG. 12(*a*), in the state where the judgment switches 3*b* and 3*b* of the default return state are at normal return positions of illustrated positions, and the return detection switches 3*a* and 3*a* of the accelerator pedal are also at illustrated positions of return positions of the accelerator pedal, the fuel injection amount is controlled by the supply fuel control means 4 so that the engine rotational speed comes to have not larger than a threshold set by the idle threshold setting means 2*a*, and the driving force of the engine is put into a minimum state.

In this state, even if the accelerator pedal is depressed to escape from a site, the fuel injection amount is controlled by the supply fuel control means 4 so that the vehicle speed comes to have not larger than a threshold set by the upper limit threshold setting means 1*a*. However, even by the driving function using the depression of the accelerator pedal, when the throttle valve opening degree is small, a sufficient vehicle speed can not be obtained, and this driving function using the depression of the accelerator pedal is absolutely a minimum driving function for the purpose of escaping from the site.

At the time of an excessively opened abnormality in which the return opening degree of the throttle valve becomes a default opening degree or more, or when a throttle position sensor is abnormal and the throttle opening degree is unclear, the detection switches 3*b* and 3*b* of the default return state are changed over from the illustrated positions, and the supply fuel control means 4 is controlled so that the engine rotational speed comes to have not larger than a threshold set by the upper limit rotational speed setting means 2*c*.

What is illustrated in FIG. 12(*a*) is disclosed in JP-A-2000-97087 (Title of the Invention: THROTTLE VALVE CONTROL DEVICE) (prior art 1), and in the state where the detection switches 3*b* and 3*b* of the default return state are at the illustrated positions, the engine rotational speed resulting from the depression of the accelerator pedal is not limited, and the escape driving control illustrated in FIG. 12(*a*) is suitable for low speed climbing escape driving.

However, in the state where the detection switches 3*b* and 3*b* of the default return state are changed over, the control is carried out such that the engine rotational speed comes to have not larger than the threshold set by the upper limit rotation threshold setting means 2*c*, and in a region of low engine rotational speed, the output torque of the engine is increased in proportion to the rotational speed of the engine, and its proportionality constant is increased or decreased substantially in proportion to the throttle valve opening degree.

Accordingly, in the escape driving control illustrated in FIG. 12(*a*), even if the upper limit rotational speed of the engine is regulated to the threshold or lower, an actual throttle valve opening degree is uncertain, and it is a problem that the driving torque of the engine is changed by the magnitude of the throttle valve opening degree, and there is a danger that when the throttle valve opening degree is large, braking by the brake pedal becomes difficult.

To this end, if the upper threshold by the upper limit rotation threshold setting means 2*c* is made low, a sufficient driving force can not be obtained, and especially in the case where the throttle valve opening degree is small, there is a problem that the climbing escape running becomes quite impossible.

FIG. 12(*b*) illustrates a conventional escape driving control in the case where although a driving motor and a throttle valve opening mechanism are normal, an abnormality exists in another portion. The escape driving control illustrated in FIG. 12(*b*) includes a throttle valve control part shown in the upper stage of the drawing, and a fuel cut control part shown in the lower stage of the drawing.

The throttle control part of the upper stage of FIG. 12(*b*) is disclosed in JP-A-HEI2-176141 (Title of the Invention: "CONTROL DEVICE FOR INTERNAL COMBUSTION ENGINE") (prior art 2), JP-A-HEI11-141389 (Title of the Invention: "THROTTLE CONTROL DEVICE FOR INTERNAL COMBUSTION ENGINE") (prior art 3), and JP-A-HEI6-229301 (Title of the Invention: "OUTPUT CONTROL DEVICE FOR INTERNAL COMBUSTION ENGINE") (prior art 4) in addition to the prior art 1, and is a typical escape driving control in the case where the driving motor and the throttle valve are normal, and the other abnormality exists.

The escape driving control illustrated in FIG. 12(*b*) includes an accelerator position sensor (hereinafter referred to as an APS) 6*a* for detecting the depression degree of an accelerator pedal, setting means 7 of an objective throttle valve opening degree responding to the detection output of the APS, a throttle position sensor (hereinafter referred to as a TPS) for detecting a throttle valve opening degree linked with a throttle valve opening and closing control driving motor 9, and PID control means 8 for controlling the motor 9 so that the objective throttle valve opening degree by the setting means 7 coincides with an actual valve opening degree by the throttle position sensor 6*b*, and this structure is the same as the structure at the time of normal driving.

However, in the case where an abnormality occurs in a portion other than the driving motor 9 or its driving mechanism, the objective throttle valve opening degree by the setting means 7 is made a value suppressed as compared with the normal driving time.

The prior art 2 shows abnormality detection means for a level abnormality, a sudden change abnormality, a relative comparison abnormality and the like in detection output voltages of the accelerator position sensor and the throttle position sensor installed in a double system, and the objective throttle valve opening degree is suppressed at the time of the occurrence of these abnormalities.

The prior art 3 is characterized in that acceleration suppression means 10 is used after the setting means 7, and the control is carried out such that even if the objective throttle valve opening degree is suddenly increased, the actual throttle valve opening degree is gradually increased, and when the objective throttle valve opening degree is decreased, the actual throttle valve opening degree is immediately decreased.

The control of the prior art 3 has a feature that the escape driving is carried out by normal two-pedal driving and there is no feeling of wrongness, however, there is a problem that the objective throttle valve opening degree is suppressed so that the driving torque of the engine is decreased, and sufficient climbing performance can not be obtained.

Particularly, there are problems that a method of specifying a non-defective unit in the abnormality judgment means of the APS or the TPS is not used, and suppression of the objective opening degree is not carried out rationally and quantitatively.

The fuel cut control part of the lower stage of FIG. 12(*b*) is disclosed in the prior art 4, and not only the objective throttle valve opening degree is suppressed by the setting means 7, but also the fuel cut control is used so that the safety is improved.

This fuel cut control part includes variable threshold setting means 2*d* for variably setting an upper limit rotational speed of an engine substantially in proportion to the detection output of the accelerator position sensor 6*a*, and supply fuel control means 4 controls a fuel injection valve 5 so that the actual engine rotational speed comes to have not larger than a threshold set by the variable threshold setting means 2*d*. However, it is not indicated that what escape driving is carried out in the case where the accelerator position sensor is inferior, and especially in the case where the accelerator pedal is returned, if the detection output voltage of the accelerator position sensor is excessive, there is also a case where a dangerous state occurs in which it is difficult to make a stop by a brake pedal.

On the other hand, JP-A-HEI6-249015 (Title of the Invention: "CONTROL DEVICE FOR VEHICLE") (prior art 5) relates to a device including an escape running bypass valve, and an electric motor for controlling an opening degree of a main throttle valve returned to be totally closed by a return spring, and discloses, in the device, escape driving means against an excessively opened abnormality in the case where the main throttle valve is not returned to be totally closed by an abnormality of the driving motor, actuator or the like.

The outline of the prior art 5 is shown in FIGS. 13(*a*) to 13(*d*). FIG. 13(*a*) shows a rest cylinder level map corresponding to the output voltage of a throttle position sensor TPS for detecting a main throttle valve opening degree and the output voltage of an accelerator position sensor APS for detecting a depression degree of an accelerator pedal. The rest cylinder level mentioned here indicates, as shown in FIG. 13(*b*), a level at which fuel supply to a part of a multi-cylinder engine is stopped and effective cylinders are decreased. In FIG. 13(*a*), six levels of from level 0 to level 5 are shown, and rest cylinders at the respective levels are shown in FIG. 13(*b*). FIG. 13(*b*) shows an example of six cylinders.

Incidentally, FIG. 13(*a*) shows the rest cylinder levels in the case where a driving range of low speed forward 1, low speed forward 2, forward D, or reverse R is selected as a select position of a transmission, whereas FIG. 13(*c*) shows the rest cylinder levels in the case where the select position of the transmission is selected in a stop range of parking position P, neutral N or the like.

According to FIG. 13(*a*), as the depression degree of the accelerator pedal becomes small and the throttle valve opening degree becomes large, the rest cylinder level becomes high, and the number of effective cylinders is decreased. The engine rotational speed corresponding to this is an open loop control in which it is changed by a load state of an engine.

However, as shown in FIG. 13(*d*), a safety control is added in which when the engine rotational speed exceeds a predetermined upper limit value, fuel cut of all cylinders is carried out.

Incidentally, in FIG. 13(*d*), the horizontal axis indicates engine cooling water temperature, and the vertical axis indicates engine rotational speed, and a fuel cut region of all cylinders in a driving range is shown in the upper part of the drawing, that is, in the vicinity of an engine rotational speed of 4000 r/min. The fuel cut region of all cylinders in this operation range is a region above a dotted line L1, and the fuel cut of all cylinders has a slight hysteresis characteristic so that it is released when the engine rotational speed is lowered to a dotted line L2. Besides, a fuel cut region of all cylinders in the stop range of the neutral N or the parking P is shown in the lower part of FIG. 13D, that is, in the vicinity of an engine rotational speed of 1700 to 1300 r/min. The fuel cut region of all cylinders in this stop range is a region above a solid line L3, and the fuel cut of all cylinders has a slight hysteresis characteristic so that it is released when the engine rotational speed is lowered to a solid line L4.

The escape driving means according to the prior art 5 as described above is escape driving means in the case where both the accelerator position sensor and the throttle position sensor are normal, and the control of the engine rotational speed is also of the open loop control system, and therefore, there is a problem that for example, an engine rotational speed when the accelerator pedal is returned is much changed by the magnitude of the throttle valve opening degree.

Incidentally, JP-A-HEI6-280656 (Title of the Invention: "ESCAPE RUNNING DEVICE FOR VEHICLE") (prior art 6) discloses means for carrying out escape driving, instead of the rest cylinder control in the prior art 5, by the increase or decrease of a fuel injection amount and the increase or decrease of an ignition advance to adjust an engine output in the state where the control of the throttle valve can not be carried out.

However, there is a problem that a sufficient engine output adjustment can not be made by only the adjustment of the fuel injection amount and the ignition advance.

Besides, JP-A-2000-320380 (Title of the Invention: "CONTROL DEVICE FOR INTERNAL COMBUSTION ENGINE") (prior art 7) discloses an electronic throttle control device provided with a default position return mechanism in which when throttle control becomes impossible, the control of decreasing cylinders is carried out.

For example, it is disclosed that the number of decreased cylinders is made small, medium, or large in accordance with the depression degree (large, medium or small) of an accelerator pedal, that the lower limit value of the number of decreased cylinders is increased in accordance with the increase of the throttle valve opening degree, or that the control of decreasing cylinders is carried out by brake detection means or engine rotational speed detection means.

What is disclosed in the prior art 7 is also the control of decreasing cylinders in the open loop system, and there is a problem that for example, the engine rotational speed when the accelerator pedal is returned is much changed by the magnitude of the throttle valve opening degree.

In addition, JP-A-2001-107786 (Title of the Invention: "ENGINE CONTROL DEVICE AT FAILURE") (prior art 8) discloses an electronic throttle control device provided with a default position return mechanism, in which with respect to an excessively opened abnormal stop or an excessively closed abnormal stop of a throttle valve, escape running is carried out using, as engine output adjustment means other than a throttle valve control, a fuel injection amount increasing/decreasing control including a fuel cut control and an ignition timing control.

However, there is a problem that a sufficient output adjustment of an engine can not be made only by the adjustment of the fuel injection amount and the ignition advance.

In the above-described prior art, there are problems that the abnormality detection means relating to the added electric throttle control function and the escape driving control corresponding to this are not systematic, and even in the case where the actuator system and the accelerator position sensor are normal, the generated torque of the engine at the time of escape driving is suppressed and climbing performance is lowered, or in the case where the actuator system or the accelerator position sensor is abnormal, braking by a brake pedal becomes difficult, or on the contrary, it becomes impossible to secure a sufficient driving force.

SUMMARY OF THE INVENTION

A first object of this invention is to propose a vehicle engine control device which provides various escape driving means for systematically extracting abnormalities of a sensor system, a control system, and an actuator system relating to an electronic throttle control function to cope with an abnormal situation, and includes selection means which does not cause confusion in prompt measures against the occurrence of an abnormality during vehicle traveling.

A second object of this invention is to propose a vehicle engine control device including escape running means which discriminates between single abnormality in which one of a pair of accelerator position sensors and a pair of throttle position sensors becomes abnormal, and both abnormality in which both of them become abnormal, and carries out an accurate and easy operation against this.

A third object of this invention is to propose a vehicle engine control device in which rest cylinder control corresponding to a speed deviation in relation to an objective operation speed is carried out against a severe abnormality in which control of a throttle valve can not be carried out, so that a driving operation of escape running can be eased and safety can be improved.

A vehicle engine control device of this invention includes a transmission in which at least a forward position, a reverse position, a neutral position, and a parking position can be selected by an operation of a selector lever, and is characterized in that the control device includes a microprocessor, is constructed to receive electric supply from an on-vehicle battery through a power source switch, and includes engine rotational speed detection means for detecting a rotational speed of an engine, fuel injection means for supplying a fuel to the engine, a pair of accelerator position sensors for detecting a depression degree of an accelerator pedal, a pair of throttle position sensors for detecting a throttle valve opening degree of an intake throttle valve of the engine, a driving motor for carrying out an opening and closing control of the intake throttle valve in accordance with outputs of the pair of accelerator position sensors and the pair of throttle position sensors, a motor power source switching element for controlling electric supply to the driving motor, a default position return mechanism for returning the throttle valve opening degree to a default position for escape driving when the motor power source switching element breaks electric supply, and drive control means for the driving motor, and further includes abnormality detection means, an abnormality storage element, lower limit rotation threshold setting means, automatic shift escape running means, and selective shift escape running means, the abnormality detection means is means for always monitoring operations of a sensor system, a control system, and an actuator system relating to control of the intake throttle valve, detecting whether the intake throttle valve can be controlled, and generating a severe abnormality detection output when the intake throttle valve can not be controlled, when the abnormality detection means generates the severe abnormality detection output, the abnormality storage element stores this, breaks the motor power source switching element to stop electric supply to the driving motor, and is constructed such that its storage state is reset in at least one of closing and breaking of the power source switch, the lower limit rotation threshold setting means is means for setting a lower limit rotational speed at which the engine can continue to rotate, the automatic shift escape running means is means for controlling an engine rotational speed by the fuel injection control means in such a way that when electric supply to the driving motor is stopped, the engine rotational speed detected by the rotational speed detection means of the engine becomes a rotational speed less than a predetermined limiting rotational speed, and becomes a rotational speed greater than a minimum engine rotational speed set by the lower limit rotation threshold setting means, and the selective shift escape running means is means for controlling the engine rotational speed by the fuel injection control means in such a way that when there is an accelerator position sensor regarded as being normal after electric supply to the driving motor is stopped and the transmission is once selected to be put in the parking position, the engine rotational speed detected by the engine rotational speed detection means becomes a rotational speed less than a variable threshold rotational speed of a value substantially in proportion to the depression degree of the accelerator pedal set by variable threshold rotation setting means, and becomes a rotational speed greater than a minimum engine rotational speed or higher set by the lower limit rotation threshold setting means.

Since the above-described vehicle engine control device of this invention includes the abnormality detection means, the abnormality storage element, the lower limit rotation threshold setting means, the automatic shift escape running means, and the selective shift escape running means, there are effects that for the occurrence of the severe abnormality during vehicle traveling, a danger of applying various escape driving means as a prompt measure is avoided, and escape running by the specific automatic shift escape running means can be carried out, and further, in the case where this severe abnormality is a temporal one by noise or the like, it can be released by restart of the engine, and in the case of a continuous abnormality, more convenient escape running means can be selected by using the selective shift escape means.

Besides, another vehicle engine control device of this invention includes a transmission in which at least a forward position, a reverse position, a neutral position, and a parking position can be selected by an operation of a selector lever, and is characterized in that the control device includes a microprocessor, is constructed so as to receive electric supply from an on-vehicle battery through a power supply switch, and includes engine rotational speed detection means for detecting a rotational speed of an engine, fuel injection means for supplying a fuel to the engine, a pair of accelerator position sensors for detecting a depression degree of an accelerator pedal, a pair of throttle position sensors for detecting a throttle valve opening degree of the engine, and drive control means for controlling a driving motor which carries out an opening and closing control of an intake throttle valve in accordance with outputs of the pair of accelerator position sensors and the pair of throttle position sensors, and further includes first non-defective sensor detection means, second non-defective sensor detection means, and escape running means, the first non-defective sensor detection means includes first relative abnormality detection means for generating a relative error output when outputs of the pair of accelerator position sensors are mutually compared and a comparison deviation is excessive, and first individual abnormality detection means for detecting existence of a disconnection and a short circuit for each of the pair of accelerator position sensors and generating an individual error output when an abnormality exists, and is made means for making non-defective unit judgment in such a manner that when both of the pair of accelerator position sensors are not in a state of the disconnection and the short circuit, and a relative abnormality does not occur, both the accelerator position sensors are regarded as being non-defective units, and even if the relative abnormality occurs, when one of the accelerator position sensors is in the state of the disconnection and the short circuit, the other accelerator position sensor is regarded as being a non-defective unit, the second non-defective sensor detection means includes second relative abnormality detection means for outputting a relative error output when outputs of the pair of throttle position sensors are mutually compared and a comparison deviation is excessive, and second individual abnormality detection means for detecting existence of a disconnection and a short circuit of each of the pair of throttle position sensors and generating an individual error output when an abnormality exists, and is made means for making non-defective unit judgment of the throttle position sensors in such a manner that when both of the pair of throttle position sensors are not in a state of the disconnection and the short circuit, and a relative abnormality does not occur, both the throttle position sensors are regarded as being non-defective units, and even if the relative abnormality occurs, when one of the throttle position sensors is in the state of the disconnection and the short circuit, the other throttle position sensor is regarded as being a non-defective unit, and the escape running means is means for carrying out escape driving by the drive control means and the fuel injection control means in response to at least one abnormality of a slightest abnormality due to at least one of a single abnormality of the pair of accelerator position sensors and a single abnormality of the pair of throttle position sensors, a slight abnormality due to both abnormality of the pair of throttle position sensors, and a severe abnormality due to both abnormality of the pair of accelerator position sensors.

Since the above-described vehicle engine control device of this invention includes the first non-defective sensor detection means for detecting the non-defective unit of the pair of accelerator position sensors, the second non-defective sensor detection means for detecting the non-defective unit of the pair of throttle position sensors, and the escape running means, there are effects that the abnormality is detected with respect to the pair of accelerator position sensors or the pair of throttle position sensors, and further, when there is a sensor regarded as being a non-defective unit, this is specified and is used in the escape running, and therefore, exact and convenient escape running means can be applied.

Besides, a still another vehicle engine control device of this invention uses a microprocessor, and drives and controls a driving motor for carrying out an opening and closing control of an intake throttle valve of an engine in accordance with an output of a pair of accelerator position sensors for detecting a depression degree of an accelerator pedal and an output of a pair of throttle position sensors for detecting a throttle valve opening degree, the control device includes engine rotational speed detection means for detecting a rotational speed of an engine and fuel injection control means for the engine, and further includes abnormality detection means, escape running means, and rest cylinder control means, the abnormality detection means is means for always monitoring operations of a sensor system, a control system, and an actuator system relating to control of the throttle valve, discriminating between a severe abnormality in which control of the throttle valve is impossible, and a slight abnormality in which control of the throttle valve is possible, and detecting it, the escape running means includes at least one of severe abnormality escape running means for controlling the rotational speed of the engine by stopping the control of the throttle valve and by the fuel injection control means, and slight abnormality escape running means for suppressing the rotational speed of the engine by the fuel injection control means while carrying out the control of the throttle valve, and the rest cylinder control means is speed control means for increasing or decreasing the number of rest cylinders in which fuel injection is stopped, in accordance with a magnitude of a relative speed deviation between an objective engine rotational speed and an engine rotational speed detected by the engine rotational speed detection means, to obtain the engine rotational speed substantially equal to the objective engine rotational speed.

Since the above-described vehicle engine control device of this invention includes the rest cylinder control means in addition to the abnormality detection means and the escape running means, escape running can be carried out by the rest cylinder control means at the time of the occurrence of the abnormality, and further, since this rest cylinder control means increases or decreases the number of rest cylinders in which fuel injection is stopped, in accordance with the deviation speed between the objective engine rotational speed and the actual engine rotational speed, there are effects that fluctuation in the rotational speed of the engine in accordance with the load state of the engine is low, and safe escape running can be carried out.

BRIEF DESCRIPTION OF THE DRAWINGS

FIGS. 13(*a*) to 13(*d*) are conventional rest cylinder control characteristic views.

DETAILED DESCRIPTION OF THE PREFERRED EMBODIMENTS

Embodiment 1

(1) Detailed Description of Structure of Embodiment 1

Hereinafter, a structure of an engine control device of the embodiment 1 of this invention will be described.

(11) Description of the Whole Structure of the Embodiment 1

Figure 1:
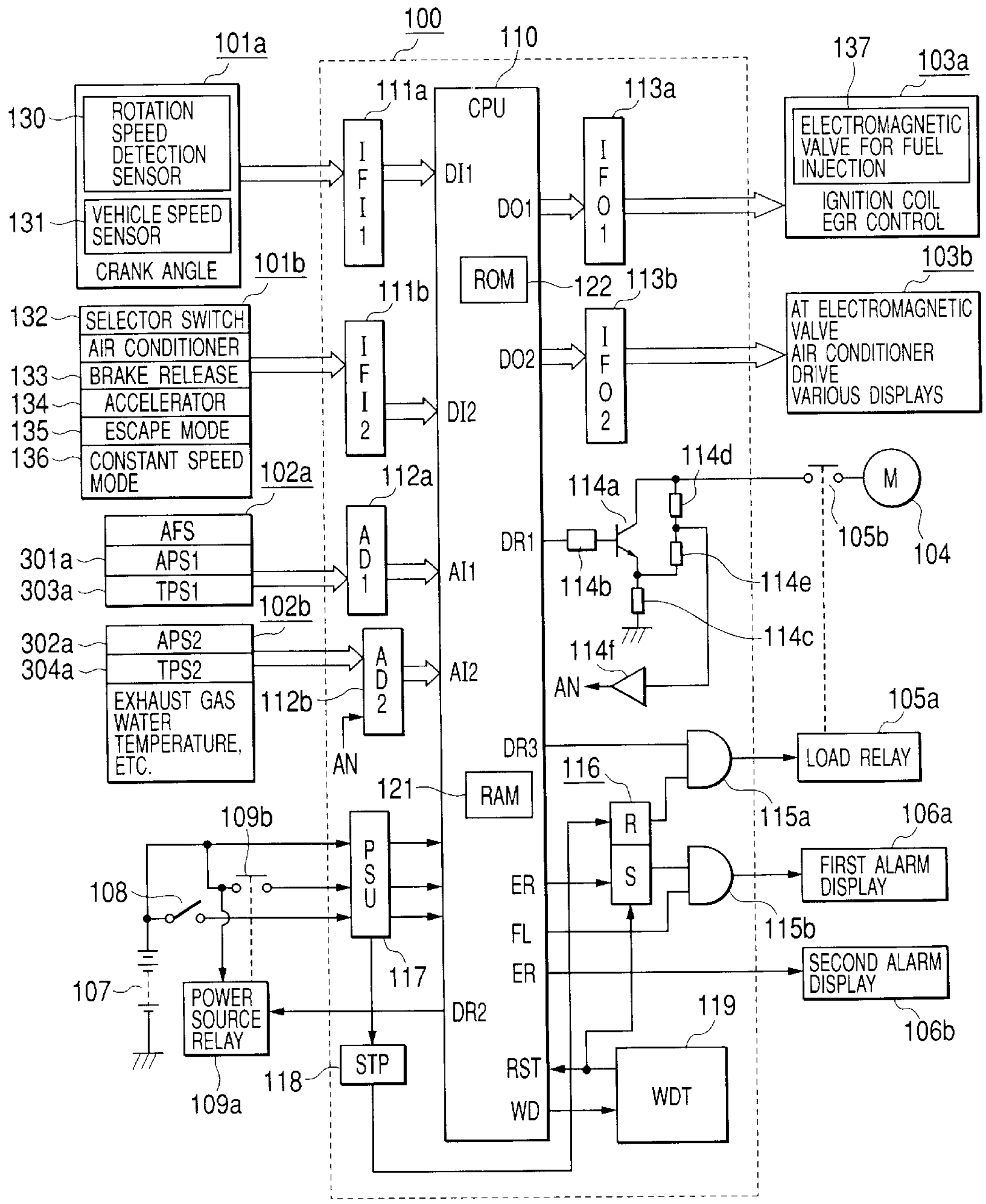
FIG. 1 is a block diagram of the whole structure of embodiment 1 of a vehicle engine control device of this invention.

First, a description will be given of FIG. 1 showing the whole structure of the embodiment 1.

A vehicle engine control device 100 shown in FIG. 1 is constituted by an electronic substrate contained in a not-shown sealed receptacle and is mainly composed of a microprocessor 110. This vehicle engine control device 100 is connected to an external input/output equipment through a not-shown connector.

The engine control device 100 includes plural input/output circuits disposed around the microprocessor 110. A first digital input sensor group 101*a*, a second digital input sensor group 101*b*, a first analog input sensor group 102*a*, and a second analog input sensor group 102*b* are provided at an input side of the microprocessor 110.

The first digital input sensor group 101*a* includes a rotation detection sensor 130 for detecting a rotational speed of an engine, a vehicle speed sensor 131 for detecting a vehicle speed of a vehicle, a crank angle sensor and the others. The second digital input sensor group 101*b* includes a selector switch 132 of a shift lever for a transmission, a brake release switch 133, an accelerator switch 134 for detecting a depression position of an accelerator pedal, an escape mode selection switch 135, and a constant speed mode selection switch 136, and also includes others such as an air conditioner switch.

The first analog input sensor group 102*a* includes an air flow sensor (AFS) for measuring an intake amount of a throttle valve, a first accelerator position sensor (APS1) 301*a* for measuring a depression degree of an accelerator pedal, a first throttle position sensor (TPS1) 303*a* for measuring a throttle valve opening degree, and the like. The second analog input sensor group 102*b* includes a second accelerator position sensor (APS2) 302*a*, a second throttle position sensor (TPS2) 304*a*, and others, such as an exhaust gas sensor and a water temperature sensor. The first and second accelerator position sensors 301*a* and 302*a*, and the first and second throttle position sensors 303*a* and 304*a* are doubly installed for safety.

A first electric load group 103*a*, a second electric load group 103*b*, a driving motor 104, a load relay 105*a*, a first alarm display 106*a*, and a second alarm display 106*b* are provided at an output side of the microprocessor 110.

The first electric load group 103*a* includes engine driving equipment, such as a fuel injection electromagnetic valve 137 for an engine, an ignition coil of the engine (in the case where the engine is a gasoline engine), and an electromagnetic valve (or a stepping motor) for exhaust gas recirculation (EGR) burning. The second electric load group 103*b* includes peripheral auxiliary machinery such as a gear changing electromagnetic valve of a transmission (AT), an air conditioner driving electromagnetic clutch, and various displays. The driving motor 104 is a motor for opening and closing an air supplying throttle valve, and the load relay 105*a* performs power supply/cutoff to the driving motor 104 by an output contact 105*b*. When this load relay 105*a* operates, a power source circuit of the driving motor 104 is closed.

Incidentally, in FIG. 1, reference numeral 107 designates an on-vehicle battery; 108, a power source switch, such as an ignition switch, connected to the on-vehicle battery; and 109*a*, a power source relay having an output contact 109*a* and fed by the on-vehicle battery 107.

A first input interface (IFI 1) 111*a*, a second input interface (IFI 2) 111*b*, a first analog/digital converter (AD 1) 112*a*, and a second analog/digital converter (AD 2) 112*b* are provided between the microprocessor 110 and the respective input sensor groups. The analog/digital converters 112*a* and 112*b* convert analog signals into digital signals.

The first input interface 111*a* is connected between the first digital input sensor group 111*a* and the microprocessor 110, and a first digital input signal group DI1 is inputted to the microprocessor 110 through the first input interface 111*a*.

The second input interface 111*b* is connected between the second digital input sensor group 101*b* and the microprocessor 110, and a second digital input signal group DI2 is inputted to the microprocessor 110 through this second input interface 111*b*.

The first A/D converter 112*a* is a multi-channel A/D converter connected between the first analog input sensor group 102*a* and the microprocessor 110, and a first AD conversion input signal group AI1 is inputted to the microprocessor 110 through this A/D converter 112*a*.

The second A/D converter 112*b* is a multi-channel A/D converter connected between the second analog input sensor group 102*b* and the microprocessor 110, and a second AD conversion input signal group AI2 is inputted to the microprocessor 110 through this A/D converter 112*b*.

A first output interface (IFO1) 113*a* and a second output interface (IFO2) 113*b* are provided between the microprocessor 110 and the respective output circuits.

The first output interface 113*a* is connected between a first digital output signal group DO1 of the microprocessor 110 and the first electric load group 103*a*, and the second output interface 113*b* is connected between a second digital output signal group DO2 of the microprocessor and the electric load group 103*b*. The first and second electric load groups 103*a* and 103*b* are switched on and off by the first and second digital output groups DO1 and DO2, respectively.

The microprocessor 110 generates a driving motor control signal output DR1. This driving motor control signal output DR1 carries out the on and off ratio control of an NPN transistor 114*a* through a drive resistor 114*b*. The driving motor 104 for opening and closing the throttle valve is connected to a collector terminal of this transistor 114*a* through an output contact 105*b* of the load relay 105*a*, and a current detection resistor 114*c* is connected to its emitter terminal.

Voltage dividing resistors 114*d* and 114*e* made of high resistors are connected between the collector terminal and the emitter terminal of the transistor 114*a*. The voltage dividing resistors 114*d* and 114*e* detect a breaking current value of the driving motor 104. A voltage dividing output point of the voltage dividing resistors 114*d* and 114*e* is connected to an input end of an amplifier 114*f*. This amplifier 114*f* amplifies an input signal from the voltage dividing output point of the voltage dividing resistors 114*d* and 114*e*, and the amplified output signal is taken into the microprocessor 110 through second A/D converter 112*b*.

The microprocessor 110 further generates a load relay drive signal output DR3, a severe abnormality detection output ER1, a slight abnormality detection output ER2, a flashing operation output FL, a watch dog signal output WD, and a power source relay drive signal output DR2, and receives a reset output RST.

A gate element 115*a* is connected between the load relay drive signal output DR3 and the load relay 105*a*. The severe abnormality detection output ER1 and the reset output RST are connected to a set circuit S of a flip-flop constituting an abnormality storage circuit element 116, and this abnormality storage circuit element 116 is set by the severe abnormality detection output ER1 and the reset output RST. A gate element 115*b* is connected between the set circuit S of the abnormality storage circuit element 116 and the first alarm display 106*a*.

The on-vehicle battery 107 is directly connected to a power source unit (PSU) 117, and supplies a sleep power to the power source unit 117. The power source unit 117 is connected to the on-vehicle battery 107 through the power source switch 108 as well, and also receives electric supply from the power source switch 108. Besides, the power source unit 117 is connected to the on-vehicle battery 107 through the output contact 109*b* of the power source relay 109*a*, and also receives electric supply from the output contact 109*b*. This power source unit 117 generates a stabilizing voltage for control, and supplies it to the microprocessor 110.

A power source detection circuit (STP) 118 is connected to the power source unit 117, and this power source detection circuit 118 detects the state of on and off of the power source switch 108. This power source detection circuit 118 is connected to a reset circuit R of the abnormality storage circuit element 116, the abnormality storage circuit element 116 is reset by the output of the power source detection circuit 118, and the output of the reset circuit R of the abnormality storage circuit element 116 becomes logical level H of the reset circuit R so that driving of the load relay 105*a* is enabled through the gate element 115*a*.

The watch dog signal WD of the microprocessor 110 is a pulse train generated by the microprocessor 110, and is given to a watch dog timer circuit (WDT) 119. This watch dog timer circuit 119 monitors the watch dog signal WD, and when a pulse width of the watch dog signal WD is abnormal, this circuit generates a reset output RST to restart the microprocessor 110, and sets the abnormality storage circuit element 116.

The power source relay drive signal output DR2 of the microprocessor 110 is given to the power source relay 109*a*. When the power source relay 109*a* is driven by this power source relay drive signal output DR2, the on-vehicle battery 107 and the power source unit 117 are connected to each other through the output contact 109*b*. Accordingly, even if the power source switch 108 is opened, electric supply to the power source unit 117 continues, and when the microprocessor 110 removes the power source relay drive signal output DR2, power supply other than the sleep power source is stopped.

The flashing operation output FL of the microprocessor 110 is supplied to the input of the gate element 115*b*. This flashing operation output FL causes the first alarm display 106*a* to carry out a flashing operation.

The slight abnormality detection output ER2 generated by the microprocessor 110 is directly supplied to the second alarm display 106*b*, and the second alarm display 106*b* is controlled by this slight abnormality detection output ER2 so as to carry out the continuous operation or flashing operation.

(12) Description of a Default Mechanism of Embodiment 1

Figure 2:
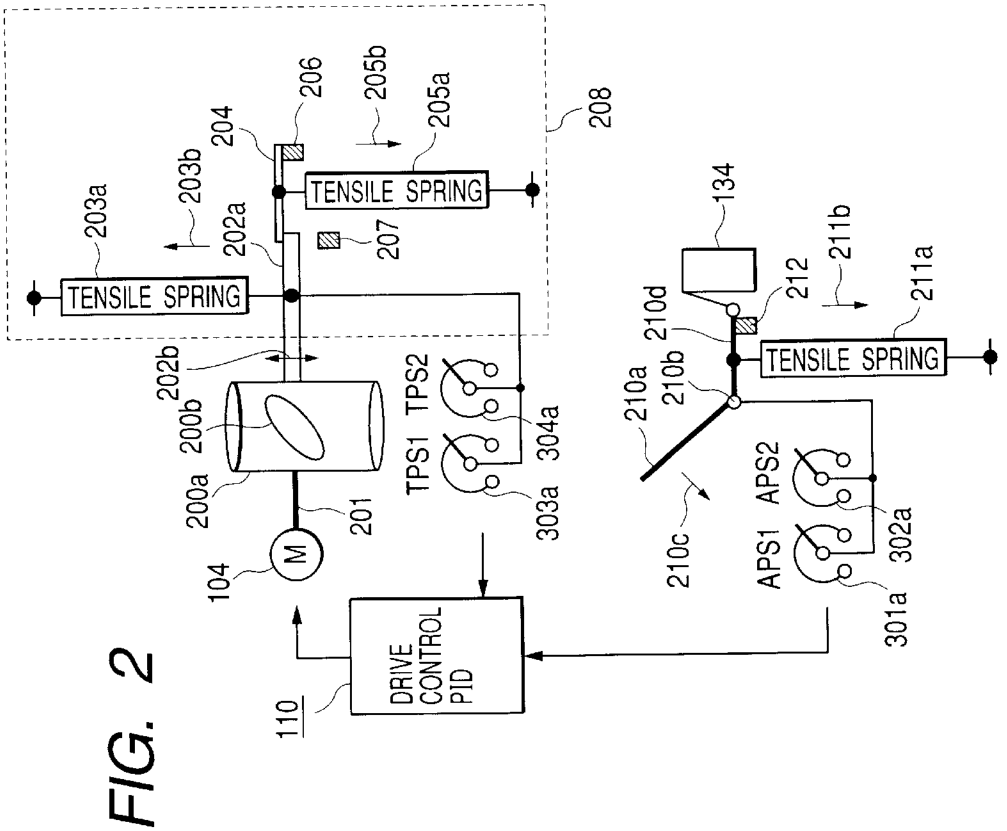
FIG. 2 is a mechanism view for explanation of an intake throttle and an accelerator pedal of the embodiment 1.

Next, a description will be given of FIG. 2 showing a default mechanism view in the embodiment 1. In FIG. 2, reference numeral 200*a* designates an intake throttle of a vehicle engine, which includes a throttle valve 200*b*. The microprocessor 110 is shown at the left side of the drawing. This microprocessor 110 drives the driving motor 104 to open and close the throttle valve 200*b*. Reference numeral 201 designates a rotating shaft of the driving motor 104, which is coupled to the throttle valve 200*b*. Reference numeral 202*a* designates an angular motion part linked with the rotating shaft 201 of the driving motor 104. Although this angular motion part 202*a* actually carries out an angular motion in accordance with the rotation of the rotating shaft 201, for convenience, it is shown to move in the vertical direction indicated by an arrow 202*b* in accordance with the rotation of the rotating shaft 201.

The angular motion part 202*a* constitutes a motion portion of a default position return mechanism 208. This default position return mechanism 208 includes a tensile spring 203*a*, a return member 204, a tensile spring 205*a*, a default stopper 206, and an idle stopper 207. The tensile spring 203*a* is provided between the angular motion part 202*a* and a fixed portion, and urges the angular motion part 202*a* toward a valve opening direction indicated by an arrow 203*b*. The return member 204 is urged toward a valve closing direction indicated by an arrow 205*b* by the tensile spring 205*a*, and the tensile spring 205*a* overcomes the tensile spring 203*a* to return the angular motion part 202*a* in the valve closing direction. The default stopper 206 restricts the return position of the return member 204. When the return member 204 further drives the angular motion part 202*a* in the valve closing direction from a state where it is returned to the position of the default stopper 206, the angular motion part 202*a* comes in contact with the idle stopper 207. The driving motor 104 controls the valve opening degree against the tensile spring 203*a* at a position from the default position where the return member 204 comes in contact with the default stopper 206 to the position where it comes in contact with the idle stopper 207, and with respect to the valve opening operation exceeding the default position, the driving motor cooperates with the tensile spring 203*a* to carry out the valve opening control against the tensile spring 205*a*.

Accordingly, when the power source of the driving motor 104 is switched off, the angular motion part 202*a* carries out the valve closing or valve opening operation by the actions of the tensile springs 205*a* and 203*a* to the position where it is restricted by the default stopper 206, and this becomes a valve opening position for escape driving at the time of an abnormality.

However, it is necessary to imagine such a case that when an actuator abnormality occurs in which it is impossible to return to an objective default position because of an abnormality of a gear mechanism or the like, lock occurs at a very large valve opening position.

Incidentally, first and second throttle position sensors TPS1 and TPS2 are disposed to detect the operation position of the angular motion part 202*a*, that is, the valve opening degree of the throttle valve 200*b*, and their detection output signals are inputted to the microprocessor 110.

Besides, in FIG. 2, reference numeral 210*a* designates an accelerator pedal of the vehicle. This accelerator pedal 210*a* is depressed in a depression direction indicated by an arrow 210*c* with a fulcrum 210*b* as the center. A coupling member 210*d* is coupled to the accelerator pedal 210*a*. This coupling member 210*d* is urged toward a direction of an arrow 211*b* by a tensile spring 211*a*, and drives the accelerator pedal 210*a* in a return direction. A return position of the accelerator pedal 210*a* is restricted by a pedal stopper 212 for restricting the coupling member 210*d*. An accelerator switch 134 is linked with the coupling member 210*d*, and detects that the accelerator pedal 210*a* is not depressed and is returned to the position of the pedal stopper 212 by the tensile spring 211*a*. First and second accelerator position sensors APS1 and APS2 are disposed to detect a depression degree of the accelerator pedal 210*a*, and their detection main signals are inputted to the microprocessor 110.

Incidentally, although a direct current motor, a brushless motor, a stepping motor or the like can be used as the driving motor 104, here, it is handled as a direct current motor subjected to an on-off ratio control, and the control is carried out by the microprocessor 110 in the engine control device 100.

(13) Description of a Control Block of Normal Driving and Slightest Abnormality Driving of Embodiment 1

Figure 3:
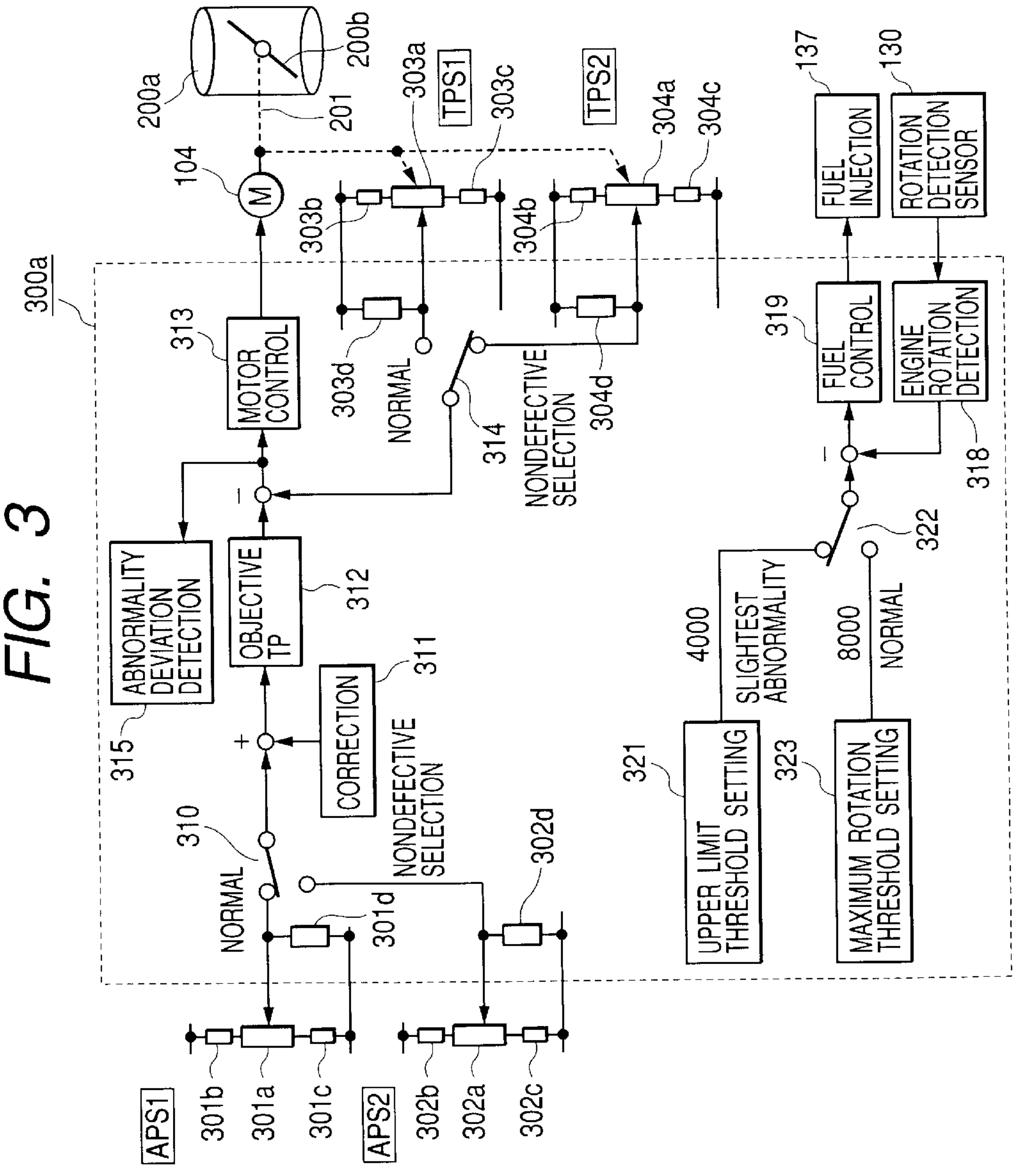
FIG. 3 is a block diagram of slightest abnormality escape running control of the embodiment 1.

Next, a description will be given of FIG. 3 showing a control block diagram of normal driving and slightest abnormality escape driving in the embodiment 1.

In FIG. 3, the accelerator position sensors 301*a* and 302*a* linked with the accelerator pedal 210*a* are designated by reference characters APS1 and APS2, and the first and second throttle position sensors 303*a* and 304*a* linked with the throttle valve 200*b* are designated by reference characters TPS1 and TPS2.

The accelerator position sensor APS1 is constructed such that a series circuit of a positive side resistor 301*b*, a variable resistor 301*a*, and a negative side resistor 301*c* is connected between positive and negative power source lines of a DC 5 V power source, and a detection output is extracted from a sliding terminal of the variable resistor 301*a*. Similarly, the accelerator position sensor APS2 is constructed such that a series circuit of a positive side resistor 302*b*, a variable resistor 302*a*, and a negative side resistor 302*c* is connected between positive and negative power source lines of a DC 5V power source, and a detection output is extracted from a sliding terminal of the variable resistor 302*a*.

The throttle position sensor TPS1 is constructed such that a series circuit of a positive side resistor 303*b*, a variable resistor 303*a*, and a negative side resistor 303*c* is connected between positive and negative power source lines of a DC 5 V power source, and a detection output is extracted from a sliding terminal of the variable resistor 303*a*. Similarly, the throttle position sensor TPS2 is constructed such that a series circuit of a positive side resistor 304*b*, a variable resistor 304*a*, and a negative side resistor 304*c* is connected between positive and negative power source lines of a DC 5V power source, and a detection output is extracted from a sliding terminal of the variable resistor 304*a*.

By this structure, a normal state is such that the output voltages of the respective accelerator position sensors APS1 and APS2 and throttle position sensors TPS1 and TPS2 are, for example, 0.2 to 4.8 (V). However, when there occurs a disconnection of a wiring line, a short circuit, poor contact of a variable resistor, or the like, a voltage outside of the above range can be outputted.

A control block of first throttle escape control means as slightest abnormality escape running means is designated by reference character 300*a*. This control block 300*a* includes a control system for the driving motor 104 in the upper stage of FIG. 3. The control system for the driving motor 104 includes pull-down resistors 301*d* and 302*d*, pull-up resistors 303*d* and 304*d*, a first non-defective unit selection switch 310, a driving correction block 311, objective throttle valve opening degree setting means 312, PID control means 313 for the driving motor 104, a second non-defective unit selection switch 314, and abnormality deviation detection means 315.

The pull-down resistors 301*d* and 302*d* pull down an input signal voltage to zero when the disconnection of a detection signal line or the poor contact of the variable resistors 301*a* 302*a* occurs. The pull-up resistors 303*d* and 304*d* pull up an input signal voltage to 5 V when the disconnection of a detection signal line or the poor contact of the variable resistors 303*a* and 304*a* occur.

Figure 5:
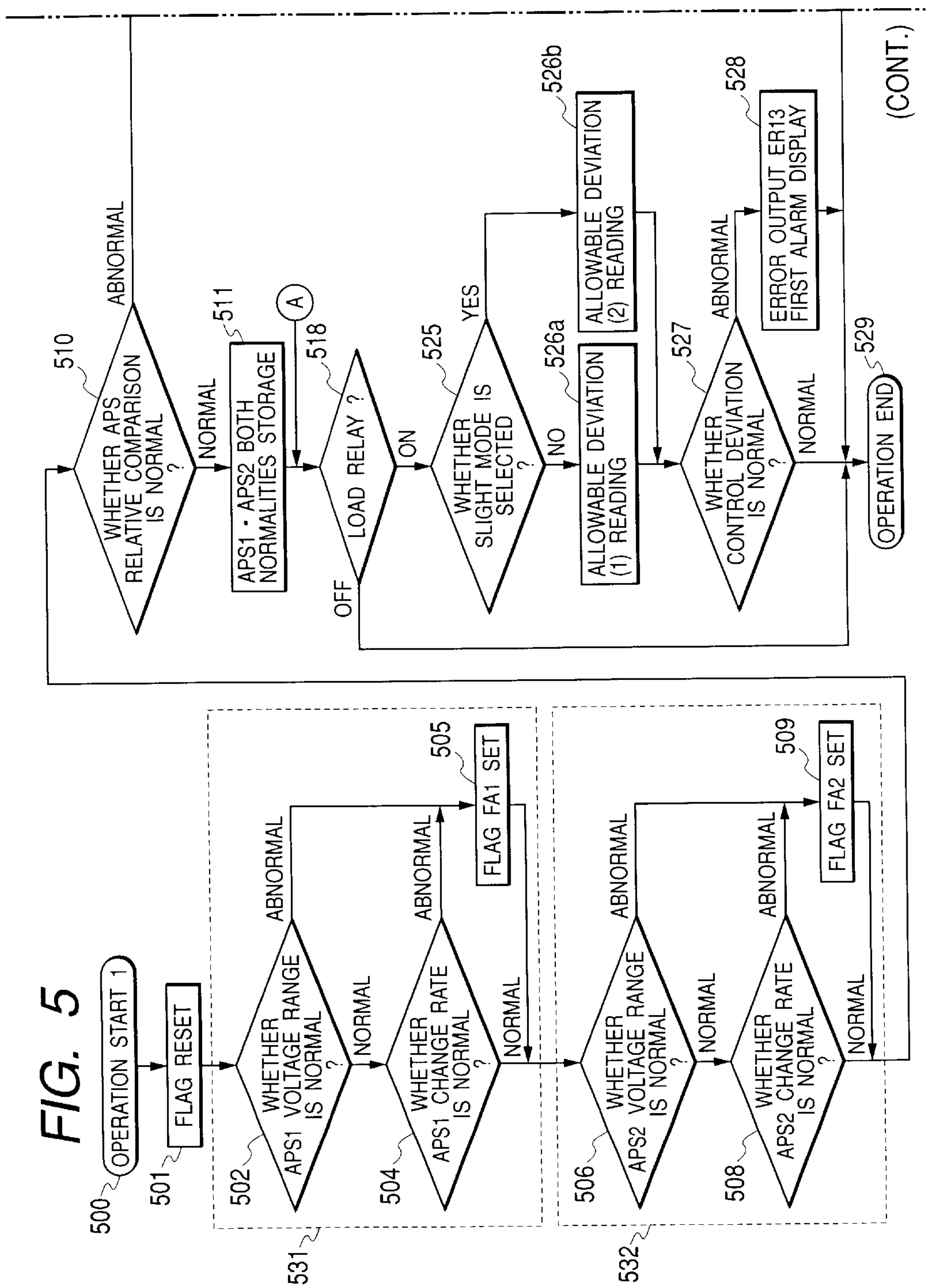
FIG. 5 is a flowchart of abnormality detection of an accelerator position sensor of the embodiment 1.

The first non-defective unit changeover switch 310 is a non-defective unit changeover switch corresponding to first non-defective sensor detection means 533 shown in FIG. 5, and when both the accelerator position sensors APS1 and APS2 are non-defective units, this non-defective unit changeover switch selects the accelerator position sensor APS1, and when one of the accelerator position sensors APS1 and APS2 is a non-defective unit, it selects the non-defective unit.

The operation correction block 311 of the control block 300*a* calculates an increase/decrease correction value and outputs it. This increase/decrease correction value is corrected in accordance with a case where an increase of fuel supply is desired to raise an idle rotational speed of the engine when an air conditioner is used in the vehicle or the cooling water temperature of the engine is low, or to improve acceleration characteristics when the accelerator pedal 210*a* is quickly depressed, or in accordance with a case where suppression of fuel is desired at the time of stable constant speed driving.

The objective throttle valve opening degree setting means 312 of the control block 300*a* generates a signal voltage in which the increase/decrease correction value calculated by the driving correction block 311 is algebraically added to the output signal voltage of the accelerator position sensor APS1 corresponding to the depression degree of the accelerator pedal 210*a*.

The PID control part 313 of the control block 300*a* is drive control means for carrying out the on/off ratio control of the driving motor 104 so that the output signal voltage of the throttle position sensor TPS1 corresponding to the actual throttle valve opening degree coincides with the signal voltage of the objective throttle valve opening degree setting means 312.

Figure 6:
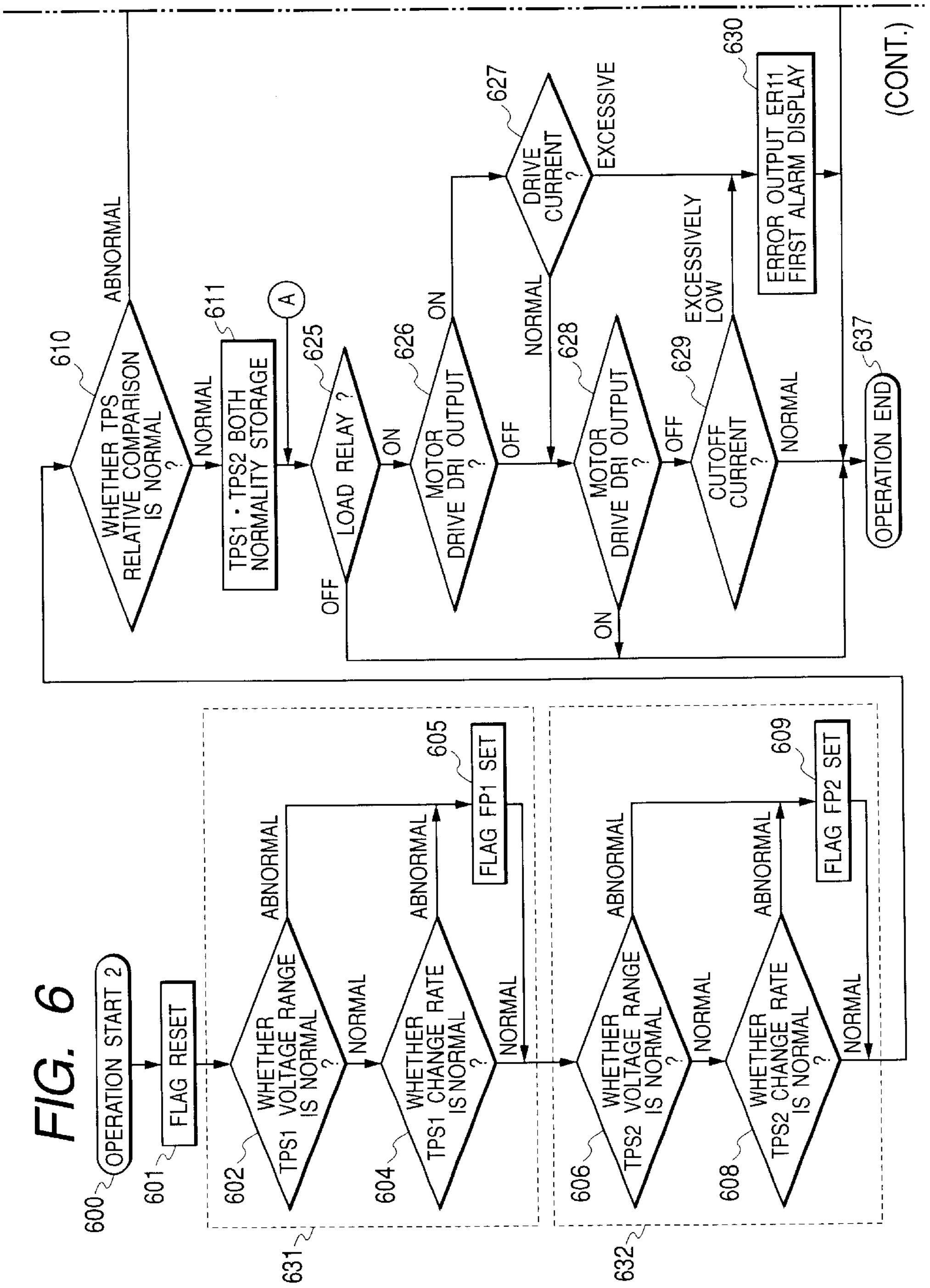
FIG. 6 is a flowchart of abnormality detection of a throttle position sensor of the embodiment 1.

The second non-defective unit selection switch 314 of the control block 300*a* is a changeover switch corresponding to second non-defective sensor detection means 633 shown in FIG. 6. When both the throttle position sensors TPS1 and TPS2 are non-defective units, this second non-defective unit changeover switch 314 selects the throttle position sensor TPS1, and when one of the throttle position sensors TPS1 and TPS2 is a non-defective unit, the non-defective unit is selected.

The abnormality deviation detection means 315 of the control means 300*a* obtains a deviation between a signal voltage of the objective throttle valve opening degree setting means 312 and an actual measurement throttle valve opening degree, that is, an output voltage of the throttle position sensor TPS1 or TPS2, and generates a severe abnormality detection output when this deviation constantly has a divergence of a predetermined value or higher. The details of the abnormality deviation detection means 315 are shown in step 527 of FIG. 5 and will be described later.

A control system for fuel injection to the engine is provided at the lower stage of the control means 300*a* of FIG. 3. This control system of fuel injection includes engine rotational speed detection means 318, fuel injection control means 319, upper limit rotation threshold setting means 321, slightest abnormality changeover switch 322, and maximum rotation threshold setting means 323.

The rotational speed detection means 318 calculates on/off signal density from the engine rotation detection sensor 130 included in the first digital input sensor group 101*a* of FIG. 1, and detects the engine rotational speed. The fuel injection control means 319 drives the fuel injection electromagnetic valve 137 and supplies a fuel of a suitable air fuel ratio to the engine. This fuel injection control means 319 includes engine rotation suppression means for suppressing fuel supply to the fuel injection electromagnetic valve 137 so that an actual engine rotational speed based on the engine rotation detection sensor 130 becomes an objective upper limit rotational speed or lower.

The upper limit threshold setting means 321 sets an upper limit rotation threshold value of, for example, 4000 (r/min). The maximum rotation threshold setting means 323 sets a maximum rotation threshold value of, for example, 8000 (r/min). The slightest abnormality changeover switch 322 operates correspondingly to slightest abnormality detection means described in detail at step 524 shown in FIG. 5 and step 624 shown in FIG. 6, and it is changed over to the position shown in the drawing in at least one of a case where one of the pair of accelerator position sensors TPS1 and TPS2 is abnormal, and a case where one of the throttle position sensors TPS1 and TPS2 is abnormal, and the upper limit object of the engine rotational speed is made the engine rotational speed set by the upper limit threshold setting means 321.

In the case where all of the accelerator position sensors APS1 and APS2 and the throttle position sensors TPS1 and TPS2 are normal, the slightest abnormality changeover means 322 is changed over from the illustrated position and the upper limit object of the engine rotational speed is made the engine rotational speed set by the maximum rotation threshold setting means 323.

(14) Description of a Control Block of Severe Abnormality Escape Running of Embodiment 1

Figure 4:
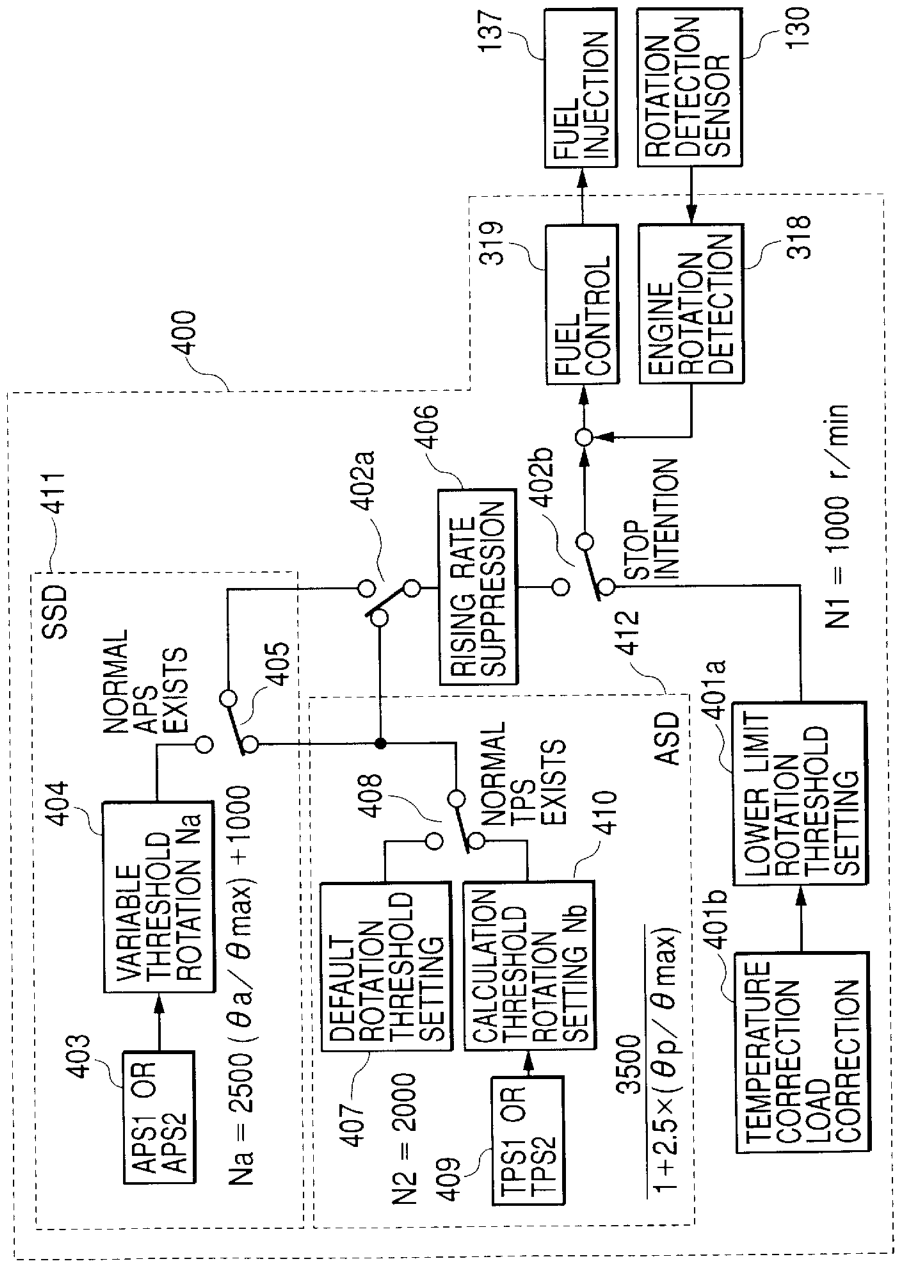
FIG. 4 is a block diagram of severe abnormality escape running control of the embodiment 1.

Next, a description will be given of FIG. 4 showing a severe abnormality escape running control block diagram of the embodiment 1. In FIG. 4, a control block of severe abnormality escape running means is designated by reference numeral 400. This control block 400 includes first driving object rotation setting means 411 and second driving object rotation setting means 412, and further includes lower limit rotation threshold setting means 401*a*, a lower limit rotation speed correction means 401*b*, and changeover switches 402*a* and 402*b*.

The lower limit rotation threshold setting means 401*a* is setting means for setting the engine to a lower limit rotational speed N1 at which continuous rotation is possible, and this lower limit rotational speed N1 is set to, for example, 1000 (r/min). The lower limit rotational speed correction means 401*b* is correction means for correcting the lower limit rotational speed N1 by the lower limit threshold setting means 401*a* in accordance with the temperature of engine cooling water or the temperature of outer air, or in accordance with a state as to whether a heavy load such as an air conditioner is driven. As described later with reference to FIG. 7, the changeover switch 402*a* is selection means which operates in accordance with whether the selection position of the transmission has been once put into the parking position (P position) after the occurrence of an abnormality, and when it has not been put into the parking position (P position), the changeover switch is changed over to the illustrated position of FIG. 4, and selects the escape driving mode. When driving intention confirmation means 709 described later with reference to FIG. 7 judges a stop intention, the changeover switch 402*b* is changed over to the illustrated position of FIG. 4, and makes the objective engine rotational speed the lower limit rotational speed N1 by the lower limit threshold setting means 401*a*.

The first driving object rotation setting means 411 includes APS signal output means 403, variable threshold rotation calculation means 404, and a changeover switch 405. The APS signal output means 403 outputs detection output of the accelerator position sensor APS1 or APS2 regarded as being normal. The variable threshold rotation calculation means 404 is calculation means of a variable threshold rotational speed Na calculated as a value substantially proportional to the detection output from the APS signal output means 403, and this variable threshold rotational speed Na is calculated according to the following expression (1).

$$Na = 2500(\theta a/\theta\ \max)+1000\ [r/\text{min}] \quad (1)$$

Where,

θa=a present depression degree of an accelerator pedal=0 to θ max,

θ max=a maximum depression angle of an accelerator pedal.

The changeover switch 405 is a setting changeover switch based on the existence of a normal APS signal described later with reference to FIG. 5. This setting changeover switch 405 is connected to rising rate suppression means 406 through the changeover switch 402*a*, and this rising rate suppression means 406 is further connected to a fuel injection control means 319 through the changeover switch 402*b*. In the state where (a) the changeover switch 402*a* is changed over from the illustrated position to select an escape driving mode, (b) the changeover switch 402*b* is changed over from the illustrated position according to the judgment of the driving intention, and (c) the normal APS signal exists and the setting changeover means 405 is changed over from the illustrated position, the variable threshold rotational speed Na set by the variable threshold setting means 404 is given to the fuel injection control means 319 as the objective engine rotational speed, and fuel injection control by this fuel injection control means 319 is carried out.

However, the rising rate suppression means 406 suppresses a rapid rise of the variable threshold rotational speed Na so that the objective engine rotational speed does not rapidly rise.

Besides, the actual rotational speed of the engine is greatly changed by the magnitude of an actual opening degree of the throttle valve the operation of which is stopped, in addition to a load state such as climbing a slope or descending a slope, and for example, in the case where the throttle valve opening degree is small and climbing running is carried out, since engine output is insufficient, the engine rotational speed according to the expression (1) can not be obtained.

However, when the throttle valve opening degree is abnormally large, or descending running is carried out, fuel injection control is carried out so that the engine rotational speed does not become excessive and the engine rotational speed according to the expression (1) becomes the upper limit rotational speed.

Now, means for carrying out escape running by giving the variable threshold rotational speed Na set by the variable threshold setting means 404 of the first driving objective rotation setting means 411 as the objective engine rotational speed to the fuel injection control means 319 is called selective shift escape running means SSD. In this selective shift escape running means SSD, the engine rotational speed is controlled so that it becomes a rotational speed not larger than the variable threshold rotational speed Na substantially proportional to the depression degree of the accelerator pedal, and becomes not less than the lower limit threshold rotation N1 set by the lower limit rotation threshold setting means 401*a*, and escape driving against the severe abnormality is carried out.

The second driving object rotation setting means 412 includes TPS signal output means 409, calculation threshold rotation setting means 410, default rotation threshold setting means 407, and a changeover switch 408.

The TPS signal output means 409 is detection output means of the throttle position sensor TPS1 or TPS2 regarded as being normal. The calculation threshold rotation setting means 410 is setting means of a calculation threshold rotational speed Nb calculated as a value substantially in inverse proportion to the detection output from the TPS signal output means 409, and this calculation threshold rotational speed Nb is calculated according to the following expression (2).

$$Nb = 3500/[1+2.5\times(\theta p/\theta\ \max)]\ [r/min] \quad (2)$$

Where,

θp=present throttle valve opening degree=0 to θ max

θ max=full throttle valve opening degree.

Incidentally, although the present throttle valve opening degree θp originally corresponds to the default return position by the default position return mechanism 208, the expression is obtained after consideration is given also to the assumption that a valve is locked to an unspecified valve opening position by a mechanical abnormality.

Figure 11A:
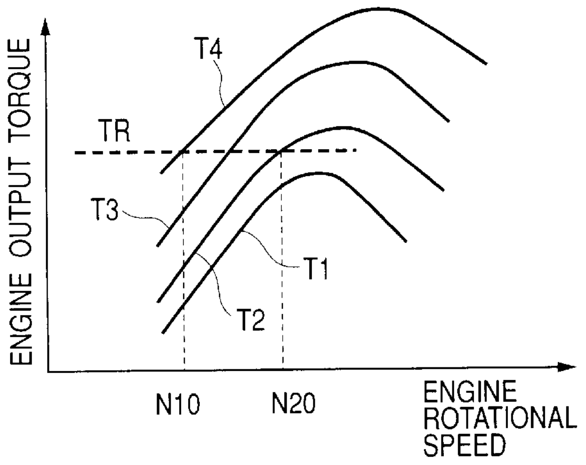
FIGS. 11(*a*) to 11(*c*) are operation explanatory characteristic diagrams in the embodiments 1 to 4.

Besides, calculation of rotational speed by the calculation threshold rotation setting means 410 is based on engine torque characteristics of FIG. 11A. FIG. 11A shows engine torque characteristics by four curves T1 to T4, in which the horizontal axis indicates engine rotational speed and the vertical axis indicates engine output torque. The four curves T1 to T4 showing the engine torque characteristics are convex substantially quadratic curves, the curve T1 indicates the characteristic when the throttle valve opening degree is small, the curve T4 indicates the characteristic when the throttle valve opening degree is large, and the throttle valve opening degree becomes large from the curve T1 to the curve T4. As is apparent from, the curves T1 to T4, the maximum engine torque becomes large as the throttle valve opening degree becomes large.

Especially in a region where the engine rotational speed is low, the engine output torque is substantially proportional to the engine rotational speed.

Figure 11B:
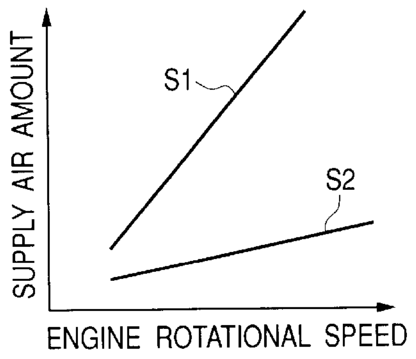

Accordingly, if the engine rotational speed is controlled to a low engine rotational speed N10 when the throttle valve opening degree is large, and if it is controlled to a large engine rotational speed N20 when the throttle valve opening degree is small, the output torque of the engine is controlled to the level of a horizontal line TR of FIG. 11(*a*).

The above expression (2) indicates the upper limit rotational speed for approximately obtaining the constant output torque TR, and this output torque is selected to such a level that the vehicle can be easily stopped by the depression of a brake pedal, and if the brake pedal is released, low load driving of the vehicle becomes possible.

The default rotation threshold setting means 407 sets a default rotation threshold value N2, and this default rotation threshold N2 is set to, for example, N2=2000 (r/min) The changeover switch 408 is a setting changeover switch changed over on the basis of the existence of a normal throttle position sensor TPS described later with reference to FIG. 6. In a state where (a) the changeover switch 402*b* judges a driving intention and is changed over from the illustrated position, (b) the changeover switch 402*a* is in the escape driving mode and is changed over from the illustrated position, and (c) a non-defective accelerator position sensor APS does not exist and the changeover switch 405 is in the illustrated position, the engine rotational speed Nb or N2, which is set according to the changeover position of the changeover switch 408 operating correspondingly to the existence of the non-defective throttle position sensor TPS and by the calculation threshold rotation setting means 410 or the default rotation threshold setting means 407, is made the objective engine rotational speed, and the fuel injection control by the fuel injection control means 319 is carried out. Besides, even in a state where (a) the changeover switch 402*b* judges a driving intention and is changed over from the illustrated position, and (b) the changeover switch 402*a* is in the illustrated position, similarly, the engine rotational speed Nb or N2, which is set according to the changeover position of the changeover switch 408 operating correspondingly to the existence of the non-defective throttle position sensor TPS and by the calculation threshold rotation setting means 410 or the default rotation threshold setting means 407, is made the objective engine rotational speed, and the fuel injection control by the fuel injection control means 319 is carried out.

However, suppression is performed by the rising rate suppression means 406 so that the objective engine rotational speed does not suddenly rise.

Now, means for carrying out escape running by giving the calculation threshold rotational speed Nb or the default rotation threshold N2 set by the second driving object rotation setting means 412 as an objective engine rotational speed to the fuel injection control means 319 is called automatic shift escape running means ASD in this invention. In this automatic shift escape running means ASD, the control is carried out so that the engine rotational speed is a rotational speed not higher than the calculation threshold rotational speed Nb or the default threshold rotational speed N2, and becomes not lower than the lower limit threshold rotation N1 set by the lower limit rotation threshold setting means 401*a*, and the escape driving against a severe abnormality is carried out.

Both the first operation object rotation setting means 411 constituted by the APS signal output means 403, the variable threshold rotation calculation means 404, and the changeover switch 405, and the second operation object rotation setting means 412 constituted by the TPS output means 409, the calculation threshold rotation setting means 410, the default rotation threshold setting means 407, and the changeover switch 408 set the driving object rotations. The fuel injection control means 319 carries out fuel injection control so that the rotation speed does not become at least the objective rotational speed or higher, while monitoring the objective rotational speeds set by these driving object rotation setting means 411 and 412 and the engine rotational speed detected by the engine rotational speed detection means 318, and carries out the fuel injection control so as to increase the engine output as much as possible when the engine rotational speed is insufficient.

(2) Detailed Description of Function and Operation of Embodiment 1

Next, the details of the function and operation of the embodiment 1 will be described.

(21) Description of Function and Operation Attendant on Abnormality in Relation to Accelerator Position Sensor (APS) of Embodiment 1

First, in the embodiment 1 shown in FIG. 1, the operation of the microprocessor 110 will be described with reference to FIG. 5 showing an abnormality detection flowchart in relation to the accelerator position sensor (APS). Incidentally, it should be understood that respective steps in the flowchart of FIG. 5 constitute means.

In FIG. 5, step 500 is an operation start step periodically activated, and step 501 is executed subsequently to this operation start step 500 and is a flag reset step for resetting flags FA1 and FA2 described later. The step 502 is executed subsequently to the step 501 and is a step of judging an abnormality of an output voltage range of the accelerator position sensor APS1, and at this judgment step 502, when the output voltage of the accelerator position sensor APS1 is 0.2 to 4.8 (V), a judgment of normality is made, and when it varies from this normal value range, a judgment of abnormality is made. The abnormality of this accelerator position sensor APS1 includes disconnection of a detection signal line, poor contact, and short circuit error contact with positive and negative power source lines or other different voltage wiring lines, and the existence of these abnormalities is judged at the step 502.

Step 504 is a step for making an abnormality judgment relating to an output voltage change rate of the accelerator position sensor APS1 when the judgment of normality is made at the step 502. In the abnormality judgment at this step 504, the change rate of the output voltage of the accelerator position sensor APS1 is measured on the basis of a difference between the previously read output voltage of the accelerator position sensor APS1 and the presently read output voltage of the accelerator position sensor APS1. When the change rate of this output voltage becomes a large value which can not be obtained normally, the output voltage is regarded as having been suddenly changed, and the judgment of abnormality is made. This abnormality means an abnormality due to the disconnection of a detection signal line, poor contact, or short circuit error contact with positive and negative power source lines or other different voltage wiring lines. If the change rate of the output voltage is within a normal range, the step 504 makes the judgment of normality.

Step 505 is a step of setting a flag FA1 when the judgment of abnormality is made at the step 502 or the step 504.

Step 506, step 508 and step 509 make a judgment as to whether the accelerator position sensor APS2 is normal or abnormal, similarly to the step 502, the step 504 and the step 505.

The step 506 is a judgment step of an abnormality of an output voltage range of the accelerator position sensor APS2, and at this judgment step 502, when the output voltage of the accelerator position sensor APS2 is 0.2 to 4.8 (V), a judgment of normality is made, and when it varies from this normal value range, a judgment of abnormality is made. The abnormality of the accelerator position sensor APS2 includes disconnection of a detection signal line, poor contact, short circuit error contact with positive and negative power source lines or other different voltage wiring lines, and at the step 506, the existence of these abnormalities is judged.

The step 508 is a step of making abnormality judgment relating to the output voltage change rate of the accelerator position sensor APS2 when the step 506 judges that the accelerator position sensor APS2 is normal. In the abnormality judgment at this step 508, the change rate of the output voltage of the accelerator position sensor APS2 is measured on the basis of a difference between the previously read output voltage of the accelerator position sensor APS2 and the presently read output voltage of the accelerator position sensor APS2. When the change rate of this output voltage becomes a large value which can not be obtained normally, the output voltage is regarded as having been suddenly changed, and it is judged that there occurs an abnormality due to disconnection of a detection signal line, poor contact, or short circuit error contact with positive and negative power source lines or other different voltage wiring lines. When the change rate of the output voltage is within the normal range, the step makes the judgment of normality.

The step 509 is a step of setting the flag FA2 when the judgment of abnormality is made at the step 506 or the step 508.

Reference numeral 531 designates a step block constituted by the steps 502, 504 and 505, and this constitutes the first individual abnormality detection means for detecting the abnormality relating to the accelerator position sensor APS1. Reference numeral 532 designates a step block constituted by the steps 506, 508 and 509, and constitutes the first individual abnormality detection means for detecting the abnormality relating to the accelerator position sensor APS2. In the first individual abnormality detection means 531, when the step 504 judges that the accelerator position sensor APS1 is normal, or when the flag FA1 is set at the step 505, the first individual abnormality detection means 532 is executed.

Step 510 is a first relative abnormality detection step, and this step 510 is executed when the step 504 judges that the accelerator position sensor APS1 is normal, or the step 505 sets the flag FA1, and then, the step 508 judges that the accelerator position sensor APS2 is also normal, or the step 509 sets the flag FA2. At this first relative abnormality detection step 510, a relative comparison is carried out as to whether or not both the output voltages of the accelerator position sensors APS1 and APS2 coincide with each other within a predetermined error, and if the difference between both the output voltages is within the predetermined error range, a judgment of normality is made, and if not, a judgment of abnormality is made. Step 511 is a storage step, and constitutes storage means. This storage step 511 is executed when the judgment of normality is made at the step 510, and stores that both the accelerator position sensors APS1 and APS2 are normal.

Step 512 is a judgment step and is executed when a judgment of abnormality is made at the step 510, and it is judged whether or not the flag FA1 is set at the step 505. When the flag FA1 is set, a judgment of YES is made, and when the flag FA1 is not set, a judgment of NO is made. When the judgment of YES is made at the step 512, it proceeds to step 514, and if the step 512 makes the judgment of NO, it proceeds to step 513. At both the steps 513 and 514, it is judged whether or not the flag FA2 is set at the step 509, and if the flag FA2 is set, a judgment of YES is made, and if it is not set, a judgment of NO is made. Step 515 is a step of storing that both the accelerator position sensors APS1 and APS2 are abnormal, and constitutes storage means of both abnormality of the accelerator position sensors APS1 and APS2. This step 515 is executed when both the step 512 and the step 514 make the judgment of YES (when both the accelerator position sensors APS1 and APS2 are individually abnormal), or when both the steps 512 and 513 make the judgment of NO (although both the accelerator position sensors APS1 and APS2 are not individually abnormal, when they are relatively abnormal), and stores the both abnormality of the accelerator position sensors APS1 and APS2. Step 519 is a step executed subsequently to the step 515, and at this step 519, the second error output ER12 is generated and the abnormality storage element 116 of FIG. 1 is set. Step 520 is a step executed subsequently to the step 519, and causes the first alarm display 106*a* of FIG. 1 to carry out a flashing operation.

Step 516 is a step executed when the step 510 makes the judgment of abnormality, the step 512 makes the judgment of YES (individual abnormality of the accelerator position sensor APS1), and the step 514 makes the judgment of NO (accelerator position sensor APS2 is not individually abnormal). This step 516 selects and stores the accelerator position sensor APS2, and resets the memory of the step 511. Step 517 is a step executed when the step 512 makes the judgment of abnormality, the step 512 makes the judgment of NO (the accelerator position sensor APS1 is not individually abnormal), and the step 513 makes the judgment of YES (the accelerator position sensor APS2 is individually abnormal). This step 517 selects and stores the accelerator position sensor APS1, and resets the memory of the step 511. Reference numeral 533 designates a block constituted by the step 516 and the step 517, and constitutes first non-defective sensor detection means.

Incidentally, the step 515 constitutes detection means of both abnormality of the accelerator position sensors APS1 and APS2, and when the both abnormality of the accelerator position sensors is stored at this step 515, the memory information stored at the steps 511, 516 and 517 is reset, and the memory state of this step 515 is not reset until the power source is switched off.

Besides, the memory states of the step 511, the step 516 and the step 517 are also reset when the power source is switched off.

Step 521 is a step executed subsequently to the step 516, and issues a substitute APS use instruction so that an output signal of the accelerator position sensor APS2 is used instead of the accelerator position sensor APS1. Step 522 is a step executed subsequently to the step 517, and issues an APS1 continuous use instruction so that an output signal of the accelerator position sensor APS1 is continuously used. Step 523 is a step of judging a duplicate selection abnormality, and in the case where the step 516 and the step 517 respectively select and store the accelerator position sensors APS2 and APS1, a judgment of YES is made, it proceeds to step 515, and both abnormality is stored. When the step 523 makes a judgment of NO, that is, in the case where the step 516 and the step 517 select only one of the accelerator position sensors, it proceeds to step 524 to generate a fifth error output ER21, and the second alarm display 106*b* of FIG. 1 is actuated or a slightest escape driving mode is selected.

Step 518 is a judgment step executed subsequently to the step 524, and judges the on and off states of the load relay 105*a* of FIG. 1. The step 518 makes a judgment of ON when the load relay 105*a* is in the on state, and makes a judgment of OFF when the load relay 105*a* is in the off state. Step 525 is a judgment step executed when the step 518 makes the judgment of ON, and judges whether or not a slight mode is selected and stored at step 636 described later with reference to FIG. 6. If the slight mode is selected, a judgment of YES is made at the step 525, and if not, a judgment of NO is made. Step 526*a* is a step executed when the judgment of NO is made at the step 525, that is, the slight mode is not selected, and selects a predetermined allowable deviation concerning the abnormality deviation detection means 315 in the state shown in FIG. 3. Step 526*b* is a step executed when the judgment of YES is made at the step 525, that is, the slight mode is selected, and selects a predetermined allowable deviation concerning the abnormality deviation detection means 315 in a state shown in FIG. 9. Step 527 is a step of comparing the allowable deviation read at the step 526*a* or the step 526*b* with an actual control deviation, and if the actual control deviation is within the allowable deviation, a judgment of normality is made, and if not, a judgment of abnormality is made. Step 528 is a step executed when the step 527 makes the judgment of abnormality, generates a third error signal output ER13, sets the abnormality storage element 116 of FIG. 1, and activates the first alarm display 106*a* of FIG. 1. Step 529 is an operation end step, and when the step 518 makes the judgment of OFF, or when the step 527 makes the judgment of normality, the operation is ended. Also, when the step 528 or the step 520 is executed, the operation is ended. In the flowchart of FIG. 5, the procedure is on standby at the operation end step 529, and proceeds to the operation start step 500 after other control is carried out.

Figure 8:
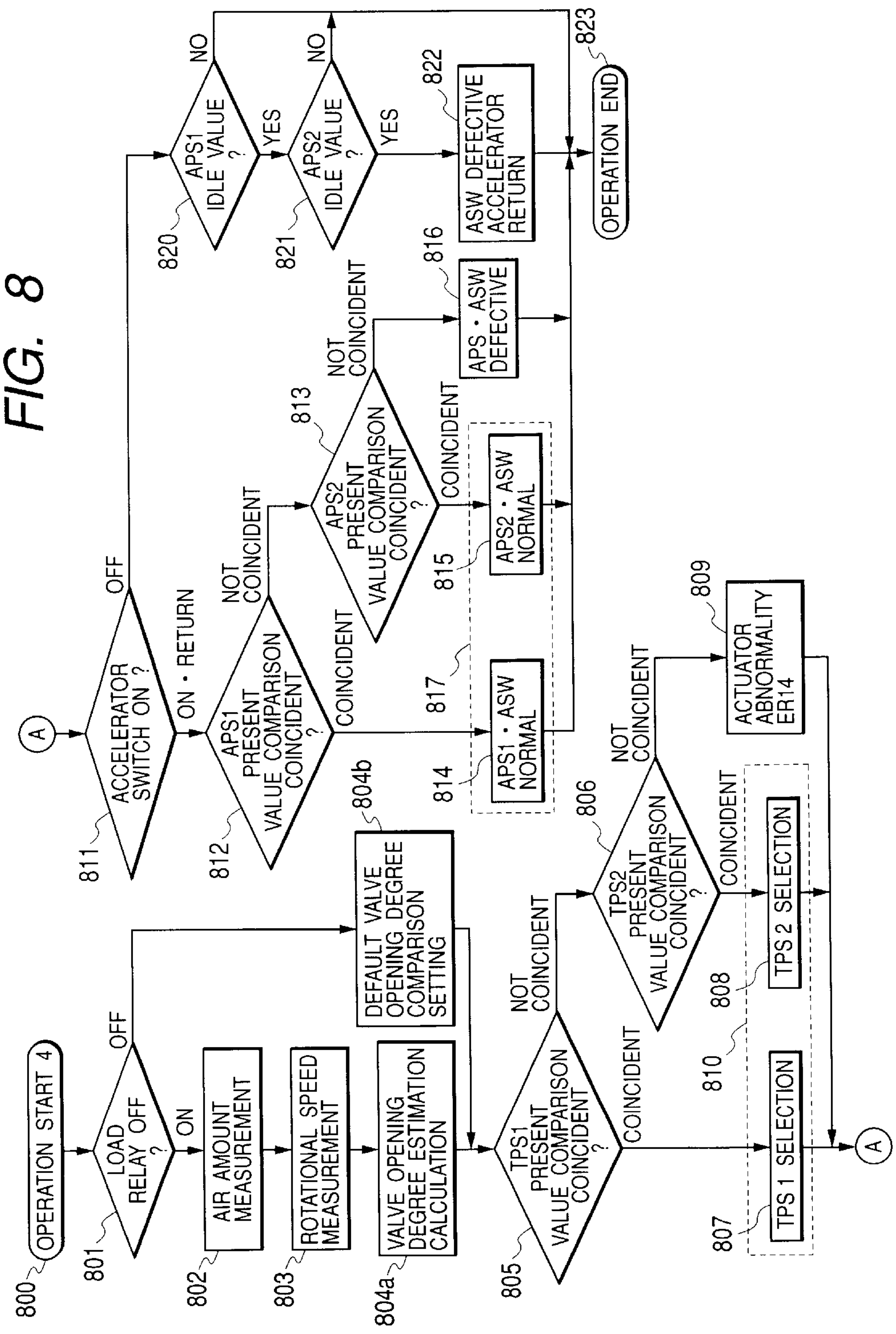
FIG. 8 is a sensor non-defective unit flowchart according to embodiment 2 of a vehicle engine control device of this invention.

Incidentally, the second error signal output ER12 outputted at the step 519, and the third error signal output ER13 outputted at the step 528 are subjected to logical addition with a first error signal output ER11 outputted at step 630 of FIG. 6, a dynamic error output ER10 outputted at step 635 of FIG. 6, and a fourth error signal output ER14 of FIG. 8, and are outputted as the severe abnormality output ER1 in FIG. 1.

Besides, the fifth error signal output ER21 outputted at the step 524 is subjected to logical addition with a sixth error output ER22 outputted at step 624 of FIG. 6 and a seventh error signal output ER23 outputted at step 619 of FIG. 6, and is outputted as the slight abnormality output ER2 in FIG. 1.

Here, the operation flow relating to the abnormality of the accelerator position sensor (APS) shown in FIG. 5 will be again described in general. When both the accelerator position sensors APS1 and APS2 are individually abnormal, or even if the accelerator position sensors APS1 and APS2 are not individually abnormal, they are relatively abnormal and it can not be specified which is normal, both the accelerator position sensors APS1 and APS2 are regarded as being abnormal, and the second error output ER12 is generated. Even in the case where relative abnormality exists in the accelerator position sensors APS1 and APS2, if individual abnormality exists in one of the accelerator position sensors APS1 and APS2, the other is regarded as being normal and non-defective unit selection is carried out, and the fifth error output ER21 is generated. For example, if the accelerator position sensor APS1 is abnormal, substitute processing is carried out to use the detection output of the accelerator position sensor APS2 instead of the accelerator position sensor APS1 in FIG. 3.

(22) Description of Function and Operation Attendant on Abnormality in Relation to Throttle Position Sensor (TPS) of Embodiment 1

Next, in the embodiment 1, the operation of the microprocessor will be described on the basis of FIG. 6 showing an abnormality detection flowchart in relation to the throttle position sensor. It should be understood that respective steps in the flowchart of FIG. 6 constitute means.

In FIG. 6, step 600 is an operation start step periodically activated, step 601 is executed subsequently to the operation start step 600 and resets flags FP1 and FP2 described later, and step 602 is executed subsequently to the step 601 and is a step of judging abnormality of an output voltage range of the throttle position sensor TPS1. At the judgment step 602, a judgment of normality is made when the output voltage of the throttle position sensor TPS1 is 0.2 to 4.8 (V), and when the output voltage varies from this normal range, a judgment of abnormality is made. This abnormality includes disconnection of a detection signal line, poor contact, and short circuit error contact with positive and negative power source lines or other different voltage wiring lines.

Step 604 is a step of judging abnormality from a change rate of an output voltage of the throttle position sensor TPS1, and is executed when it is judged at the step 602 that the throttle position sensor TPS1 is normal. In the abnormality judgment at this step 604, the change rate of the output voltage of the throttle position sensor TPS1 is measured on the basis of a difference between the previously read output voltage of the throttle position sensor TPS1 and the presently read output voltage thereof, and in the case where this becomes a large value which can not be obtained normally and the output voltage of the throttle position sensor TPS1 is judged to be suddenly changed, a judgment of abnormality is made. Similarly to the above, this abnormality includes disconnection of a detection signal line, poor contact, and short circuit error contact with positive and negative power source lines or other different voltage wiring lines. Besides, the step 604 makes a judgment of normality if the change rate of the output voltage of the throttle position sensor TPS1 is within the normal range.

Step 605 is a step of setting the flag FP1 and is executed when it is judged at the step 602 or the step 604 that the throttle position sensor TPS1 is abnormal. A step 631 designates a second individual abnormality detection step block constituted by the step 602, the step 604, and the step 605 and relating to the throttle position sensor TPS1, and this constitutes the second individual abnormality detection means relating to the throttle position sensor TPS1.

Step 606 is executed subsequently to the step 631, and is a step of judging abnormality of an output voltage range of the throttle position sensor TPS2. This judgment step 606 is executed when it is judged at the step 604 that the throttle position sensor TPS2 is normal or when the flag FP1 is set at the step 605. At the judgment step 606, when the output voltage of the throttle position sensor TPS2 is 0.2 to 4.8 (V), a judgment of normality is made, and when the output voltage varies from this normal range, a judgment of abnormality is made. This abnormality includes disconnection of a detection signal line, poor contact, and short circuit error contact with positive and negative power source lines or other different voltage wiring lines.

Step 608 is a step of judging abnormality from a change rate of an output voltage of the throttle position sensor TPS2, and is executed when it is judged at the step 606 that the throttle position sensor TPS2 is normal. In the abnormality judgment at this step 608, the change rate of the output voltage of the throttle position sensor TPS2 is measured on the basis of a difference between the previously read output voltage of the throttle position sensor TPS2 and the presently read output voltage thereof, and in the case where this becomes a large value which can not be obtained normally and the output voltage of the throttle position sensor TPS2 is judged to be suddenly changed, a judgment of abnormality is made. Similarly to the above, this abnormality includes disconnection of a detection signal line, poor contact, and short circuit error contact with positive and negative power source lines or other different voltage wiring lines. The step 608 makes a judgment of normality when the change rate of the output voltage of the throttle position sensor TPS2 is within the normal range.

Step 609 is a step of setting the flag FP2, and is executed when it is judged at the step 606 or the step 608 that the throttle position sensor TPS2 is abnormal. A step 632 is a second individual abnormality detection step block including the step 606, the step 608, and the step 609 and relating to the throttle position sensor TPS2, and this constitutes the second individual abnormality detection means relating to the throttle position sensor TPS2.

Step 610 is a judgment step of carrying out relative comparison of the throttle position sensors TPS1 and TPS2. This step 610 is executed when it is judged at the step 608 that the throttle position sensor TPS2 is normal, or when the flag TP2 is set at the step 609. In this step 610, both the output voltages of the throttle position sensors TPS1 and TPS2 are compared with each other, and it is judged whether or not those output voltages are coincident with each other within a predetermined error. If the difference of the output voltages of the throttle position sensors TPS1 and TPS2 is within the predetermined error range, a judgment of normality is made, and if it is larger than the predetermined error range, a judgment of abnormality is made. Step 611 is a step of storing that both the throttle position sensors TPS1 and TPS2 are normal, and is executed when it is judged at the step 610 that the two throttle position sensors TPS1 and TPS2 are normal.

Step 612 is a step of judging whether or not the flag FP1 is set at the step 605, and is executed when it is judged at the step 610 that the relative comparison result of the output voltages of the throttle position sensors TPS1 and TPS2 is abnormal. If the flag FP1 is set, a judgment of YES is made, and if not, a judgment of NO is made. If the judgment result of the step 612 is NO, it proceeds to step 613, and if the judgment result at the step 612 is YES, it proceeds to step 614. Both the step 613 and the step 614 judge whether the flag FP2 is set at the step 609, and if the flag FP2 is set, a judgment of YES is made, and if not, a judgment of NO is made.

Step 615 is a step of storing the abnormality of both the throttle position sensors TPS1 and TPS2, and is executed when both the judgment results of the step 612 and the step 614 are YES (when both the throttle position sensors TPS1 and TPS2 are individually abnormal), or both the judgment results of the step 612 and the step 613 are NO (although both the throttle position sensors TPS1 and TPS2 are not individually abnormal, when they are relatively abnormal). Besides, the step 615 is also executed when the judgment result of judgment step 623 described later is YES.

Step 616 is a step of selecting the throttle position sensor TPS2 and resetting the memory of the step 612. This step 616 is executed when (a) the judgment result of the step 610 is relative abnormality of the throttle position sensors TPS1 and TPS2, (b) the judgment result of the step 612 is YES (when the throttle position sensor TPS1 is individually abnormal), and (c) the judgment result of the step 614 is NO (when the throttle position sensor TPS2 is not individually abnormal).

Step 617 is a step of selecting the throttle position sensor TPS1 and resetting the memory of the step 611. This step 617 is executed when (a) the judgment result of the step 610 is relative abnormality of the throttle position sensors TPS1 and TPS2, (b) the judgment result of the step 612 is NO (when the throttle position sensor TPS1 is not individually abnormal), and (c) the judgment result of the step 613 is YES (when the throttle position sensor TPS2 is individually abnormal). A step 633 is a second non-defective sensor detection step block including the step 616 and the step 617, and constitutes the second non-defective sensor detection means for the throttle position sensor (TPS).

Incidentally, the step 615 constitutes both abnormality detection means of the throttle position sensor TPS, when both abnormality of the throttle position sensors TPS1 and TPS2 is stored at this step 615, the memory information by the step 611, the step 616 and the step 617 is reset, and the memory state of the step 615 is not reset until the power source is switched off.

Besides, the memory states of the step 611, the step 616 and the step 617 are also reset when the power source is switched off.

Step 621 is a step of giving a substitute TPS use instruction, and this step 621 is executed subsequently to the step 616 and issues a substitute TPS instruction to use the output signal of the throttle position sensor TPS2 instead of the throttle position sensor TPS1. Step 622 is a step of giving a TPS1 continuous use instruction, and this step 622 is executed subsequently to the step 617 and issues an instruction to continuously use the output signal of the throttle position sensor TPS1.

Step 623 is a judgment step of duplicate selection abnormality. In the case where the step 616 and the step 617 respectively select and store the throttle position sensors TPS2 and TPS1, this step 623 judges that duplicate selection abnormality occurs and makes a judgment of YES. When the step 623 makes the judgment of YES, it proceeds to the step 615. At this step 615, both abnormality of the throttle position sensors TPS1 and TPS2 is stored. In the case where only one of the throttle position sensors TPS1 and TPS2 is selected, the step 623 judges that the duplicate abnormality does not occur, makes a judgment of NO, and proceeds to step 624. The step 624 generates a sixth error output ER22, actuates the second alarm display 106*b* of FIG. 1, and selects a slightest escape mode.

Step 625 is an operation judgment step of the load relay 105*a*, is executed subsequently to the step 611 or the step 624, and judges whether or not the load relay 105*a* of FIG. 1 operates. The step 625 makes a judgment of ON when the load relay 105*a* is in an on state, and makes a judgment of OFF when it is in an off state. Step 626 is a step of judging the on/off state of the driving motor control signal output DR1 of FIG. 1, and is executed when it is judged at the step 625 that the load relay 105*a* carries out the on operation. Step 626 makes a judgment of ON if the driving motor control signal output DR1 is in the on state, and makes a judgment of OFF if it is in the off state. Step 627 is a step of judging a driving current to the driving motor 104, and this step 627 is executed when it is judged at the step 626 that the driving motor control signal output DR1 is ON (when "H" at the logical level of FIG. 1), and judges whether or not the current flowing to the current detection resistor 114*c* of FIG. 1 is within a predetermined value range. If the driving current to the driving motor 104 is within the predetermined range, it is judged to be normal, and if it is beyond the predetermined range, it is judged to be excessive.

Step 628 is a step of again judging the on/off state of the driving motor control signal output DR1 of FIG. 1, and is executed when it is judged at the step 626 that the driving motor control signal output DR1 is OFF, or it is judged at the step 627 that the driving current to the driving motor 104 is normal. The step 628 makes a judgment of ON if the driving motor control signal output DR1 is in the on state, and makes a judgment of OFF if it is in the off state. Step 629 is a step of judging whether or not a breaking current detected by the voltage dividing resistors 114*d* and 114*e* is not less than a predetermined value, and is executed when the driving motor control signal output is judged to be OFF at the step 628. If the breaking current by the voltage dividing resistors 114*d* and 114*e* is not less than the predetermined value, it is judged to be normal, and if not, it is judged to be excessively small. Step 630 is a step of generating the first error signal output ER11, setting the storage element 116 of FIG. 1, and activating the first alarm display 106*a*. This step 630 is executed when it is judged at the step 627 that the driving current to the driving motor 104 is excessively large (when the driving motor 104 or the wiring line to that is in a short circuit abnormality), or it is judged at the step 629 that the breaking current by the voltage dividing resistors 114*d* and 114*e* is excessively small (when the driving motor 104 or wiring line to that is down).

Step 634 is a step of judging whether or not the both abnormality of the throttle position sensors TPS1 and TPS2 occurs at the parking position (P position) of the transmission, and this step 634 is executed subsequently to the step 615. When the both abnormality occurs at the parking position (P position) of the transmission, a judgment of YES is made, and when it occurs at a position other than the parking position (P position) of the transmission, a judgment of NO is made. Step 635 is a step executed when the judgment of NO is made at the step 634, and at this step 635, the dynamic error signal output ER10 is generated, the abnormality storage element 116 of FIG. 1 is set, the first alarm display 106*a* is actuated, and the load relay 105*a* is switched off. This step 635 constitutes severe abnormality detection means, and when the both abnormality of the throttle position sensors TPS1 and TPS2 occurs during driving, the step 528 of FIG. 5 is also generally executed, and the third error signal output ER13 is also outputted.

Incidentally, the step 634 is the escape mode selection means for preventing the slight abnormality mode from being carelessly selected when the vehicle is in operation, and after the intention of the driver is confirmed by the manual operation of the escape mode selection switch 135 instead of the selection operation of the parking position (P position), the procedure may proceed to the step 619. The step 619 is a step of generating the seventh error signal output ER23, and this step is executed when the judgment of YES is made at the step 634. Step 620 is a step executed subsequently to the step 619, and this step 620 causes the second alarm display 106*b* of FIG. 1 to carry out a flashing operation. Step 636 is executed subsequently to the step 620, and is a step of selecting and storing the slight mode. Step 637 is an operation end step, and the operation is ended when the judgment of normality is made at the step 629, when it is judged at the step 625 that the load relay 105*a* is OFF, or when it is judged at the step 628 that the driving motor control signal output DR1 is ON. Besides, after the step 630, the step 635 or the step 636 is executed, the operation is ended. In the flowchart of FIG. 6, the procedure is on standby at the operation end step 637, and proceeds to the start step 600 after other control is carried out.

Incidentally, the seventh error signal output ER23 generated at the step 619 is a signal which becomes substantially effective after the power source switch 108 of FIG. 1 is switched off and is again closed while the transmission is put in the parking position (P position). Since the power source of the driving motor 104 is in a cut-off state by the load relay 105*a* as long as the power source switch 108 is not again closed, the situation is such that the escape driving in the slight mode can not be carried out.

Here, the control flow in connection with the abnormality detection of the throttle position sensors TPS1 and TPS2 of FIG. 6 will be again described in general. When both the throttle position sensors TPS1 and TPS2 are individually abnormal, or although they are not individually abnormal, they are relatively abnormal, and it is impossible to specify which throttle position sensor is normal, the throttle position sensors TPS1 and TPS2 are regarded as being in the both abnormality, and the dynamic error signal output ER10 or the seventh error output ER23 is generated. Even if the relative abnormality exists in the throttle position sensors TPS1 and TPS2, if one of them has the individual abnormality, the other throttle position sensor is regarded as being normal and non-defective unit selection is carried out, and the sixth error output ER22 is generated. For example, if the throttle position sensor TPS1 is abnormal, the substitute processing is carried out so that the output signal of the throttle position sensor TPS2 is used instead of the throttle position sensor TPS1 in FIG. 3.

(23) Description Concerning a Setting Operation of Upper Limit Rotational Speed

Figure 7:
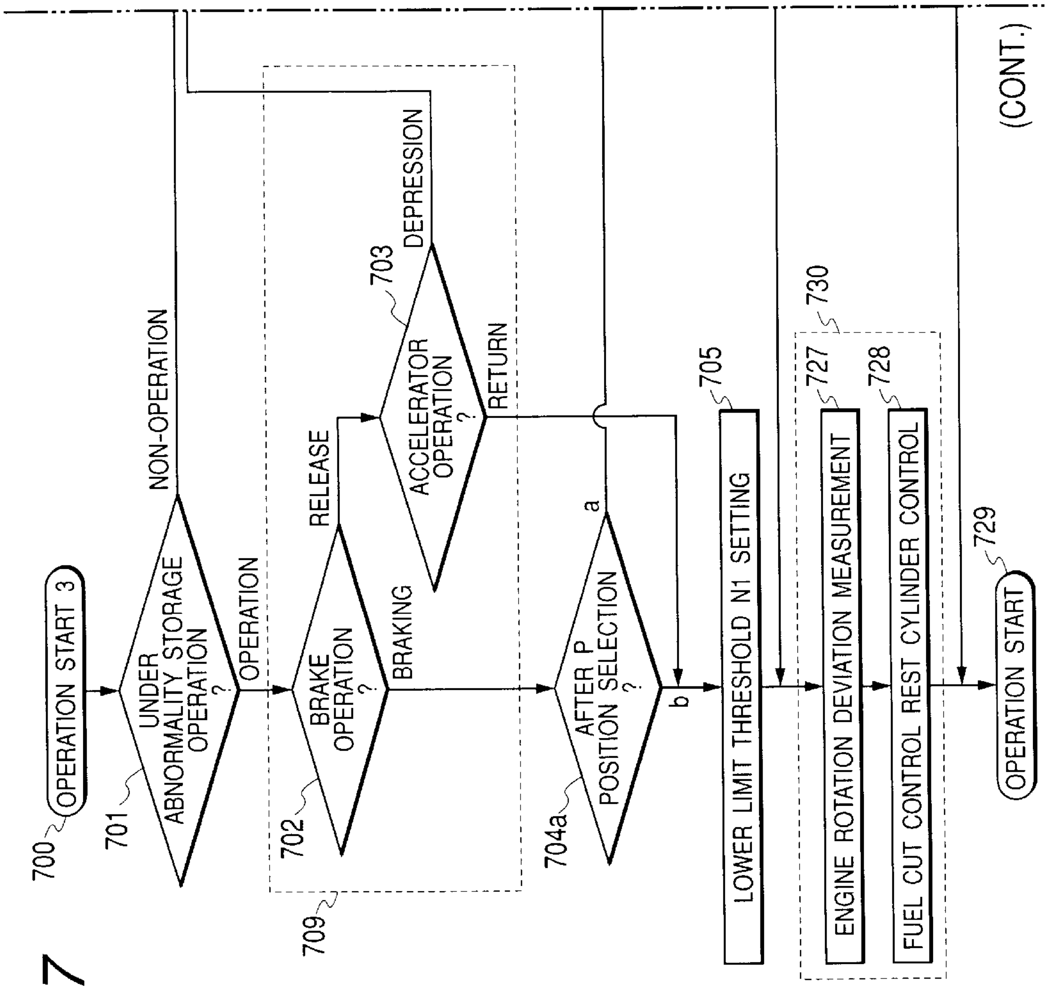
FIG. 7 is a flowchart of upper limit rotational speed setting of the embodiment 1.

Next, in the embodiment 1 of FIG. 1, the operation of the microprocessor 110 will be described on the basis of FIG. 7 showing a flowchart relating to a setting method of various upper limit rotational speeds. It should be understood that respective steps of the flowchart of FIG. 7 constitute means.

In FIG. 7, step 700 is an operation start step periodically activated, and step 701 is executed subsequently to the step 700 and is a step of judging whether or not the abnormality storage element 116 of FIG. 1 is under abnormality storage operation. At the step 701, if the abnormality storage element 116 is under the abnormality storage operation, a judgment of operation is made, and if not, a judgment of non-operation is made. Step 702 is a judgment step executed when the judgment result of the step 701 is the judgment of operation, and this step 702 judges a brake operation on the basis of the operation judgment of the brake release switch 133 in the second digital input sensor group 101*b* of FIG. 1. If the brake operation is carried out, a judgment of braking is made, and if the brake operation is not carried out, a judgment of release is made. Step 703 is a judgment step executed when the judgment of release is made at the step 702, and this step 703 judges the accelerator operation on the basis of the operation judgment of the accelerator switch 134 in the second digital input sensor group 101*b* of FIG. 1, and judges whether the accelerator pedal 210*a* is depressed or is in the return state. If the accelerator operation has been carried out, a judgment of depression is made, and if not, a judgment of return is made.

Step 704*a* is a step executed when the judgment of braking is made at the step 702, and this step 704*a* judges whether or not the transmission is once selected to be put in the parking position (P position) after the occurrence of an abnormality, and whether or not the transmission selects the first gear or second gear after the selection of the parking position (P position). At the step 704*a*, in the case where the transmission is once selected to be put in the parking position (P position) after the occurrence of the abnormality, and then, the transmission selects the low speed forward first gear or low speed forward second gear, a judgment result "a" is produced, and in the case where the transmission has not yet selected the parking position (P position) after the occurrence of the abnormality, or although the transmission once selected the parking position (P position), thereafter, the low speed forward first gear or second gear is not selected, and in the case where the transmission selects forward D, reverse R, or neutral N, or the selection of the parking position (P position) is continued, a judgment result "b" is produced. Step 705 is a step of carrying out lower limit rotation threshold setting, and this step 705 is executed when the judgment result "b" is produced at the step 704*a*, or the judgment of return is made at the step 703. This step 705 sets the lower limit rotation threshold N1 to, for example, N1=1000 (r/min). The step 702 and the step 703 constitute the driving intention confirmation means 709.

Step 704*b* is a step executed when the accelerator pedal is judged to be depressed at the step 703, and this step 704*b* judges whether or not the transmission is once selected to be put in the parking position (P position) after the occurrence of an abnormality. At this step, when the transmission once selects the parking position (P position) after the occurrence of the abnormality, a judgment of YES is made, and if the parking position (P position) is not selected, a judgment of NO is made. This step 704*b* constitutes the escape driving mode selection means for preventing a subsequent escape driving operation from carelessly becoming effective, and this step 704*b* can be substitutively judged by a manual operation of the escape mode selection switch 135 in the second digital input sensor group 101*b* of FIG. 1.

Step 711 is a step executed when the judgment of YES is made at the step 704*b*, and at this step 711, the defective/non-defective states of the accelerator position sensors APS1 and APS2 are judged in a manner shown in FIG. 5, especially in the step 502 to the step 514. At the step 711, when a non-defective unit exists in the accelerator position sensors APS1 and APS2, it is judged that there is a non-defective unit, and if both of them are abnormal, a judgment of both abnormality is made. Step 712 is executed when it is judged at the step 711 that there is a non-defective unit, and calculates and sets the variable threshold rotational speed Na indicated by the expression (1). Step 713 is a step executed when the judgment of both abnormality of the accelerator position sensors APS1 and APS2 is made at the step 711, when the judgment of NO is made at the step 704*b*, or when the judgment result "a" is produced at the step 704*a*. At this step 713, a quality judgment of the throttle position sensors TPS1 and TPS2 is made in the manner shown in FIG. 6, especially in the step 602 to the step 614. At the step 713, when a non-defective unit exists in the throttle position sensors TPA1 and TPS2, it is judged that there is a non-defective unit, and if both of them are abnormal, a judgment of both abnormality is made. Step 714 is a step executed when it is judged at the step 713 that there is a non-defective unit, and this step calculates and sets the calculation threshold rotational speed Nb indicated by the expression (2).

Step 715 is a step of setting the default rotational speed N2, and this step 715 is executed when the judgment of both abnormality is made at the step 713, and sets the default rotational speed N2 to, for example, N2=2000 (r/min).

Step 720 is a step executed when the judgment of non-operation is made at the step 701, and it is judged whether or not both the accelerator position sensors APS1 and APS2 and the throttle position sensors TPS1 and TPS2 are normal. At this step, if both the accelerator position sensors APS1 and APS2 and the throttle position sensors TPS1 and TPS2 are normal, a judgment of YES is made, and if not, a judgment of NO is made. Step 721 is a step executed when the judgment of YES is made at the step 720, and at this step 721, a maximum rotation threshold value N4 is set to, for example, N4≅8000 (r/min).

Step 722 is executed when the judgment of NO is made at the step 720, and is a step of judging single abnormality concerning the accelerator position sensors and the throttle position sensors. At this step 722, in at least one of a case where one of the accelerator position sensors APS1 and APS2 is abnormal and a case where one of the throttle position sensors TPS1 and TPS2 is abnormal, a judgment of YES is made, and if not, a judgment of NO is made. Step 723 is a step executed when the judgment of YES is made at the step 722, and this step 723 sets an upper limit rotation threshold N3 to, for example, N3≅4000 (r/min).

Step 724 is a judgment step executed when the judgment of NO is made at the step 720, and when the judgment of NO is made at the step 722, and at this step 724, it is judged whether or not both the throttle position sensors TPS1 and TPS2 are abnormal, and if both of them are abnormal, a judgment of YES is made, and if not, a judgment of NO is made. If this step 724 makes the judgment of YES, the step 723 is executed. Step 725 is a step executed when both the throttle position sensors TPS1 and TPS2 are not abnormal and the judgment of NO is made at the step 724, that is, when the accelerator position sensors APS1 and APS2 are not in the both abnormality, and this step 725 generates the second error output ER12 and sets the abnormality storage element 116 of FIG. 1. Step 726 is a step executed subsequently to the step 725, and causes the flashing operation output FL of FIG. 1 to carry out the on/off operation, and causes the first alarm display 106*a* to carry out the flashing operation.

Step 727 is a step of measuring an engine rotation deviation, and this step 727 obtains a deviation between the lower limit rotation threshold N1 set by the step 705, the calculation rotation threshold Nb set by the step 714, the default rotation threshold N2 set by the step 715, the variable rotation threshold Na set by the step 712, the upper limit rotation threshold N3 set by the step 723, or the maximum rotation threshold N4 set by the step 721 and the actual engine rotational speed by the rotational speed detection means 318 of FIG. 3 or FIG. 4. Step 728 is a step executed subsequently to the step 727, and controls the rotational speed of the engine by the fuel injection control means 319 of FIG. 3 or FIG. 4. Step 729 is an operation end step subsequent to the step 728 or the step 726. In the flowchart of FIG. 7, the procedure is on standby at the operation end step 729 and proceeds to the operation start step 700 after other control is carried out.

A step 730 is a step block including the step 727 and the step 728, this step constitutes engine rotational speed suppression means, and the details will be described later with reference to FIG. 10.

Here, the flow of FIG. 7 will be again described in general. FIG. 7 shows the selection method of the setting means of the various rotational speeds in FIG. 3 or FIG. 4. The upper limit rotation threshold setting means 321 of FIG. 3 is set by the step 723, and this step 723 is executed in at least one of the case where the abnormality storage element 116 does not operate and one of the accelerator position sensors APS1 and APS2 is abnormal, and the case where one of or both of the throttle position sensors TPS1 and TPS2 are abnormal.

The maximum rotation threshold setting means of FIG. 3 is set by the step 721, and this step 721 is executed when the abnormality storage element 116 does not operate, and all of the accelerator position sensors APS1 and APS2 and the throttle position sensors TPS1 and TPS2 are normal.

The lower limit rotation threshold setting means 401*a* of FIG. 4 is set by the step 705, and the step 705 is executed when the abnormality storage element 116 is in operation, and the driving intention confirmation means 709 indicates the stop intention.

Incidentally, in the driving intention confirmation means 709, during the braking or at the time of return of the accelerator, it is presumed that the stop intention exists in principle, and the lower limit rotation threshold setting means 705 becomes effective, and when the braking is released and the accelerator is depressed, the step 712, the step 714, the step 715 and the like become effective.

However, even if the step 702 makes the judgment of braking, when the low speed forward first or second position is selected after the selection position of the transmission is once selected to the parking position (P position) after the occurrence of the abnormality, it is judged that there is a driving intention, the step 714 and the step 715 become effective, and the state becomes such that the vehicle can move forward while the braking force is adjusted.

The variable threshold rotation calculation means 404 of FIG. 4 is set by the step 712, and the step 712 is executed when the abnormality storage element 116 is in operation, the driving intention confirmation means 709 judges that the driving intention exists after the parking position P is once selected in the transmission, and a non-defective unit exists in the accelerator position sensors APS1 and APS2.

The default rotation threshold setting means 407 of FIG. 4 is set by the step 715, and this step 715 is executed when the abnormality storage element 116 is in operation, the driving intention confirmation means 709 judges that a driving intention exists, and both the accelerator position sensors APS and the throttle position sensors TPS are in the both abnormality.

The calculation threshold rotation setting means 410 of FIG. 4 is set by the step 714, and this step 714 is executed when the abnormality storage element 116 is in operation, the driving intention confirmation means 709 judges that a driving intention exists, the accelerator position sensors APS are in the both abnormality, and a non-defective unit exists in the throttle position sensors TPS.

(24) Description of General Operation of Embodiment 1

Although the respective operations relating to FIGS. 1 to 4, together with the description of the structure, have been described, a description will be again given in general on the basis of the operation description of FIGS. 5 to 7.

In FIG. 1, the engine control device 100 receives electric power from the on-vehicle battery 107, controls the first and second electric load groups 103*a* and 103*b* in response to the input signals from the first and second digital input sensor groups 101*a* and 101*b* and the first and second analog input sensor groups 102*a* and 102*b*, and controls the motor 104 for opening and closing the throttle valve.

The driving motor 104 receives electric power through the output contact 105*b* of the load relay 105*a* driven by the signal output DR3 generated by the microprocessor 110, and is subjected to the on/off rate control through the transistor 114*a* from the motor control signal output DR1 of the microprocessor 110. On the other hand, when the severe abnormality detection output ER1 is outputted by the various severe abnormality detection means, the abnormality storage element 116 stores this and de-energizes the load relay 105*a*, and actuates the first alarm display 106*a*.

However, in the case where the content of the severe abnormality is the both abnormality of the accelerator position sensors APS1 and APS2, the first alarm display 106*a* carries out the flashing operation by the flashing operation output FL.

When the slight abnormality detection output ER2 is outputted by the various slight abnormality detection output means, the second alarm display 106*b* is actuated. However, in the case where the content of the slight abnormality detection output is the both abnormality of the throttle position sensors TPS1 and TPS2, the slight abnormality detection output ER2 itself carries out the on/off operation, and the second alarm display 106*b* carries out the flashing operation.

Incidentally, when such a case is considered that the microprocessor 110 goes out of control by a temporal erroneous operation due to noise or the like, the microprocessor 110 is reset by the watch dog timer 119 and is automatically restarted, and the first and second electric load groups 103*a* and 103*b* recovers the normal operation.

Accordingly, the fuel injection control and the ignition control for the engine are continued, and the rotation operation of the engine is secured. However, the load relay 105*a* is de-energized, so that the driving motor 104 is stopped, and the throttle valve 200*b* is returned by the default position return mechanism 208 to the predetermined position for the escape driving.

Incidentally, the abnormal state caused by a temporal erroneous operation is released when the power source switch 108 is once switched off and is again closed, and the abnormality storage element 116 is also reset. However, in the case of an abnormal state caused by a hardware abnormality, even if the power source switch 108 is again closed, the same abnormal state again occurs.

However, although the both abnormality of the throttle position sensors TPS1 and TPS2 having occurred during vehicle traveling is a severe abnormality, it is handled as a slight abnormality in the state where the transmission is put in the parking position (P position).

Besides, in such a severe abnormality that some mechanical abnormality occurs in the actuator and it becomes impossible to carry out the opening and closing operation of the throttle valve 200*b*, it is also necessary to consider a case in which even if electric supply to the driving motor 104 is stopped, the throttle valve 200*b* can not return to the default position, and an excessively opened abnormality or excessively closed abnormality occurs.

In FIG. 3 showing the control block of the first throttle escape mode control means as the slightest abnormality escape running means, correction values of the idle correction and acceleration correction are algebraically added by the driving correction block 311 to the output signal of the non-defective accelerator position sensor APS1 or APS2 selected by the changeover switch 310 to generate the signal output by the objective throttle valve opening degree setting means 312.

The drive control means 313 is actuated based on the relative deviation between this objective signal output and the output signal of the non-defective throttle position sensor TPS1 or TPS2 selected by the changeover switch 314, and the driving motor 104 is subjected to feedback control, and if the relative deviation is excessive, the severe abnormality is detected by the abnormality deviation detection means 315.

On the other hand, the fuel injection control means 319 compares the engine rotational speed of, for example, 4000 (r/min) set by the upper limit rotation threshold setting means 321 with the actual rotational speed of the engine detected by the engine rotational speed detection means 318, and carries out the fuel injection control for the fuel injection valve 137 so that the actual rotational speed of the engine does not exceed the upper limit rotational speed set by the upper limit rotation threshold setting means.

With respect to the suppression control of the engine rotational speed by the fuel injection control means 319, there are a case of rest cylinder control in which as a relative deviation between the upper limit rotational speed of the engine as an object and the actual rotational speed of the engine is decreased, the number of rest cylinders in which fuel injection is stopped is increased in a part of the multi-cylinder engine, and when the actual rotational speed of the engine exceeds the objective value, all cylinders are rested, a case of fuel cut control in which when the actual rotational speed of the engine is not higher than the objective upper limit rotational speed, fuel is supplied to all cylinders of the multi-cylinder engine without depending on the relative deviation, and when the actual rotational speed of the engine exceeds the objective value, all cylinders are immediately rested, and a case in which both the rest control and the fuel cut control are used.

Incidentally, in a normal driving state, suppression of the engine rotational speed by the fuel injection control means 319 is carried out while the engine rotational speed of, for example, 8000 (r/min) set by the maximum rotation threshold setting means 323, instead of the upper threshold setting means 321, is made the upper limit rotational speed.

Besides, when the slightest abnormality occurs in the normal driving state, changeover to the non-defective accelerator position sensor or throttle position sensor and changeover of the upper limit rotational speed are carried out, and the state is automatically shifted to the slightest abnormality escape running mode.

In FIG. 4 showing the control block of the severe abnormality escape running means in which drive control of the throttle valve by the driving motor 104 is stopped, when the severe abnormality occurs during vehicle driving, the throttle valve is generally returned to the default position, and the fuel injection valve 137 is controlled by the fuel injection control means 319 and the engine rotational speed detection means 318 while for example, 2000 (r/min) set by the default rotation threshold setting means 407 is made the upper limit rotational speed.

The actual engine rotational speed and vehicle speed in this state are changed according to a load state of climbing a slope, descending a slope, or the like, and if the vehicle speed is excessively high, the brake pedal is depressed so that the changeover switch 402*b* is changed over to the illustrated position of FIG. 4, and the engine rotational speed is lowered by the lower limit rotation threshold setting means 401*a*.

When the engine is restarted after the vehicle is once stopped, although the abnormal state due to a temporal erroneous operation is released, in the case where the abnormal state is continued, the changeover switch 402*a* is inverted from the illustrated position of FIG. 4.

This is due to the step 704*b* of FIG. 7, and the transmission is put in the parking position (P position) so that the driving object rotation setting means 411 of FIG. 4 becomes effective.

In the case where the non-defective accelerator position sensor APS1 or PAS2 exists, the variable threshold rotation setting means 404 becomes effective, and the escape running is carried out at the upper limit rotational speed substantially proportional to the depression degree of the accelerator pedal.

However, for example, in the case where the throttle valve 200*b* is in the excessively closed abnormality and climbing running is desired, the state becomes such that even if the upper limit rotational speed is made high, the objective engine rotational speed can not be obtained.

Besides, in the case where although a non-defective accelerator position sensor APS does not exist, a non-defective throttle position sensor TPS exists, the calculation threshold rotation setting means 410 becomes effective, and if the throttle valve 200*b* is in the excessively opened abnormality, the upper limit rotational speed is made low, and if the throttle valve 200*b* is in the excessively closed abnormality, the upper limit rotational speed is made high, and almost constant engine output torque can be obtained correspondingly to the stop position of the throttle valve 200*b*.

Incidentally, in the case where a non-defective accelerator position sensor APS and a non-defective throttle position sensor TPS do not exist, the default rotation threshold setting means 407 becomes effective.

The changeover switch 402*b* operating correspondingly to the driving intention confirmation means 709 of FIG. 7 is controlled by the step block 709 and the step 704*a* of FIG. 7, and when the stop intention is confirmed according to the brake operation, accelerator pedal operation, or the selection position of the transmission, the lower limit rotation threshold setting means 401*a* becomes effective.

Incidentally, the route from the step 704*a* of FIG. 7 to the step 713, the step 714 or the step 715 enables the forward motion of the vehicle while the braking operation is kept.

The effects of the embodiment 1 described above will be described collectively. First, since the vehicle engine control device according to the embodiment 1 is provided with the abnormality detection means 519, 528, and 630, the abnormality storage element 116, the lower limit rotation threshold setting means 401*a*, the automatic shift escape running means ASD, and the selective shift escape running means SSD, there are effects that it is possible to avoid a danger of applying various escape means as a prompt measure against the occurrence of a severe abnormality during vehicle traveling, and escape running by specified automatic shift escape running means ASD can be carried out, and in the case where this severe abnormality is a temporal one due to noise or the like, it can be released by restart of the engine, and in the case of a continuous abnormality, more convenient escape running means can be selected by using the selective shift escape means SSD.

Besides, in the vehicle engine control device according to the embodiment 1, since the calculation threshold rotation setting means 410 and the default rotation threshold setting means 407 are provided as the setting means of a predetermined limited rotational speed which is applied in the automatic shift escape running means ASD, there are effects that if one of the pair of throttle position sensors TPS1 and TPS2 is normal, the upper limit rotational speed of the engine corresponding to the opening position of the throttle valve is set and the output torque of the engine can be kept substantially constant, and even in the case where a normal throttle position sensor does not exist, the engine rotational speed is restricted according to the default rotational speed, and even if the throttle valve opening degree is in the excessively opened abnormality, escape running can be carried out while the vehicle speed is adjusted by the operation of the brake pedal.

Besides, in the vehicle engine control device according to the embodiment 1, since the driving intention confirmation means 402*b* is provided, there are effects that when there is no driving intention, the engine rotational speed can be lowered to the minimum rotational speed by the lower limit rotation threshold setting means 401*a*, and even if the output torque of the engine is made large by setting the set rotational speed by the default rotation threshold setting means 407 and the calculation threshold rotation setting means 410 to be relatively large, the vehicle can be certainly stopped.

Besides, in the vehicle engine control device according to the embodiment 1, since the rising rate suppression means 406 is provided, there are effects that the engine rotational speed does not suddenly rise, and various escape running means can be applied safely.

Besides, in the vehicle engine control device according to the embodiment 1, since the first alarm display 106*a* and the first discrimination operation control means 520 are provided, there are effects that various pieces of information can be plainly transmitted in a small alarm display space.

Besides, in the vehicle engine control device according to the embodiment 1, since the accelerator switch 134 or the accelerator return detection means 703 is provided for the driving intention confirmation means 402*b*, there are effects that if the return of the accelerator pedal is detected by the pair of accelerator position sensors APS1 and APS 2, the accelerator switch 134 is not necessary, and if the accelerator switch 134 is also used, even if one of them becomes abnormal, the return of the accelerator pedal can be detected, the lower limit rotation threshold setting means 401*a* is certainly applied, and the vehicle can be safely stopped.

Besides, in the vehicle engine control device according to the embodiment 1, since the brake release switch 133 and the transmission selection position confirmation means 132 are provided for the driving intention confirmation means 402*b*, there are effects that according to the selection position of the transmission, escape running becomes possible in a power running state in which the engine rotational speed is made the default rotational speed or the calculation threshold rotational speed higher than the lower limit rotational speed.

Besides, in the vehicle engine control device according to the embodiment 1, since part of or all of the microprocessor runaway monitor means 119, the motor system error signal output means 630, the sensor both abnormality detection means 519, 619, and the abnormal deviation detection means 315 are provided, there are effects that the systematic severe abnormality detection can be carried out, and even if the microprocessor 110 is automatically restarted against the runaway of the microprocessor 110, the severe abnormality is stored until the power source is disconnected, and the safety can be improved.

Besides, in the vehicle engine control device according to the embodiment 1, since the dynamic abnormality detection means 635 is provided as the severe abnormality detection means, there are effects that with respect to the both abnormality of the pair of throttle position sensors TPS1 and TPS2, although they are transiently detected as the severe abnormality, when the parking position is once selected, it becomes the slight abnormality state, and easier escape running means can be selected.

Besides, in the vehicle engine control device according to the embodiment 1, since the first non-defective sensor detection means 533, the second non-defective sensor detection means 633, the escape running means ASD and SSD are provided, and in addition to simple detection of an abnormality with respect to the pair of accelerator position sensors APS1 and APS2 or the pair of throttle position sensors TPS1 and TPS2, when there is a sensor regarded as being a non-defective unit, this is specified and is used in the escape running, and therefore, there is an effect that suitable and convenient escape running means can be applied.

Besides, in the vehicle engine control device according to the embodiment 1, since the slightest abnormality driving mode by the slightest mode selection means 322 is provided in the escape running means, and the upper limit rotation threshold setting means 321 and the first throttle escape mode control means 300*a* are provided, there are effects that although the suppression of the throttle valve opening degree is not carried out at the time of the occurrence of an abnormality, the upper limit rotational speed of the engine is limited by the upper limit rotation threshold setting means 321, and if this limited rotational speed is made a rotational speed in the vicinity of the rotational speed at which the engine can generate maximum torque, sufficient climbing performance can be secured, and with respect to the slightest abnormality occurring while the vehicle is normally moving, it is possible to automatically shift to the escape running mode.

Besides, in the vehicle engine control device according to the embodiment 1, since the second alarm display 106*a* and the second discrimination operation control means 620 are provided, there are effects that various pieces of information can be easily transmitted in a small alarm display space.

Embodiment 2

Next, embodiment 2 of a vehicle engine control device according to this invention will be described.

In this embodiment 2, the non-defective judgment of the accelerator position sensors PAS1 and APS2 and the throttle position sensors TPS1 and TPS2 in the embodiment 1 is further improved. This embodiment 2 is constructed such that the structure and operation of the embodiment 1 are adopted as they are, and in addition to those, an improved non-defective unit judgment operation is carried out. Specifically, the embodiment 2 adopts the whole structure shown in FIG. 1, the structure of the intake throttle portion shown in FIG. 2, the slight abnormality escape running control block shown in FIG. 3, the severe abnormality escape running control block shown in FIG. 4, the abnormality detection flowchart of the accelerator position sensor shown in FIG. 5, the abnormality detection flowchart of the throttle position sensor shown in FIG. 6, and the upper limit rotational speed setting flowchart shown in FIG. 7 as they are, and in addition to those, this embodiment is constructed to execute an improved non-defective unit judgment flowchart of the accelerator position sensors and the throttle position sensors shown in FIG. 8.

Hereinafter, with respect to the embodiment 2, the operation of the microprocessor will be described with reference to the improved non-defective unit judgment flowchart shown in FIG. 8. It should be understood that respective steps of the flowchart of FIG. 8 constitute means.

First, an improved non-defective unit judgment operation of the throttle position sensors will be described. In FIG. 8, step 800 is an operation start step periodically activated, and step 801 is executed subsequently to the step 800 and is a step of judging whether or not the load relay 105*a* of FIG. 1 is driven. If the load relay 105*a* is driven, a judgment of ON is made, and if it is not driven, a judgment of OFF is made. Step 802 is a step executed when the judgment of ON is made at the step 801, and the amount of air passing through the throttle valve 200*b* is measured by the air flow sensor AFS included in the first analog input signal group 102*a* of FIG. 1.

Step 803 is executed subsequently to the step 802, and measures an engine rotational speed by the engine rotational speed detection means shown in FIG. 3. Step 804*a* is a step executed subsequently to the step 803, and on the basis of characteristics of engine air supply amount versus engine rotational speed with a throttle valve opening degree as a parameter (see FIG. 11(*b*)), this step 804*a* performs an estimation calculation of a present throttle valve opening degree based on measurement values according to the step 802 and the step 803, and sets an output TPSa of the throttle position sensor corresponding to the estimated calculation value. Step 804*b* is a step executed when the judgment of OFF is made at the step 801, and sets an output TPSb of the throttle position sensor in the case where the throttle valve 200*b* is returned to a predetermined default position.

Incidentally, FIG. 11(*b*) shows characteristics indicating the relation between the engine rotational speed of the horizontal axis and the air supply amount of the vertical axis, in which a characteristic S1 indicates the characteristics in the case where the detection output of the throttle position sensor TPS is large, and a characteristic S2 indicates the characteristics in the case where the detection output of the throttle position sensor TPS is small.

Step 805 is a step executed subsequently to the step 804*a* or 804*b*, and compares the output TPSa or TPSb of the throttle position sensor set at the step 804*a* or the step 804*b* with the actual output of the throttle position sensor TPS1. At this step, when the actual output of the throttle position sensor TPS1 is coincident with the set output TPSa or TPSb, an output of coincidence is produced, and if they are not coincident with each other, an output of inconsistence is produced. Step 806 is a step executed when the judgment of inconsistence is made at the step 805, and compares the output TPSa or TPSb of the throttle position sensor set at the step 804*a* or the step 804*b* with the actual output of the throttle position sensor TPS2. At this step, when the actual output of the throttle position sensor TPS2 becomes coincident with the set output TPSa or TPSb, an output of coincidence is produced, and when they do not become coincident with each other, an output of inconsistence is produced.

Step 807 is executed when the judgment of consistence is made at the step 805 and is a step of selecting the throttle position sensor TPS1 as a non-defective unit, step 808 is executed when the judgment of coincidence is made at the step 806 and is a step of selecting the throttle position sensor TPS2 as a non-defective unit, step 809 is a step executed when the judgment of inconsistence is made at the step 806, and this step 806 generates the fourth error signal output ER14 as the actuator abnormality.

Incidentally, step 810 is a non-defective sensor detection step block constituted by the step 807 and the step 808, and constitutes fourth and fifth non-defective sensor detection means. This step block 810 constitutes the fourth non-defective sensor detection means in the case where the comparison object at the judgment steps 805 and 806 is the estimated calculation value TPSa by the air flow sensor or the like, and constitutes the fifth non-defective sensor detection means in the case where the comparison object is the output value TPSb at the default position.

Next, an improved non-defective unit judgment operation of the accelerator position sensors will be described. In FIG. 8, step 811 is a step executed subsequently to the step 807, the step 808, or the step 809. This step 811 is a step of judging whether or not the accelerator switch 134 of FIG. 2 detects the return position of the accelerator pedal 210*a*, and if the accelerator switch 134 is in the on state, a judgment of ON (return) is made, and if it is in the off state, a judgment of OFF (depression) is made. Step 812 is a step executed when the judgment of ON is made at the step 811, and this step 812 compares the output APSa of the accelerator position sensor at the return position of the accelerator pedal 210*a* with the actual output of the accelerator position sensor APS1. The step 812 makes a judgment of coincidence when the actual output of the accelerator position sensor APS1 coincides with the output APSa, and when they do not coincide with each other, a judgment of inconsistence is made. Step 813 is a step executed when the judgment of inconsistence is made at the step 812, and this step compares the output APSa of the accelerator position sensor at the return position of the accelerator pedal 210*a* with the actual output of the accelerator position sensor APS2. The step 813 makes a judgment of consistence when the output of the accelerator position sensor APS2 coincides with the output APSa, and when they do not coincide with each other, a judgment of inconsistence is made. Step 814 is executed when the judgment of consistence is made at the step 812 and is a step of selecting the accelerator position sensor APS1 and the accelerator switch 134 as non-defective units, step 815 is a step executed when the judgment of consistence is made at the step 813, and this step 815 selects the accelerator position sensor APS2 and the accelerator switch 134 as non-defective units. Step 816 is a step executed when the judgment of inconsistence is made at the step 813, and this step 816 stores both abnormality of the accelerator position sensors APS1 and APS2 or abnormality of the accelerator switch 134.

Incidentally, step 817 is a step block constituted by the step 814 and the step 815, and this step block 817 constitutes third non-defective sensor detection means.

Step 820 is a step executed when the accelerator pedal 210*a* is not returned to the return position, and the judgment of OFF is made at the step 811, and judges whether or not the detection output of the accelerator position sensor APS1 corresponds to the output value at the return position of the accelerator pedal 210*a*. If the detection output of the accelerator position sensor APS1 corresponds to the output value at the return position of the accelerator pedal 210*a*, the step 820 makes a judgment of YES, and if not, the step makes a judgment of NO. Step 821 is a judgment step executed when the judgment of YES is made at the step 820. At this step 821, it is judged whether or not the detection output of the accelerator position sensor APS2 corresponds to the output value at the return position of the accelerator pedal 210*a*, and if the detection output of the accelerator position sensor APS2 corresponds to the output value at the return position of the accelerator pedal 210*a*, the step 821 makes a judgment of YES, and if not, the step makes a judgment of NO. Step 822 is executed when the judgment of YES is made at the step 821, and stores a state that although the accelerator switch 134 is defective, the accelerator pedal 210*a* is returned. The step 822 constitutes accelerator return detection means.

Step 823 is a step of an operation end. When the step 814, the step 815, the step 816 or the step 822 is executed, the operation is ended, and also when the judgment of NO is made at the step 820 or the step 821, the operation is ended. In the flowchart of FIG. 8, the procedure is on standby at the operation end step 823, and proceeds to the operation start step 800 after other control is carried out.

Here, the flow of FIG. 8 will be again described in general. First, the basic non-defective unit judgment operation of the accelerator position sensors APS1 and APS2 and the throttle position sensors TPS1 and TPS2 are as shown in FIGS. 5 and 6. The concept is that the relative comparison indicates inconsistence, and if it is specified that one of them is individually abnormal, and the other is not individually abnormal, the other is regarded as being a non-defective unit. However, when the relative comparison indicates inconsistence and both are not individually abnormal, a state occurs in which it is impossible to specify which is defective. In such a case that it is impossible to specify which is defective, in the flow of FIG. 8, a non-defective unit of those position sensors is judged by adding the third judgment criteria of the estimated calculation value TPSa of the throttle valve opening degree, the output value TPSb of the throttle position sensor at the default return position, and the output value ATSa of the accelerator position sensor at the accelerator return position.

Next, the effects of the vehicle engine control device of the embodiment 2 will be described collectively. This embodiment 2 adopts the same structure as the embodiment 1 and is constructed to carry out the improved non-defective unit judgment operation in addition to that, and has the effects of the embodiment 1 as they are, and further has the following effects peculiar to the embodiment 2. First, in the vehicle engine control device of the embodiment 2, since the default return abnormality detection means 809 is provided as the severe abnormality detection means, there is an effect that with respect to the abnormality of the actuator, the severe abnormality can be detected more quickly and certainly than the abnormality judgment by the abnormality deviation detection means 315.

Besides, in the vehicle engine control device of the embodiment 2, since the accelerator switch 134 and the third non-defective sensor detection means 817 are provided, there are effects that in the state where the relative abnormality exists in the pair of accelerator position sensors APS1 and APS2, and an individual abnormality judgment can not be made for both, the non-defective accelerator position sensor can be specified by making the comparison with the operation state of the accelerator switch, and more convenient escape running means can be applied by using, in escape running, the accelerator position sensor regarded as being the non-defective unit.

Besides, in the vehicle engine control device of the embodiment 2, since the throttle valve opening degree estimation means 804*a* and the fourth non-defective sensor detection means 810 are provided, there are effects that in the state where the pair of throttle position sensors TPS1 and TPS2 are relatively abnormal and the individual abnormality judgment can not be made for both, the non-defective throttle position sensor can be specified by the throttle valve opening degree estimation means 804*a*, and more convenient escape running means can be applied by using, in escape running, the throttle position sensor regarded as being the non-defective unit.

Besides, in the vehicle engine control device of the embodiment 2, since the default position return mechanism 208 and the fifth non-defective sensor detection means 810 are provided, there are effects that in the state where the pair of throttle position sensors are relatively abnormal, and the individual abnormality judgment can not be made for both, the non-defective throttle position sensor can be specified by making comparison with the output of the throttle position sensor corresponding to the default position of the throttle valve, and more convenient escape running means can be applied by using, in escape running, the throttle position sensor regarded as being the non-defective unit.

Embodiment 3

Next, embodiment 3 of a vehicle engine control device according to this invention will be described.

This embodiment 3 further adds a slight abnormality escape running mode to the embodiment 1. This embodiment 3 adopts the structure and operation of the embodiment 1 as they are, and further includes the slight abnormality escape running mode. Specifically, the embodiment 3 adopts the whole structure shown in FIG. 1, the structure of the intake throttle portion shown in FIG. 2, the slight abnormality escape running control block shown in FIG. 3, the severe abnormality escape running control block shown in FIG. 4, the abnormality detection flowchart of the accelerator position sensors shown in FIG. 5, the abnormality detection flowchart of the throttle position sensors shown in FIG. 6, and the upper limit rotational speed setting flowchart shown in FIG. 7 as they are, and in addition to those, this embodiment is constructed to execute a slight abnormality escape running control shown in FIG. 9.

Hereinafter, this embodiment 3 will be described using a control block diagram shown in FIG. 9 while attention is mainly paid to points different from the slightest abnormality escape running control block shown in FIG. 3.

Figure 9:
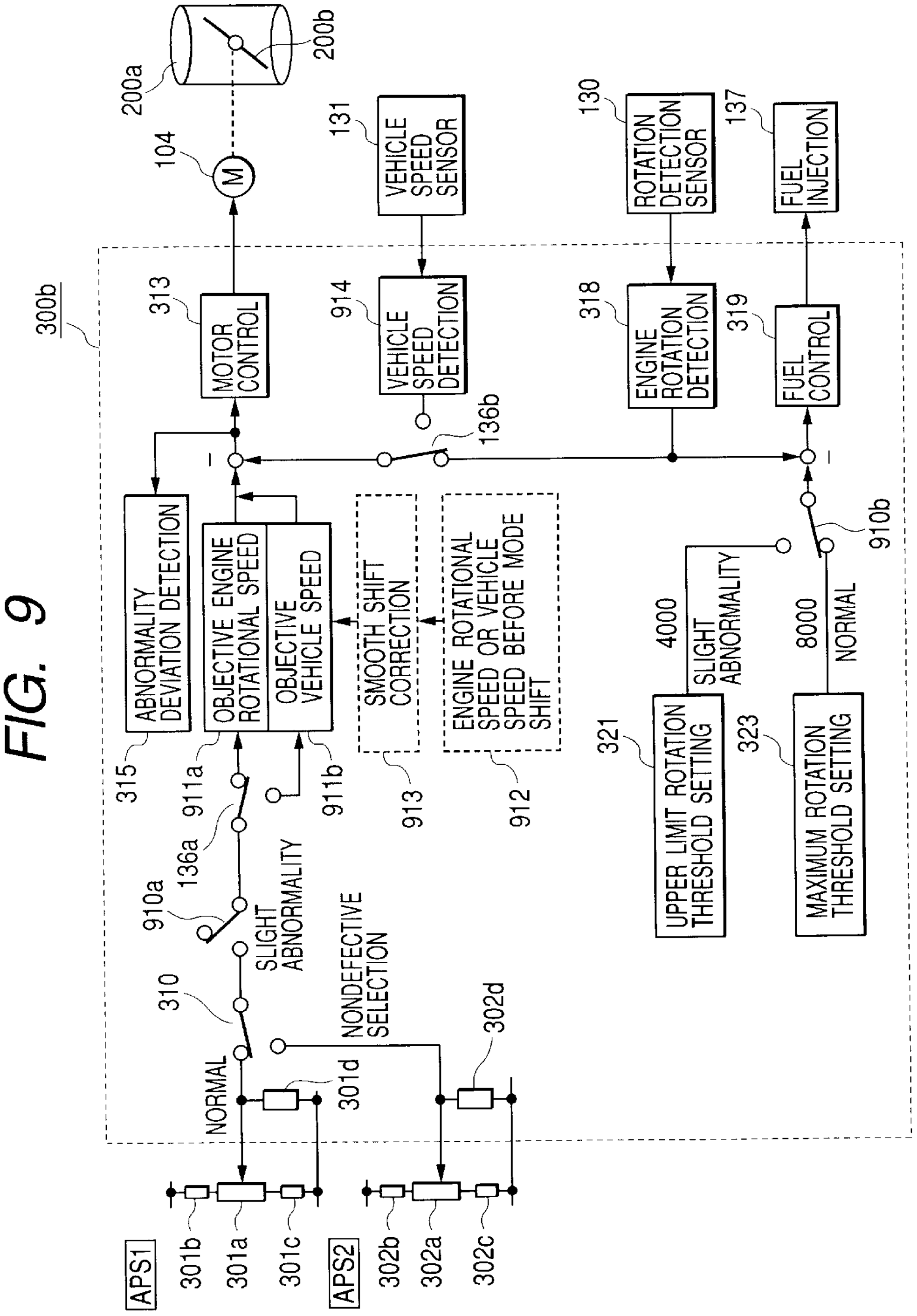
FIG. 9 is a block diagram of slight abnormality escape running control according to embodiment 3 of a vehicle engine control device of this invention.

In FIG. 9, reference numerals 910*a* and 910*b* designate changeover switches operating together, and these changeover switches 910*a* and 910*b* carry out changeover operations from the illustrated positions of FIG. 9 when the step 636 shown in FIG. 6 performs the slight mode selection storage.

Besides, reference numerals 136*a* and 136*b* designate manual operation switches operating together, and these manual changeover switches 136*a* and 136*b* are constant speed mode selection switches. These manual changeover switches 136*a* and 136*b* are respectively one of mode selection switches provided in a not-shown auto-cruising device (constant speed traveling device), and when a constant speed traveling mode is selected, they are changed over from the illustrated positions of FIG. 9.

Reference numeral 911*a* designates objective engine rotational speed setting means, and this becomes effective when a slight escape running mode is selected, the changeover switch 910*a* is closed, and a constant speed mode selection switch 136*a* does not operate (illustrated position). This objective engine rotational speed setting means 911*a* generates an output substantially proportional to the output of the accelerator position sensor 301*a* or 302*a* selected by the changeover switch 310 operating correspondingly to the first non-defective sensor detection means 533 shown in FIG. 5. The output voltage of this objective engine rotational speed setting means 911*a* is given by, for example, the same expression as the foregoing expression (1).

Reference numeral 911*b* designates objective vehicle speed setting means, and becomes effective in a state where the slight escape running mode is selected, the changeover switch 910*a* is closed, and the constant speed mode selection switch 136*a* is operated to be inverted from the illustrated position. This objective vehicle speed setting means 911*b* generates an output substantially proportional to the output of the first or second accelerator position sensor 301*a* or 302*a* selected by the changeover switch 310 operating correspondingly to the first non-defective sensor detection means 533 shown in FIG. 5. The output voltage of this objective vehicle speed setting means 911*b* is given by, for example, the following expression (3).

$$V=60\ (\theta a/\theta\ \max) \tag{3}$$

Where,

V=objective vehicle speed (Km/H)

θa=depression angle of accelerator pedal

θ max=maximum depression angle of accelerator pedal.

Reference numeral 912 designates storage means for storing an engine rotational speed or vehicle speed before a mode shift; and 913, smooth shift correction means which gradually shifts the objective engine rotational speed or objective vehicle speed after the mode shift, set by the objective engine rotational speed setting means 911*a* or the objective vehicle speed setting means 911*b*, to the objective value so as not to abruptly change it from the value of the engine rotational speed or vehicle speed stored by the storage means 912.

Incidentally, in the case where the selection of the escape driving mode against the slight abnormality is achieved by putting the transmission in the parking position (P position) as in the step 634 shown in FIG. 6, the storage means 912 and the smooth shift correction means 913 are not needed. However, in the case where it is desired that the both abnormality of the pair of throttle position sensors TPS1 and TPS2 is not treated as the severe abnormality, and the abnormality deviation detection means 315 is also made not to operate temporarily, so that the normal running state or slightest abnormality escape running state is directly shifted to the slight abnormality escape running mode, they become effective means for safety measure.

Reference numeral 914 designates vehicle speed detection means for measuring a vehicle speed by measuring pulse density of the vehicle speed sensor 131 included in the first digital input sensor group 101*a* of FIG. 1, and the vehicle speed detection means 914 becomes effective when the constant speed mode selection switch 136*b* is changed over from the illustrated position.

As is apparent from the above description, in the embodiment 3 of this invention, the slight abnormality escape running mode is added, and in this slight abnormality escape running mode, a control input to the drive control means 313 for controlling the driving motor 104 of the throttle valve is a deviation value between the set output of the objective engine rotational speed setting means 911*a* or the objective vehicle speed setting means 911*b* and the feedback detection value by the engine rotational speed detection means 318 or the vehicle speed detection means 914, and when this deviation value is excessive, the severe abnormality is detected by the abnormality deviation detection means 315.

Besides, the upper limit objective engine rotational speed for the fuel injection control means 319 for driving the fuel injection valve 137 is set by the maximum rotation threshold setting means 323 at the time of normal running or is set by the upper limit rotation threshold setting means 321 at the time of slight abnormality escape running.

Effects of the vehicle engine control device of the embodiments 3 will be described collectively. This embodiment 3 adopts the structure and operation of the embodiment 1 as they are, and further includes the slight abnormality escape running mode in addition to those. This embodiment has the effects of the embodiment 1 as they are, and further has the following peculiar effects. First, in the vehicle engine control device according to the embodiment 3, since the upper limit rotation threshold setting means 321 and the second throttle escape mode control means 300*b* are provided as the slight abnormality driving mode, there are effects that even in the both abnormality of the pair of throttle position sensors TPS1 and TPS2, escape running can be easily carried out based on the engine rotational speed or vehicle speed corresponding to the depression degree of the accelerator pedal. Further, although the throttle valve opening degree is not suppressed at the time of the occurrence of a slight abnormality, the upper limit rotational speed of the engine is controlled by the upper limit rotation threshold setting means 321, and if this limiting rotational speed is made the rotational speed in the vicinity of the rotational speed at which the engine can generate the maximum torque, there is an effect that sufficient climbing performance can be secured.

Besides, in the vehicle engine control device according to the embodiment 3, since the escape mode selection means 910*a* and 910*b* are provided for the slight escape driving mode, although it becomes necessary to once stop the vehicle and to restart the engine in order to shift to the slight escape driving mode, there are effects that it is possible to avoid a danger of promptly shifting to various escape running means against the occurrence of an abnormality during vehicle traveling, and to use convenient escape running means.

Besides, in the vehicle engine control device according to the embodiment 3, since the smooth shift correction means 913 is provided for the slight escape driving mode, even if a mode is shifted to the slight escape driving mode against the occurrence of an abnormality during vehicle traveling, the engine rotational speed or the vehicle speed does not abruptly rise, and therefore, there is an effect that the safety is improved.

Embodiment 4

Next, embodiment 4 of an engine control device of this invention will be described.

In this embodiment 4, rest cylinder control of an engine is further added to the embodiment 1.

In this embodiment 4, the structure and operation of the embodiment 1 are adopted as they are, and the rest control of the engine is further added in addition to those. Specifically, the embodiment 4 adopts the whole structure shown in FIG. 1, the structure of the intake throttle portion shown in FIG. 2, the slightest abnormality escape running control block shown in FIG. 3, the severe abnormality escape running control block shown in FIG. 4, the abnormality detection flowchart of the accelerator position sensors shown in FIG. 5, the abnormality detection flowchart of the throttle position sensors shown in FIG. 6, and the upper limit rotational speed setting flowchart shown in FIG. 7 as they are, and in addition to those, this embodiment is constructed to execute the rest cylinder control shown in FIG. 10.

Hereinafter, with respect to the embodiment 4, the operation of the microprocessor will be described with reference to the control block diagram shown in FIG. 4 and an operation explanatory flowchart shown in FIG. 10. It should be understood that respective steps of the flowchart of FIG. 10 constitute means.

Figure 10:
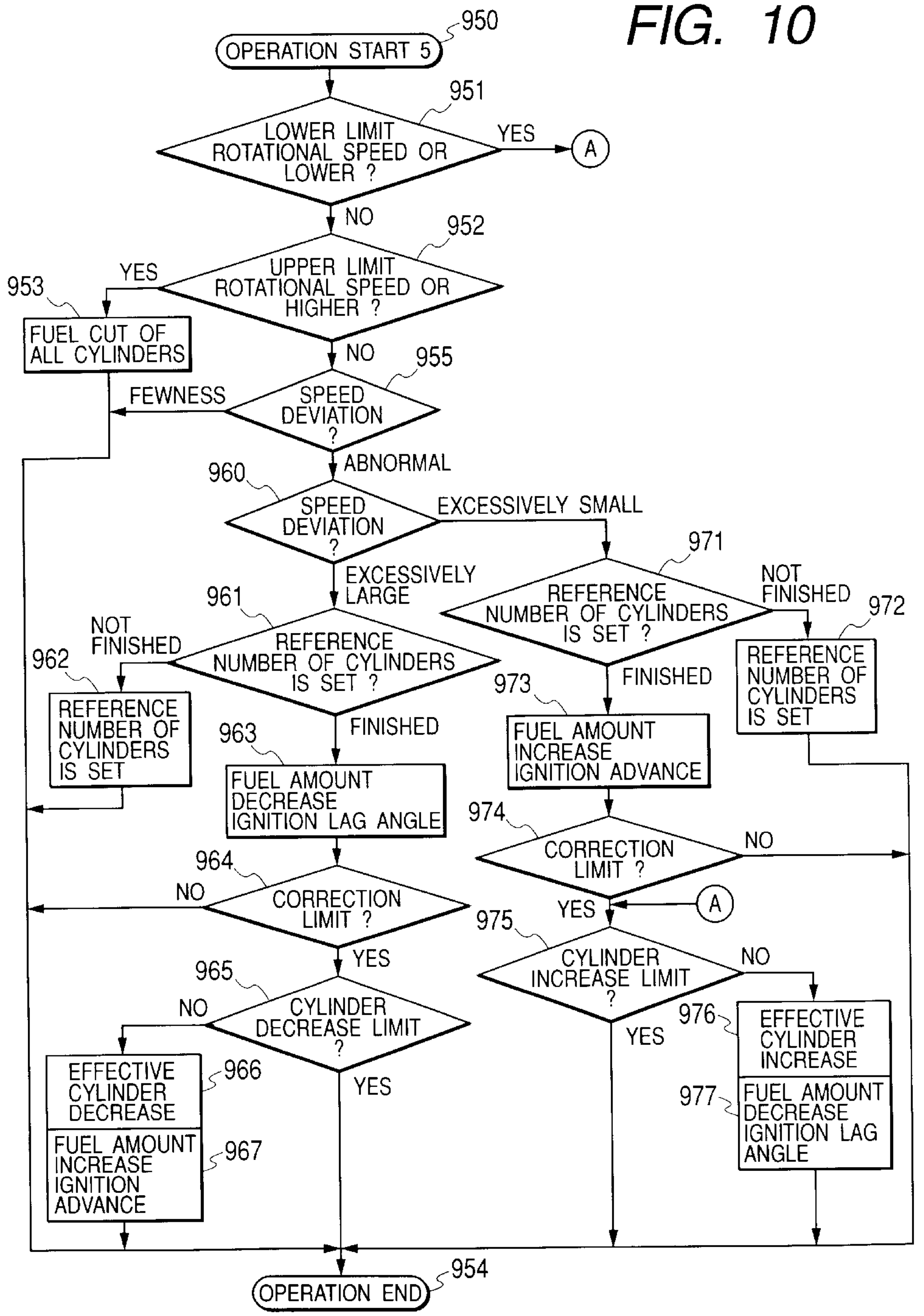
FIG. 10 is a flowchart of rest cylinder control according to embodiment 4 of a vehicle engine control device of this invention.

In FIG. 10, step 950 is an operation start step periodically activated, and step 951 is a judgment step executed subsequently to the step 950. This step 951 judges whether the actual engine rotational speed detected by the engine rotational speed detection means 318 shown in FIG. 4 is not higher than the lower limit rotational speed set by the lower limit rotation threshold setting means 401*a*. At this judgment step 951, if the actual engine rotational speed is not higher than the lower limit rotational speed, a judgment of YES is made, and if not, a judgment of NO is made. Step 952 is a judgment step executed when the actual engine rotational speed is higher than the lower limit rotational speed and the judgment of NO is made at the step 951, and this judgment step 952 judges whether the present engine rotational speed is not lower than the upper limit engine rotational speed (set by the blocks 404, 407, 410 and the like shown in FIG. 4) as an object. At this judgment step 952, if the present engine rotational speed is not lower than the upper limit engine rotational speed, a judgment of YES is made, and if not, a judgment of NO is made. When the judgment of NO is made at the judgment step 952, judgment step 955 is executed, and when the judgment of YES is made at the step 952, step 953 is executed, fuel injection of all cylinders is stopped, and it proceeds to an operation end step 954.

At the judgment step 955, a speed deviation between a value of about 80% of the upper limit engine rotational speed (set by the blocks 401*a*, 407, 410, 404 and the like of FIG. 4) as the object at the present point of time and the actual engine rotational speed is found. At the judgment step 955, when the speed deviation is small, a judgment of smallness is made, and it proceeds to the operation end step 954, and when the speed deviation is abnormally large, a judgment of abnormality is made, and it proceeds to step 960.

Incidentally, the procedure is on standby at the operation end step 954, and after other control is carried out, it again proceeds to the operation start step 950 and the procedure is repeated.

The step 960 is a judgment step executed when it is judged at the step 955 that the speed deviation is abnormally large, and it is judged whether the speed deviation judged at the step 955 is an abnormality at the excessively large side of the actual engine rotational speed, or an abnormality at the excessively small side. If it is an abnormality at the excessively large side, a judgment of excessive largeness is made, and it is an abnormality at the excessively small side, a judgment of excessive smallness is made. Step 961 is a step executed when the judgment of excessive largeness is made at the step 960, and this step 961 judges whether or not the reference number of cylinders is already set. When the reference number of cylinders is already set, a judgment of completion is made, and when it is not yet set, a judgment of non-completion is made. Step 962 is executed when the judgment of non-completion is made at the step 961, and the reference number of cylinders concerning rest cylinders is set, for example, the number of effective cylinders in which fuel injection is performed is halved. At the step 962, when the reference number of cylinders concerning rest cylinders, as an initial value, is set, it proceeds to the operation end step 954.

Step 963 is a step executed when the judgment of completion is made at the step 961, and at this step 963, a fuel injection amount to the fuel injection valve 137 of FIG. 4 is decreased by a predetermined amount, or in the case of a gasoline engine, an ignition advance of an ignition device is decreased by a predetermined angle to lower the whole engine output. Step 964 is executed subsequently to the step 963, and it is judged whether or not the decrease of the injection fuel and the decrease of the ignition advance reach correction limits in that the engine normally rotates or an exhaust gas purifying device suitably operates. At the step 964, if the decrease of the injection fuel and the decrease of the ignition advance do not reach the correction limits, a judgment of NO is made and it proceeds to the operation end step 954, and if they reach the correction limits, a judgment of YES is made and it proceeds to step 965.

Incidentally, before the step 964 proceeds to the step 965, the route from the step 950 to the step 964 and the step 954 is repeatedly executed, and then, the correction reaches the limit, the step proceeds to the step 965, and the rest cylinder control is started.

The step 965 is a step of judging whether or not the number of rest cylinders in which fuel supply is stopped has reached a limit, and when it has reached the limit, a judgment of YES is made, and if it has not reached the limit, a judgment of NO is made. Step 966 is executed when the judgment of NO is made at the step 965, the number of effective cylinders is a predetermined value or more, and there is a prospect that rotation can be continued by the remaining engine, and is a step of decreasing the number of effective cylinders. At this step 966, fuel supply is stopped for another cylinder of the multi-cylinder engine to lower the total engine output. Step 967 is executed subsequently to the step 966, and is a step of increasing the output of all cylinders in operation by increasing the fuel injection amount and the ignition advance for all cylinders in operation to suitable limit values, and the step 967 subsequently proceeds to the operation end step 954.

Incidentally, since the effective cylinders are decreased at the step 966, the total engine output is decreased at the steps including the step 966 and the step 967.

Besides, the engine rotational speed is still high and before the decrease of cylinders is further carried out, the decrease of the fuel and the decrease of the ignition advance are carried out by the repetition of the route from the step 950 to the step 964 and the step 954, and when they reach the correction limits, the decrease of cylinders is further carried out by the step 966.

Step 971 is a step executed when it is judged at the step 960 that the actual engine rotational speed is excessively low, and at this step 971, it is judged whether-or not the reference number of cylinders has already been set. If the reference number of cylinders has already been set, a judgment of completion is made, and if not, a judgment of non-completion is made. Step 972 is executed when the judgment of non-completion is made at the step 971, and the reference number of cylinders concerning rest cylinders is set, for example, the number of effective cylinders in which fuel injection is carried out is halved. At this step 972, when the reference number of cylinders concerning rest cylinders is set as an initial value, it proceeds to the operation end step 954.

Step 973 is a step executed when the judgment of completion is made at the step 971, and at this step 973, the fuel injection amount to the fuel injection valve 137 of FIG. 4 is increased by a predetermined amount, and in the case of a gasoline engine, the ignition advance of the ignition device is increased by a predetermined angle to raise the total engine output. Step 974 is a judgment step executed subsequently to this step 973, and at this step 974, it is judged whether or not the increase of the injection fuel and the increase of the ignition advance reach correction limits in that the engine normally rotates or the exhaust gas purifying device properly operates. At the step 974, if the increase of the injection fuel and the increase of the ignition advance do not reach the correction limits, a judgment of NO is made, and it proceeds to the operation end step 954, and if they reach the correction limits, it proceeds to step 975.

Incidentally, before the step 974 proceeds to the step 975, the route from the step 950 to the step 974 and the step 954 is repeatedly executed, and then, the correction reaches the limit, the step proceeds to the step 975, and the rest cylinder control is started.

The step 975 is executed when the judgment of YES is made at the step 951 or the step 974, and at this step 975, it is judged whether or not the effective cylinders in which fuel is supplied have reached all cylinders. Step 976 is a step executed when the effective cylinders have not reached all cylinders, and the judgment of NO is made at the step 975, and fuel supply is started for one cylinder of rest cylinders to increase the total engine output. Step 977 is a step executed subsequently to the step 976, and this step 977 is a step of decreasing the output of all cylinders in operation by decreasing the fuel injection amount and the ignition advance for all cylinders in operation to suitable limit values. The step 977 proceeds to the operation end step 954, and also, when the judgment of YES is made at the step 975, it proceeds to the operation end step 954.

Incidentally, since the effective cylinders are increased at the step 976, the total engine output is increased by the steps including the step 976 and the step 977.

Besides, the engine rotational speed is still low and before the increase of cylinders is further carried out, the increase of the fuel and the increase of the ignition advance are carried out by the repetition of the route from the step 950 to the step 974 and the step 954, and if they reach the correction limits, the increase of cylinders is further carried out by the step 976.

Now, the operation of the rest cylinder control shown in FIG. 10 will be again described in general. As shown in a characteristic diagram of FIG. 11(*c*), in the rest cylinder control described here, with respect to the engine rotational speed deviation ΔN on the horizontal axis, the number of rest cylinders on the vertical axis is increased or decreased, and before the number of rest cylinders is increased or decreased, the fuel injection amount and the ignition timing are corrected. This engine rotational speed deviation ΔN is calculated by the following expression (4).

$$\Delta N = 0.8 \times Ns - Ne \quad (4)$$

Where,

N=speed deviation r/min

Ns=upper limit objective rotational speed r/min

Ne=actual rotational speed r/min

Incidentally, values of N1, N2, N3, Na and Nb explained in FIG. 7 are used as the upper limit objective rotational speed Ns, and the actual rotational speed Ne is an engine rotational speed detected by the engine rotational speed detection means 318.

Figure 11C:
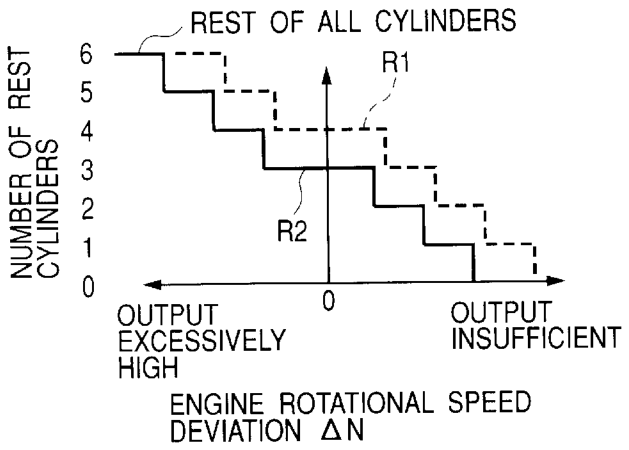
Figure 12A:
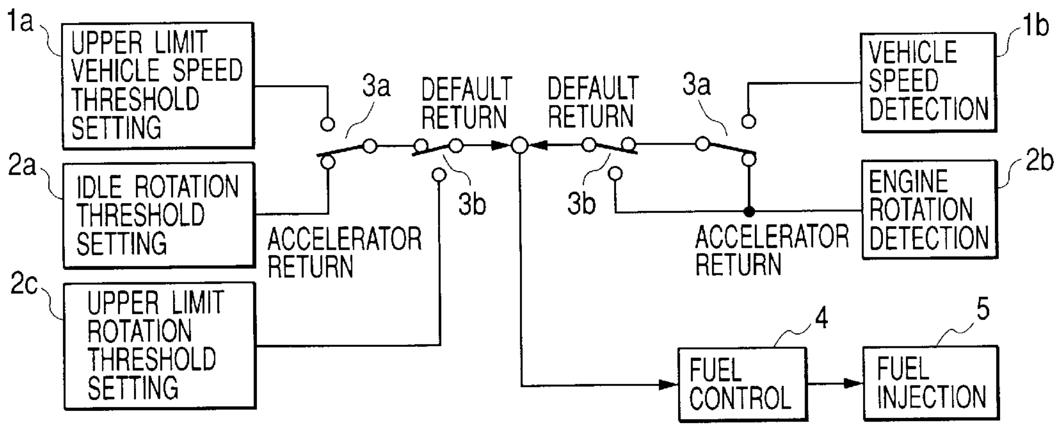
FIGS. 12(*a*) and 12(*b*) are block diagrams of conventional escape running control.
Figure 12B:
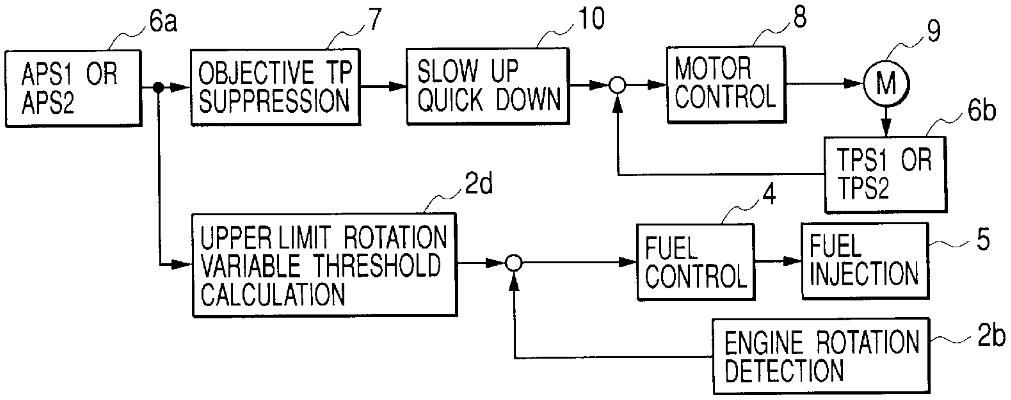

Besides, the number of rest cylinders and the engine rotational speed deviation ΔN in FIG. 11C relate to an example of a six cylinder engine. A characteristic R1 of a dotted line indicates characteristics when the engine rotational speed deviation ΔN is increased, a characteristic R2 of a solid line indicates characteristics when the engine rotational speed deviation is decreased, and a hysteresis characteristic is given to prevent an abnormal alternate operation. Incidentally, the uppermost stages of the characteristics R1 and R2 indicate all cylinder rest in which the number of rest cylinders is six.

On the other hand, in addition to the rest cylinder control with respect to the engine rotational speed deviation, an absolute value control is added such that as in the step 951, when a rotational speed becomes the lower limit rotational speed or lower, cylinders are immediately increased, or as in the step 952, when it exceeds the upper rotational speed, the all cylinder rest is immediately performed.

Effects of the vehicle engine control device of the embodiments 4 will be described collectively. This embodiment 4 adopts the structure and operation of the embodiment 1 as they are, and further includes the rest cylinder control of the engine. This embodiment has the effects of the embodiment 1 as they are, and further has the following peculiar effects. First, in the vehicle engine control device according to the embodiment 4, since the rest cylinder control means is provided in addition to the abnormality detection means and the escape running means according to the embodiment 1, escape running can be carried out at the time of the occurrence of an abnormality by the rest cylinder control means 966 and 976, and further, since the rest cylinder control means 966 or 967 increases or decreases the number of rest cylinders in which fuel injection is stopped, correspondingly to the deviation speed between the objective engine rotational speed and the actual engine rotational speed, there are effects that rotational speed variation of the engine according to the load state of the engine is small, and safe escape running can be carried out.

Besides, in the vehicle engine control device according to the embodiment 4, since the auxiliary control means 963, 973, 967 and 977 are provided for the rest cylinder control means, there are effects that adjustment of the engine rotational speed corresponding to the deviation speed can be more finely carried out, and further, since a large stair-like speed change is suppressed, the safety can be improved.

Besides, in the vehicle engine control device according to the embodiment 4, since the upper rotation threshold setting means 321 and the fuel cut means 953 are provided, although fuel supply of the whole engine is stopped also in the rest cylinder control means if the engine rotational speed is excessively high, if the fuel cut means as a double system is also used, even in the case where the number of rest cylinders can be increased in the rest cylinder control, when the rotational speed exceeds the predetermined upper limit rotational speed, the whole engine can be stopped by the fuel cut control, and therefore, there is an effect that the safety is improved.

Besides, in the vehicle engine control device according to the embodiment 4, since the driving intention confirmation means 402*b*, the lower limit rotation threshold setting means 401*a*, and the lower limit rotational speed correction means 401*b* are provided, there are effects that when the driver has an intention to stop the vehicle, the engine rotational speed is made the minimum rotational speed set by the lower limit rotation threshold setting means 401*a*, and this minimum rotational speed is corrected in accordance with the temperature of engine water or on/off of an air conditioner load or the like and the rotation can be stably kept.

Other Embodiments

Although the embodiments 1 to 4 of this invention have been described, other embodiments will be further described.

As is apparent from the above description, the engine control device of this invention is constructed by the double system conception having an object to improve convenience in the escape running and the double system conception to improve the safety.

In FIG. 1, although the one microprocessor 110 is used, as is generally carried out, the whole control may be shared by a main microprocessor and a sub-microprocessor which can communicate with each other, and mutual monitoring is carried out to improve the safety.

Besides, if an abnormality occurs only once, the abnormality storage element 116 in FIG. 1 stores this, however, in the case of an abnormality due to a temporal erroneous operation or the like, the abnormality storage element may be made to perform the memory operation when the abnormality occurs plural times.

Further, when the load relay 105*a* is switched off according to the occurrence of an abnormality, the motor control signal output DR1 and the load relay driving signal output DR3 of FIG. 1 are also stopped, and the driving motor 104 is certainly switched off by the output contact 105*b* between the transistor 114*a* and the load relay 105*a*.

Besides, although the default position return mechanism 208 of FIG. 2 is a mechanical safety mechanism, on the assumption that a failure in return to a predetermined default position occurs, the default rotation threshold setting means 407 is used, and the safety is electrically improved by this.

The upper limit rotational speed N2 set by this default rotation threshold setting means 407 is a relatively low rotational speed since it is also assumed that an abnormal stop occurs while the throttle valve opening degree is a maximum opening degree.

However, if there is a normal throttle position sensor TPS, since the opening degree of the throttle valve which abnormally stops is found, there is a convenience that almost constant engine output torque can be secured irrespectively of the magnitude of the throttle valve opening degree by using the calculation threshold rotation Nb in inverse proportion to the actual throttle valve opening degree.

Incidentally, if the default rotational speed N2 and the calculation threshold rotational speed Nb are set to be relatively large, there is a merit that the engine torque in escape running becomes large and climbing becomes easy, however, it becomes difficult to lower the speed by a brake pedal at the time of descending.

The lower limit rotation threshold setting means 401*a* improves this, and the lower limit rotational speed N1 becomes effective by actuation of the brake or return of the accelerator pedal, and the output torque of the engine is suppressed to a minimum limit.

However, as in the step 704*a* of FIG. 7, according to the selection position of the transmission, there remains means for making the operation of the brake pedal effective while driving is carried out at the default rotational speed N2 or the calculation threshold rotational speed Nb.

Escape running means not only at the time of the occurrence of a severe abnormality, but also at the time of the occurrence of a slight abnormality is prepared as the escape running means.

Especially, in the case of at least one of the single abnormality of the pair of accelerator position sensors APS1 and APS2, and the signal abnormality of the pair of throttle position sensors TPS1 and TPS2, a mode is automatically changed over to the escape running mode as the slightest abnormality, however, in the case of the both abnormality of the throttle position sensors TPS1 and TPS2, it is necessary to once select the parking position and to restart the engine.

As stated above, by providing the automatic shift escape running means and the selective shift escape running means, it is possible to avoid confusion to a sudden abnormality during normal vehicle traveling, and after the engine is restarted, convenient escape running means can be selected.

However, although that various escape running means exist is significant for a user, it may cause confusion, and therefore, it is not necessary to mount all the escape running means described here in an actual machine. However, if a screen display with a touch key is used as an alarm display and a mode of operation input, it is possible to make an improvement so that an escape running mode can be selected without confusion while a message display is carried out.

As the suppression control means of the engine rotational speed using the fuel injection control means, the rest cylinder control corresponding to the engine rotational speed deviation and the fuel cut control in which even if an allowance of rest cylinders exists, when the rotational speed exceeds the upper limit rotational speed, fuel injection of all cylinders is immediately stopped, can be separately used or both controls can be simultaneously used.

What is claimed is:

1. A vehicle engine control device comprising a transmission in which at least a forward position, a reverse position, a neutral position, and a parking position can be selected by an operation of a selector lever, wherein the control device includes a microprocessor, is constructed to receive electric supply from an on-vehicle battery through a power source switch, and includes engine rotational speed detection means for detecting a rotational speed of an engine, fuel injection means for supplying a fuel to the engine, a pair of accelerator position sensors for detecting a depression degree of an accelerator pedal, a pair of throttle position sensors for detecting a throttle valve opening degree of an intake throttle valve of the engine, a driving motor for carrying out an opening and closing control of the intake throttle valve in accordance with outputs of the pair of accelerator position sensors and the pair of throttle position sensors, a motor power source switching element for controlling electric supply to the driving motor, a default position return mechanism for returning the throttle valve opening degree to a default position for escape driving when the motor power source switching element breaks electric supply, and drive control means for the driving motor, and further includes abnormality detection means, an abnormality storage element, lower limit rotation threshold setting means, automatic shift escape running means, and selective shift escape running means, the abnormality detection means is means for always monitoring operations of a sensor system, a control system, and an actuator system relating to control of the intake throttle valve, detecting whether the intake throttle valve can be controlled, and generating a severe abnormality detection output when the intake throttle valve can not be controlled, when the abnormality detection means generates the severe abnormality detection output, the abnormality storage element stores this, breaks the motor power source switching element to stop electric supply to the driving motor, and is constructed such that its storage state is reset in at least one of closing and breaking of the power source switch, the lower limit rotation threshold setting means is means for setting a lower limit rotational speed at which the engine can continue to rotate, the automatic shift escape running means is means for controlling an engine rotational speed by the fuel injection control means in such a way that when electric supply to the driving motor is stopped, the engine rotational speed detected by the rotational speed detection means of the engine becomes a rotational speed less than a predetermined limiting rotational speed, and becomes a rotational speed greater than a minimum engine rotational speed set by the lower limit rotation threshold setting means, and the selective shift escape running means is means for controlling the engine rotational speed by the fuel injection control means in such a way that when there is an accelerator position sensor regarded as being normal after electric supply to the driving motor is stopped and the transmission is once selected to be put in the parking position, the engine rotational speed detected by the engine rotational speed detection means becomes a rotational speed less than a variable threshold rotational speed of a value substantially in proportion to the depression degree of the accelerator pedal set by variable threshold rotation setting means, and becomes a rotational speed greater than a minimum engine rotational speed set by the lower limit rotation threshold setting means.

2. The vehicle engine control device according to claim 1, wherein the automatic shift escape running means includes calculation threshold setting means and default rotation threshold setting means as setting means for setting the predetermined limiting rotational speed, although there is no accelerator position sensor regarded as being normal, when a throttle position sensor regarded as being normal exists, the calculation threshold setting means is means for setting an upper limit rotational speed of a value substantially in inverse proportion to an output of the throttle position sensor generating a predetermined output corresponding to a throttle valve opening degree of a throttle valve in which an opening and closing operation is stopped and a present position is unspecified, and the default rotational speed setting means is means for setting an upper limit rotational speed higher than the lower limit rotational speed when there is no throttle position sensor regarded as being a non-defective unit.

3. The vehicle engine control device according to claim 1, further comprising driving intention confirmation means, wherein the driving intention confirmation means is means for judging that there is a driving intention in a case where after the abnormality storage element carries out an abnormality storage operation, brakes to a vehicle are released and the accelerator pedal is depressed, and judging that there is a stop intention in at least one of a case where the brakes to the vehicle are actuated and a case where the accelerator pedal is returned, and when a judgment of the stop intention is made, the engine rotational speed is controlled by the fuel injection control means so that the engine rotational speed becomes substantially equal to the engine rotational speed set by the lower limit rotation threshold setting means.

4. The vehicle engine control device according to claim 3, wherein at least one of an accelerator switch and accelerator return detection means is provided, as means for detecting depression of the accelerator pedal, for the driving intention confirmation means.

5. The vehicle engine control device according to claim 4, wherein the accelerator return detection means is means for detecting that outputs of both the pair of accelerator position sensors regarded as being non-defective units are at predetermined return positions.

6. The vehicle engine control device according to claim 3, wherein a brake release switch and transmission selection position confirmation means are provided for the driving intention confirmation means, the brake release switch is means linked with at least one control operation of a main braking operation by a foot brake pedal and a sub-braking operation by a side brake for holding a vehicle stop, it is judged by an operation of the brake release switch that there is a driving intention, and the transmission selection position confirmation means is means for enabling, when a specified position of the forward position is selected after occurrence of an abnormality and after the parking position is once selected, at least one of the default rotation threshold setting means and the calculation threshold rotation setting means even in a state where the brake release switch is in a state of a braking operation.

7. The vehicle engine control device according to claim 1, further comprising rising rate suppression means, wherein the rising rate suppression means is means for suppressing a sudden rise of an objective engine rotational speed in at least one of a case where the lower limit rotational speed is changed over to one of the predetermined limiting rotation speed and the variable threshold rotational speed, and a case where the default rotational speed is changed over to the calculation threshold rotational speed.

8. The vehicle engine control device according to claim 1, further comprising a first alarm display and first discrimination operation control means, wherein the first alarm display operates when the abnormality storage element stores a severe abnormality state, the discrimination operation control means is means for carrying out a discrimination operation to drive the first alarm display to flash when there is no accelerator position sensor regarded as being a non-defective unit, and an alarm display is carried out to indicate that escape running does not depend on depression of the accelerator pedal and a driving speed of the vehicle must be adjusted by an operation of the brake pedal.

9. The vehicle engine control device according to claim 1, wherein the abnormality detection means includes at least one of runaway monitor means of the microprocessor, error signal output means of a driving motor system, both abnormality detection means of the pair of accelerator position sensors, and abnormality deviation detection means, the runaway monitor means of the microprocessor is abnormality detection means of the control system, constituted by a watch dog timer circuit to which a watch dog signal as a pulse train generated by the microprocessor is inputted, and which generates a reset output for restarting the microprocessor when a pulse width of the watch dog signal exceeds a predetermined value, the error signal output means of the driving motor system is abnormality detection means of the actuator system, constructed to detect at least one of a disconnection and a short circuit for the driving motor and its feeding circuit, and to generate a first error signal output, the both abnormality detection means is abnormality detection means of the sensor system, constructed to generate a second error signal output when the pair of accelerator position sensors are abnormal, the abnormality deviation detection means is abnormality detection means of all of the sensor system, the control system and the actuator system, which is constructed to compare an objective throttle valve opening degree corresponding to a detection output of one of the pair of accelerator position sensors with an actual throttle valve opening degree detected by the throttle position sensor, and to generate a third error signal output when comparison inconsistence is excessively large, and the abnormality detection means generates the severe abnormality detection output by a logical sum of at least part of the reset output, the first error signal output, the second error signal output, and the third error signal output.

10. The vehicle engine control device according to claim 9, wherein dynamic abnormality detection means is provided as the abnormality detection means, the dynamic abnormality detection means is means for detecting that both the pair of throttle position sensors have become abnormal when the transmission selects one of the forward position and the reverse position, and a severe abnormality is released by selecting the parking position in the transmission after the abnormality occurs.

11. The vehicle engine control device according to claim 9, wherein default return abnormality detection means is provided as the abnormality detection means, the default return abnormality detection means is abnormality detection means of the actuator system, is constructed to detect that in a state where electric supply to the driving motor is switched off by the motor power source switching element, detection outputs of the pair of throttle position sensors are differed from a predetermined value corresponding to a default return position, and to generate a fourth error signal output.

12. A vehicle engine control device comprising a transmission in which at least a forward position, a reverse position, a neutral position, and a parking position can be selected by an operation of a selector lever, wherein the control device includes a microprocessor, is constructed so as to receive electric supply from an on-vehicle battery through a power supply switch, and includes engine rotational speed detection means for detecting a rotational speed of an engine, fuel injection means for supplying a fuel to the engine, a pair of accelerator position sensors for detecting a depression degree of an accelerator pedal, a pair of throttle position sensors for detecting a throttle valve opening degree of the engine, and drive control means for controlling a driving motor which carries out an opening and closing control of an intake throttle valve in accordance with outputs of the pair of accelerator position sensors and the pair of throttle position sensors, and further includes first non-defective sensor detection means, second non-defective sensor detection means, and escape running means, the first non-defective sensor detection means includes first relative abnormality detection means for generating a relative error output when outputs of the pair of accelerator position sensors are mutually compared and a comparison deviation is excessive, and first individual abnormality detection means for detecting existence of a disconnection and a short circuit for each of the pair of accelerator position sensors and generating an individual error output when an abnormality exists, and is means for making a non-defective judgment in such a manner that when both of the pair of accelerator position sensors are not in at least one state of the disconnection and the short circuit, and a relative abnormality does not occur, both the accelerator position sensors are regarded as being non-defective units, and even if the relative abnormality occurs, when one of the accelerator position sensors is in the one state of the disconnection and the short circuit, the other accelerator position sensor is regarded as being a non-defective unit, the second non-defective sensor detection means includes second relative abnormality detection means for outputting a relative error output when outputs of the pair of throttle position sensors are mutually compared and a comparison deviation is excessive, and second individual abnormality detection means for detecting existence of a disconnection and a short circuit of each of the pair of throttle position sensors and generating an individual error output when an abnormality exists, and is made means for making a non-defective judgment of the throttle position sensors in such a manner that when both of the pair of throttle position sensors are not in a state of the disconnection and the short circuit, and a relative abnormality does not occur, both the throttle position sensors are regarded as being non-defective units, and even if the relative abnormality occurs, when one of the throttle position sensors is in the state of the disconnection and the short circuit, the other throttle position sensor is regarded as being a non-defective unit, and the escape running means is means for carrying out escape driving by the drive control means and the fuel injection control means in response to at least one abnormality of a slightest abnormality due to at least one of a single abnormality of the pair of accelerator position sensors and a single abnormality of the pair of throttle position sensors, a slight abnormality due to both abnormality of the pair of throttle position sensors, and a severe abnormality due to both abnormality of the pair of accelerator position sensors.

13. The vehicle engine control device according to claim 12, further comprising an accelerator switch and third non-defective sensor detection means, wherein the accelerator switch is a switch for detecting that the accelerator pedal is not depressed, and the third non-defective sensor detection means is means for judging an accelerator position sensor generating a predetermined detection output to be a non-defective unit and selecting it in a case where the relative abnormality of the pair of accelerator position sensors is detected by the first relative abnormality detection means, it is judged by the first individual abnormality detection means that no accelerator position sensor suffers from the disconnection and the short circuit abnormality, and the accelerator switch detects return of the accelerator pedal.

14. The vehicle engine control device according to claim 12, further comprising throttle valve opening degree estimation means and fourth non-defective sensor detection means, wherein the throttle valve opening degree estimation means is means for estimating a throttle valve opening degree on the basis of the engine rotational speed detected by the engine rotational speed detection sensor, an air supply amount detected by an air supply amount detection sensor, and a characteristic map including the engine rotational speed, the air supply amount, and the throttle valve opening degree, and the fourth non-defective sensor detection means is means for judging a throttle position sensor having substantially the same detection output as the throttle valve opening degree estimated by the throttle valve opening degree estimation means to be a non-defective unit and selecting it when the relative abnormality of the pair of throttle position sensors is detected by the second relative abnormality detection means and when it is judged by the second individual abnormality detection means that no throttle position sensor suffers from the disconnection and the short circuit abnormality.

15. The vehicle engine control device according to claim 12, further comprising a default position return mechanism and fifth non-defective sensor detection means, wherein the default position return mechanism is a mechanism for automatically returning the throttle valve opening degree to a predetermined opening degree suitable for escape running when a power source of the driving motor of the throttle valve is switched off, and the fifth non-defective sensor detection means is means for judging a throttle position sensor having a detection output almost equal to a throttle valve opening degree corresponding to a predetermined default return position to be a non-defective unit and selecting it in a state where the relative abnormality of the pair of throttle position sensors is detected by the second relative abnormality detection means, it is judged by the second individual abnormality means that no throttle position sensor suffers from the disconnection and the short circuit abnormality, and a power source of the driving motor is switched off by the motor power source switching element.

16. The vehicle engine control device according to claim 12, wherein a slightest abnormality driving mode is provided in the escape running means, the slightest abnormality driving mode is a driving mode for a slightest abnormality in at least one of a single abnormality of the pair of accelerator position sensors and a single abnormality of the pair of throttle position sensors, in which a severe abnormality is not detected and an opening and closing control of the throttle valve can be carried out by the driving motor, the control device includes upper limit rotation threshold setting means and first throttle escape control means in relation to the slightest abnormality driving mode, the upper limit rotation threshold setting means is means for setting a predetermined engine rotational speed lower than an allowable maximum rotational speed of the engine, close to a rotational speed at which the engine can generate maximum output torque, and not higher than a predetermined rotational speed, the first throttle escape mode control means is means for drive-controlling the driving motor so that an objective throttle valve opening degree corresponding to an output of an accelerator position sensor regarded as being a non-defective unit substantially coincides with an output of a throttle position sensor regarded as being a non-defective unit, and in the slightest abnormality driving mode, limitations are put so that the engine rotational speed becomes a predetermined value or lower by the fuel injection control means and the upper threshold setting means, and escape running is carried out by the drive control means within a throttle valve opening degree range substantially equal to that at a normal driving time.

17. The vehicle engine control device according to claim 12, wherein a slight abnormality driving mode is provided in the escape running means, the slight abnormality driving mode is a driving mode for a slight abnormality in a case where although both the pair of accelerator position sensors are abnormal, a severe abnormality is not detected, at least one of the pair of accelerator position sensors is normal, and an opening and closing control of the throttle valve can be carried out by the driving motor, the control device further includes upper limit rotation threshold setting means and second throttle escape control means in relation to the slight abnormality driving mode, the upper limit rotation threshold setting means is means for setting a predetermined engine rotational speed lower than an allowable maximum rotational speed of the engine, close to a rotational speed at which the engine can generate maximum output torque, and not higher than a predetermined rotational speed, the second throttle escape running control means is means for drive-controlling the driving motor so that at least one control of a control for making a detected engine rotational speed substantially coincident with an objective engine rotational speed corresponding to an output of an accelerator position sensor regarded as being a non-defective unit, and a control for making a detected vehicle speed substantially coincident with an objective vehicle speed corresponding to an output of an accelerator position sensor regarded as being a non-defective unit, and in the slight abnormality driving mode, although limitations are put so that the engine rotational speed becomes a predetermined value or lower by the fuel injection control means and the upper threshold setting means, escape running is carried out by the drive control means within a throttle valve opening degree range substantially equal to that at a normal driving time.

18. The vehicle engine control device according to claim 17, wherein escape mode selection means is provided for the slight escape driving mode, the escape mode selection means is means for enabling the slight escape driving at at least one of a time when a selection position of the transmission is selected to the parking position after occurrence of the slight abnormality, and a time when an escape mode selection switch is manually closed, in a case where a constant speed mode selection switch is provided, selection of the objective engine rotational speed and the objective vehicle speed is enabled by an operation of the constant speed mode selection switch, and in a case where the constant speed mode selection switch is not provided, only the objective engine rotational speed is made effective.

19. The vehicle engine control device according to claim 17, wherein smooth shift correction means is provided for the slight escape driving mode, and the smooth shift correction means corrects one of the objective engine rotational speed and the objective vehicle speed so that an objective value is not suddenly changed but is gently changed.

20. The vehicle engine control device according to claim 16, further comprising a second alarm display and second discrimination operation control means, the second alarm display operates at least one of a single abnormality of the pair of accelerator position sensors and a single abnormality of the pair of throttle position sensors though a severe abnormality does not occur, the second discrimination operation control means is means for carrying out a discrimination operation to drive the second alarm display to flash when there is no throttle position sensor regarded as being a non-defective unit, and an alarm and display is given to a driver by discriminating through the second alarm display whether escaping running presently carried out is escape running by the first throttle escape mode control means or escape running by the second throttle escape control means.

21. A vehicle engine control device using a microprocessor and controlling a driving motor for carrying out an opening and closing control of an intake throttle valve of an engine in accordance with outputs of a pair of accelerator position sensors for detecting a depression degree of an accelerator pedal and outputs of a pair of throttle position sensors for detecting a throttle valve opening degree, the control device including engine rotational speed detection means for detecting a rotational speed of the engine and fuel injection control means for the engine, and further including abnormality detection means, escape running means, and rest cylinder control means, wherein the abnormality detection means is means for always monitoring operations of a sensor system, a control system, and an actuator system relating to control of the throttle valve, discriminating between a severe abnormality in which control of the throttle valve is impossible, and a slight abnormality in which control of the throttle valve is possible, and detecting it, the escape running means includes at least one of severe abnormality escape running means for controlling the rotational speed of the engine by stopping the control of the throttle valve and by the fuel injection control means, and slight abnormality escape running means for suppressing the rotational speed of the engine by the fuel injection control means while carrying out the control of the throttle valve, and the rest cylinder control means is speed control means for increasing or decreasing the number of rest cylinders in which fuel injection is stopped, in accordance with a magnitude of a relative speed deviation between an objective engine rotational speed and an engine rotational speed detected by the engine rotational speed detection means, to obtain the engine rotational speed substantially equal to the objective engine rotational speed.

22. The vehicle engine control device according to claim 21, wherein auxiliary control means is provided for the rest cylinder control means, and the auxiliary control means is means for carrying out at least one of increase and decrease of an injection fuel and increase and decrease of an ignition advance before the number of effective cylinders is increased and decreased by the rest cylinder control means, and carrying out increase and decrease of the number of effective cylinders when the increase and decrease control exceeds an allowable limitation.

23. The vehicle engine control device according to claim 21, further comprising upper limit rotation threshold setting means and fuel cut means, the upper rotation threshold setting means is means for setting an upper limit rotational speed to immediately stop all cylinders irrespective of a magnitude of the relative speed deviation and existence of an allowance in the number of rest cylinders, and the fuel cut means is means for stopping fuel injection to all cylinders to stop the engine when the rotational speed of the engine exceeds the engine rotational speed set by the upper limit rotation threshold setting means.

24. The vehicle engine control device according to claim 21, further comprising driving intention confirmation means, lower limit rotation threshold setting means, and lower limit rotational speed correction means, wherein the driving intention confirmation means is means for judging whether a driver has an intention to carry out escape running, on the basis of at least one of a select position of a transmission, existence of a braking operation to a vehicle, and existence of an operation of an accelerator pedal, the lower limit rotation threshold setting means is means for setting a minimum engine rotational speed at which rotation can be continued, when the drive intention confirmation means makes a judgment of existence of a stop intention, the lower limit rotational speed correction means is means for increasing or decreasing the engine rotational speed set by the lower limit rotation threshold setting means in accordance with environmental conditions including cooling water temperature of the engine and a working state of an air conditioner, and when the lower limit rotation threshold setting means is applied, at least one of the rest cylinder control means and the auxiliary control means carries out an injection control of fuel so that an actual engine rotational speed becomes almost equal to the lower limit rotational speed set by the lower limit rotation threshold setting means.

* * * * *